(12) United States Patent
Scott

(10) Patent No.: US 12,435,981 B2
(45) Date of Patent: Oct. 7, 2025

(54) PORTABLE FLIGHT NAVIGATION TOOL ADAPTED TO ASSIST PILOTS IN COMPLIANCE WITH INTERNATIONAL FLIGHT PROCEDURES AND NAVIGATION

(71) Applicant: Scott International Procedures, LLC, Livermore, CO (US)

(72) Inventor: Shawn Scott, Livermore, CO (US)

(73) Assignee: Scott International Procedures, LLC, Livermore, CO (US)

( * ) Notice: Subject to any disclaimer, the term of this patent is extended or adjusted under 35 U.S.C. 154(b) by 246 days.

(21) Appl. No.: 18/235,147

(22) Filed: Aug. 17, 2023

(65) Prior Publication Data
US 2024/0151538 A1 May 9, 2024

Related U.S. Application Data

(63) Continuation-in-part of application No. 18/046,009, filed on Oct. 12, 2022, now Pat. No. 11,852,486,
(Continued)

(51) Int. Cl.
*G01C 21/20* (2006.01)
*B64D 45/00* (2006.01)
*G06F 16/29* (2019.01)

(52) U.S. Cl.
CPC .............. *G01C 21/20* (2013.01); *B64D 45/00* (2013.01); *G06F 16/29* (2019.01)

(58) Field of Classification Search
None
See application file for complete search history.

(56) References Cited

U.S. PATENT DOCUMENTS 9,939,271 B1  4/2018  Foster et al.
11,512,959 B2  11/2022  Scott
(Continued)

OTHER PUBLICATIONS

Non Final Office Action for U.S. Appl. No. 16/653,748, mailed Mar. 31, 2022, 11 pages.
(Continued)

*Primary Examiner* — Hitesh Patel
*Assistant Examiner* — Elle Rose Knudson
(74) *Attorney, Agent, or Firm* — Cozen O'Connor

(57) ABSTRACT

A portable flight navigation tool has a tablet computer with GPS, and memory with an aviation database with international operating rules including transoceanic flight rules, a moving-map database with tracks, coastal airport identifiers and locations, and predefined reporting point locations for transoceanic operations. The navigation tool includes machine readable code for displaying the operating rules, reading locations from the GPS while indicating them on a moving map display, and a trip database with a planned transoceanic route for an individual flight configured by entry of waypoints or names and selection of predefined tracks. The tool has a checklist database and displays checklists for pre-departure, coast-out flight phase, waypoint-reached, and a coast-in flight phases; and may provide a heading and next-waypoint timing for rhumb-line routes from GPS failure locations to the next waypoint of the active route. The tool links as a primary/secondary pair with another like tool.

17 Claims, 82 Drawing Sheets

Related U.S. Application Data which is a continuation of application No. 16/653,748, filed on Oct. 15, 2019, now Pat. No. 11,512,959.

(60) Provisional application No. 62/745,879, filed on Oct. 15, 2018.

(56) References Cited

U.S. PATENT DOCUMENTS

| | | | |
|---|---|---|---|
| 12,232,450 B2 * | 2/2025 | Fattey | G05D 1/246 |
| 2007/0150124 A1 * | 6/2007 | Wipplinger | G01C 23/005 |
| | | | 701/3 |
| 2010/0332122 A1 * | 12/2010 | Weichbrod | G08G 5/34 |
| | | | 701/533 |
| 2010/0333040 A1 | 12/2010 | Palanisamy et al. | |
| 2015/0097706 A1 | 4/2015 | Perger et al. | |
| 2016/0196698 A1 | 7/2016 | O'dell et al. | |
| 2017/0140654 A1 * | 5/2017 | Dennerline | G08G 5/22 |
| 2017/0291723 A1 * | 10/2017 | Reddy | G01S 19/13 |
| 2020/0047913 A1 * | 2/2020 | Shavit | B64D 45/00 |

OTHER PUBLICATIONS

Non Final Office Action for U.S. Appl. No. 18/046,009 mailed May 11, 2023, 19 pages.

* cited by examiner

Figure 1 Oceanic Flight Reminders
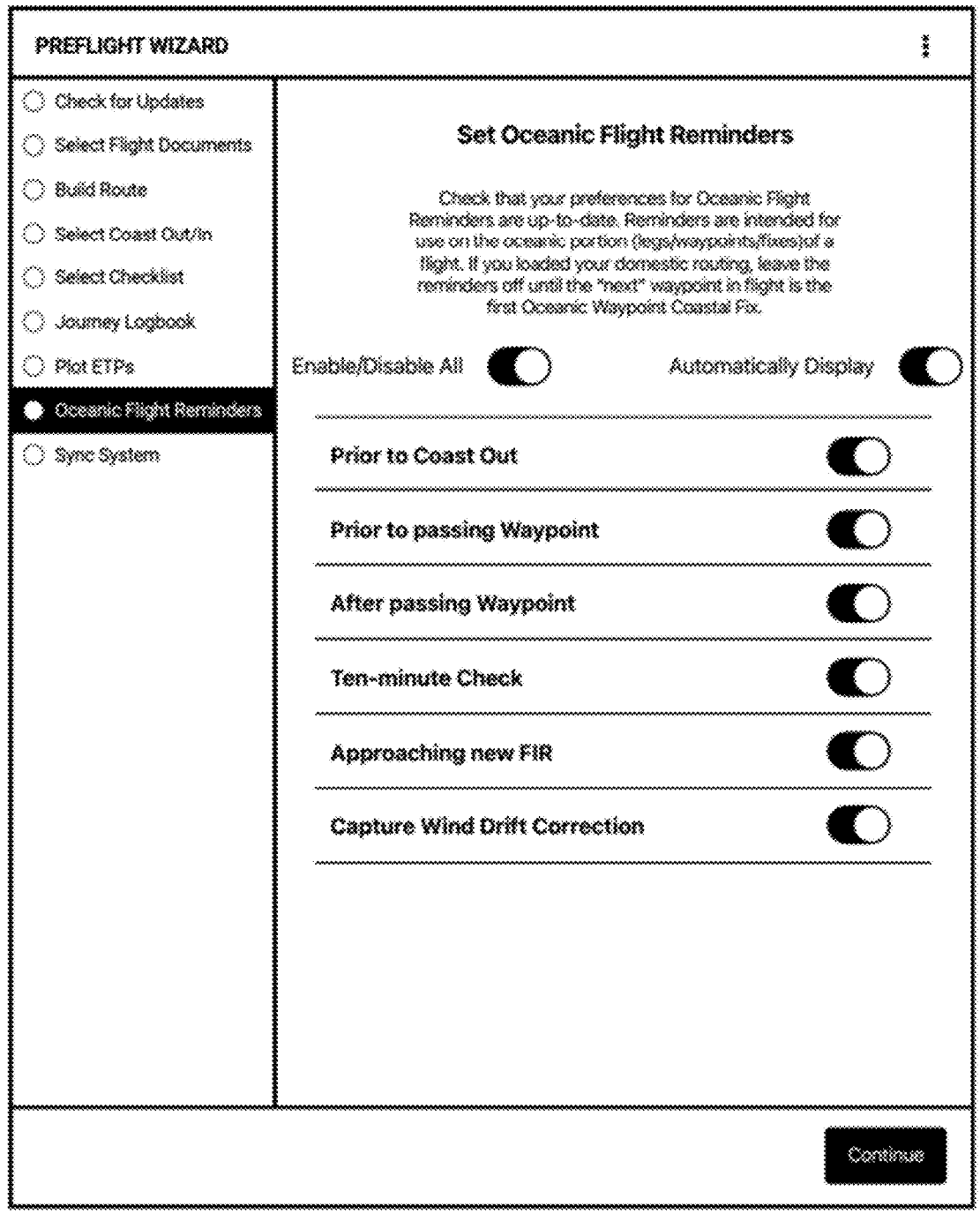

Figure 1A – System Block Diagram

Figure 1B Main Menu
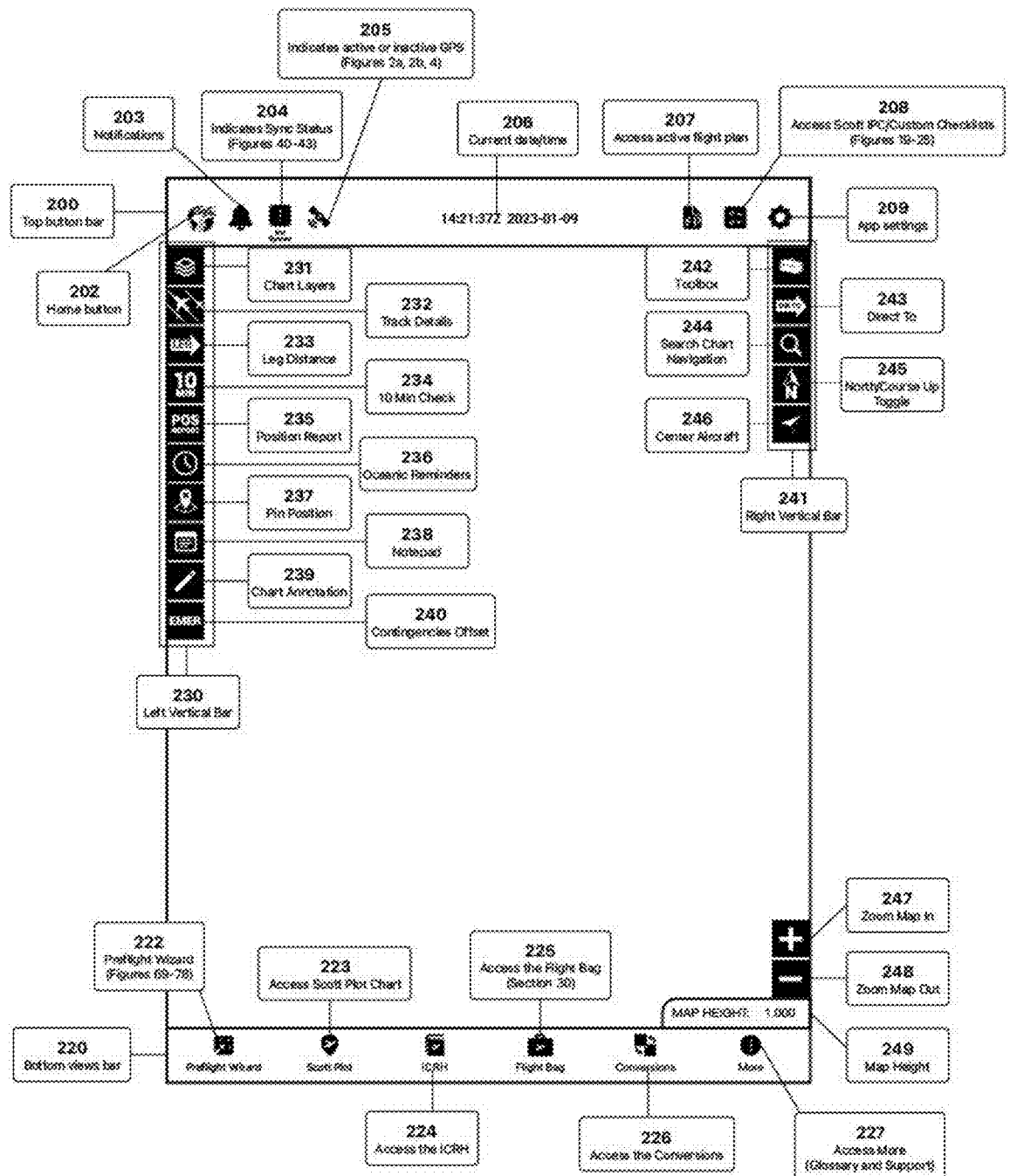

Figure 2A - Disabled (Grey)
Figure 2B - Active GPS icon (Green when active)
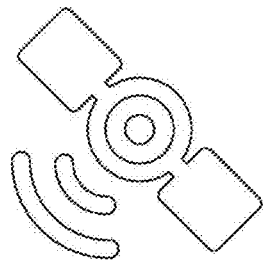

Figure 3A - GPS Chart North UP
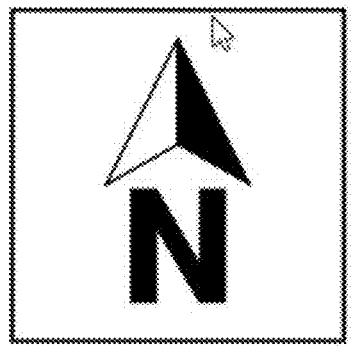
Figure 3B - GPS Chart Track Up
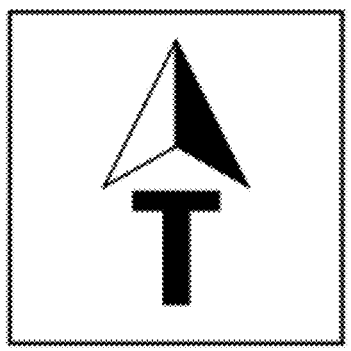
Figure 3C - GPS Chart Zoom In
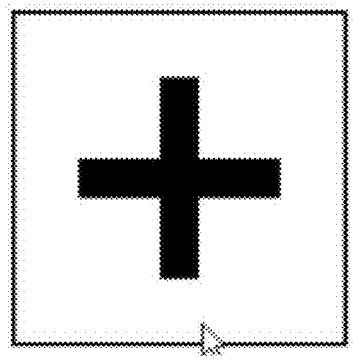
Figure 3D - GPS Chart Zoom Out
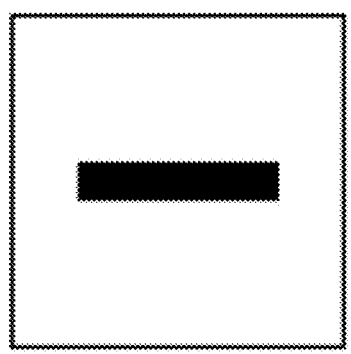

Figure 3E - GPS Center Aircraft
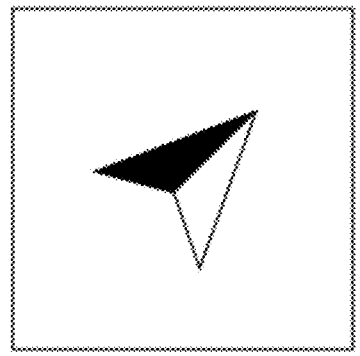
Figure 4 - GPS unusable icon
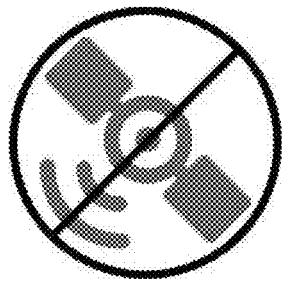
Figure 5 - GPS Mode Selection Menu
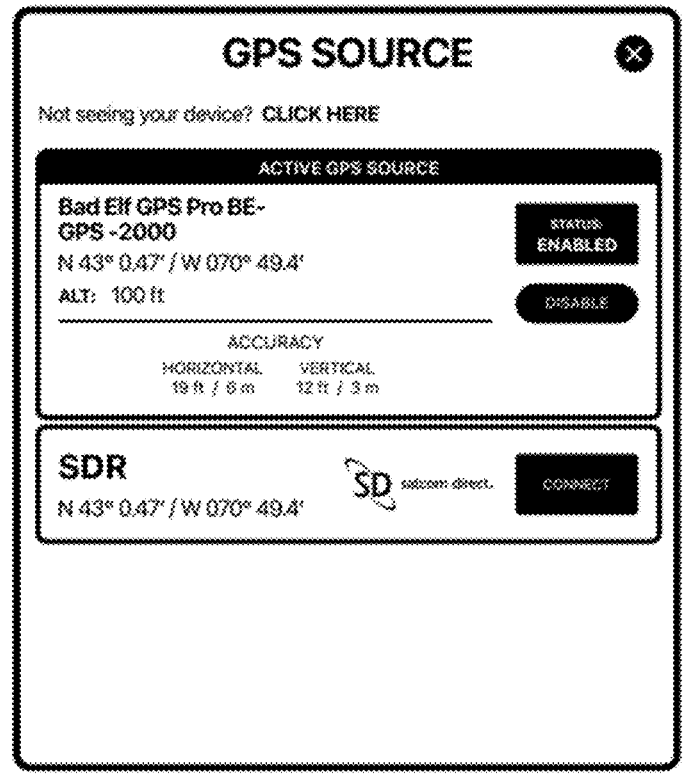

Figure 6 - GPS Mode Selection Menu
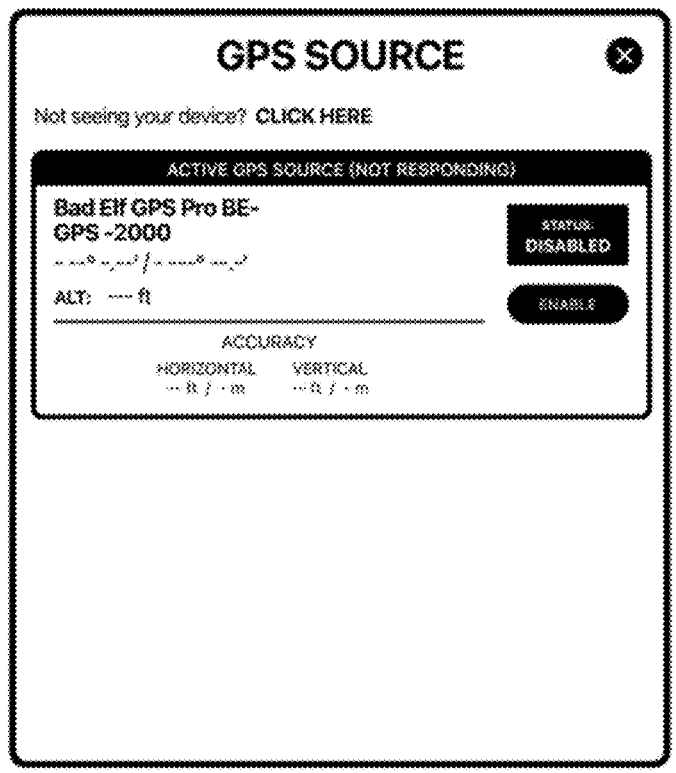
Figure 7 - GPS FAIL and ACTIVE Stamps
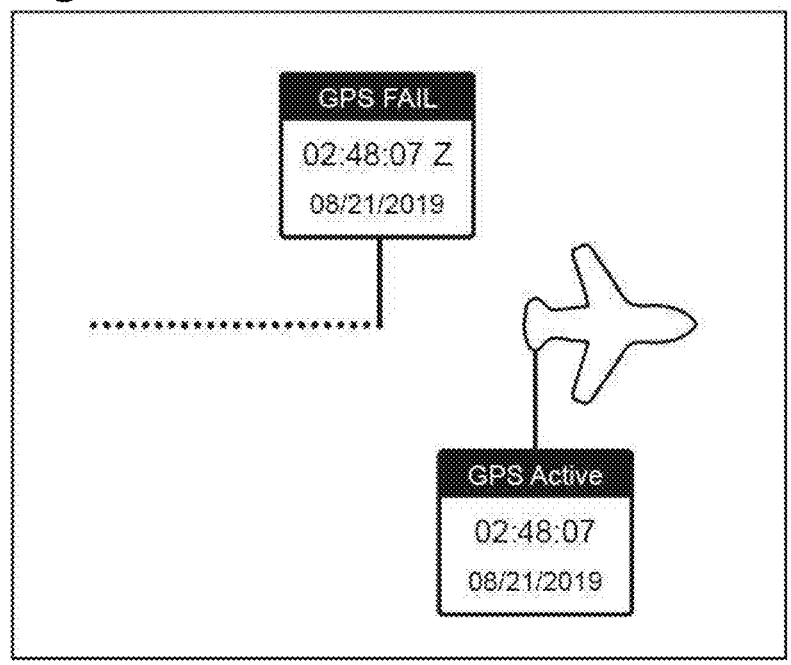

Figure 8 - Auto Plot Oceanic Route build entry form

Cut and paste the clearance or enter the oceanic routing using a space between entries. ⊗

KPSM ENE TOPPS N383B ALLRY 51N050W 52N040W 53N030W 53N020W MALOT GISTI UNBEG EINN

Formats for Named: DOTTY, VP, YVR, CYQX, 4850N, 48N50, N4850, 48N050W  | Clear All | Recalculate | Post Route

WAYPOINTS ∧

| KPSM | N 43° 04.7' / W 070° 49.4' | CLR ⊕ ◯ |
| WPT: PORTSMOUTH INTL AT PEASE | Coast Out ☐  Coast In ☐ | |

| ENE | N 43° 25.5' / W 070° 36.8' | CLR ⊕ ◯ |
| VOR: KENNEBUNK | Coast Out ☐  Coast In ☐ | |

| TOPPS | N 45° 20.4' / W 067° 44.3' | CLR ⊕ ◯ |
| WPT: | Coast Out ☐  Coast In ☐ | |

••• ⟩N383B⟩ •••

| ALLRY | N 50° 30.0' / W 052° 00.0' | CLR ⊕ ◯ |
| WPT: | Coast Out ☐  Coast In ☐ | |

| 51N050W | N 51° 00.0' / W 050° 00.0' | CLR ⊕ ◯ |
| WPT: N 51° 00.0' W 050° 00.0' | Coast Out ☐  Coast In ☐ | |

KPSM - EINN                PULL ∧

[Keyboard: QWERTY layout with numeric keypad]

Figure 9 - Confirm Delete Waypoint
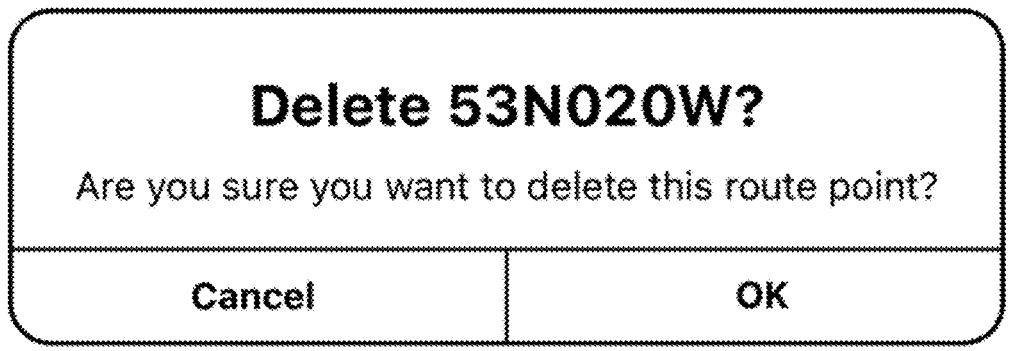
Figure 10A - Modify Routes Drag and Drop
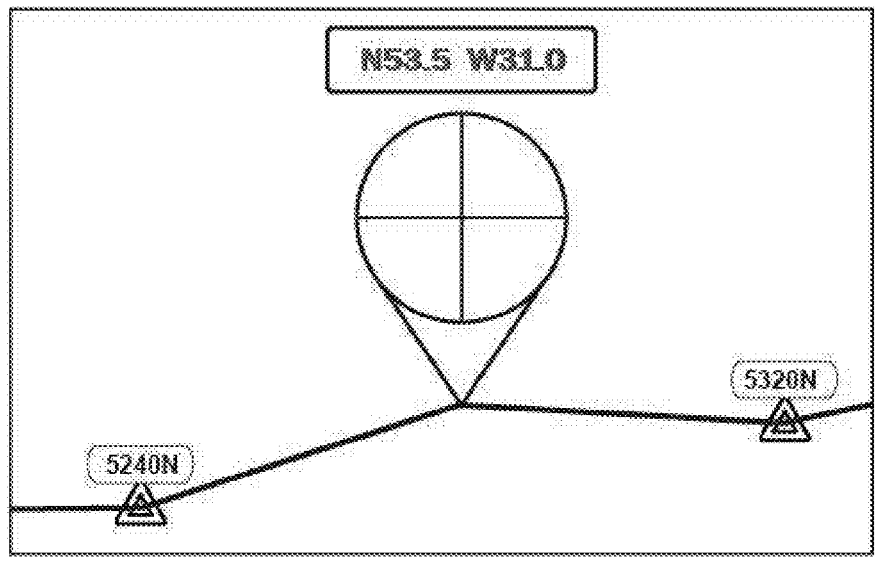
Figure 10B - Modify Routes Drag and Drop Confirmation
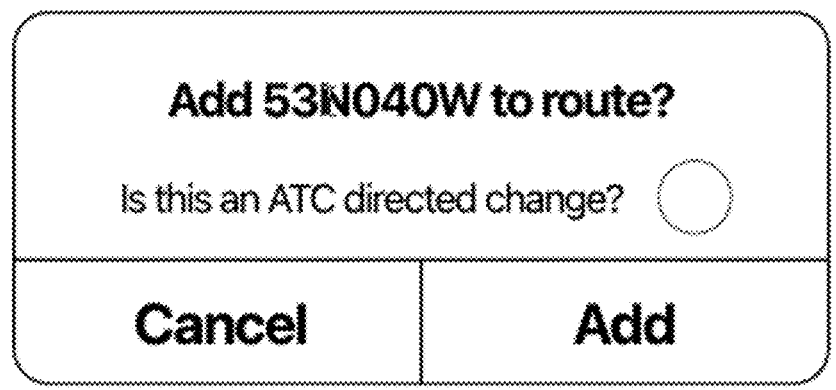

Figure 11 - Popup allows users to set "snap to" for drag and drop.
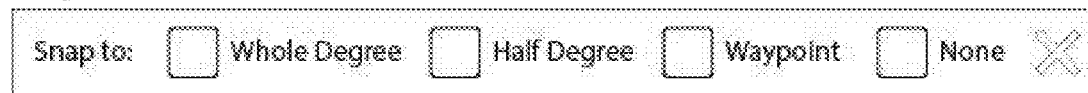
Figure 12 - Navigation System Position Check Form for aircraft Navigation System Sensor position entry.

Figure 13- RAW R/DME A/C sensor position
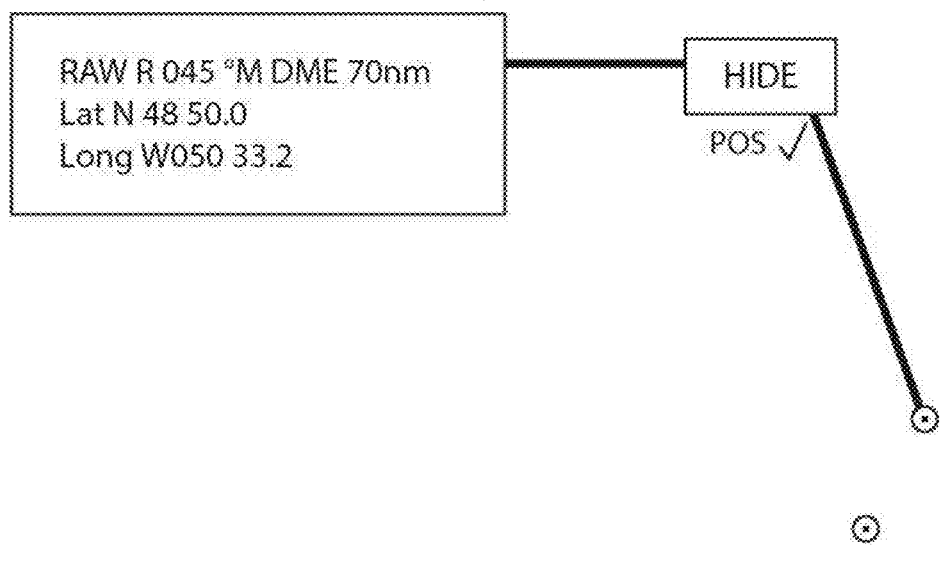
Figure 14- FMS R/DME exact position shown
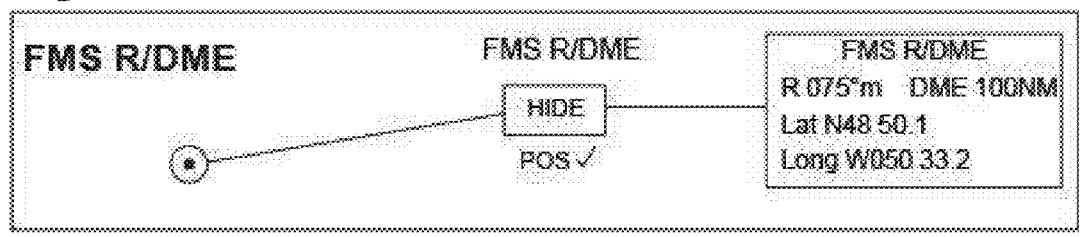

Figure 15- FMS1, FMS2, FMS3
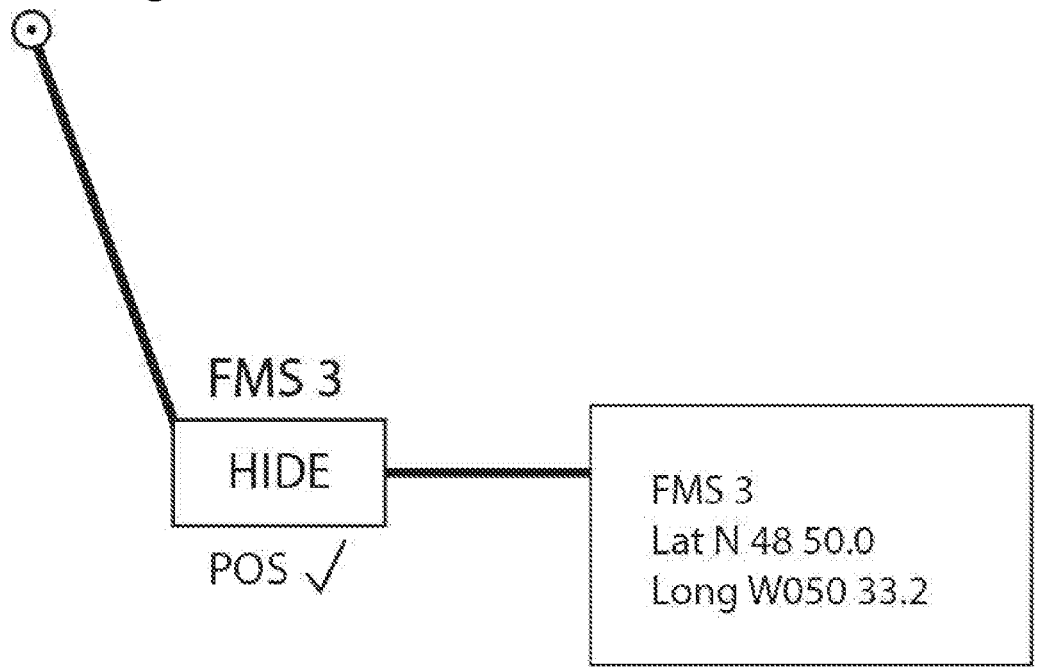
Figure 16- IRS1, IRS2, IRS3
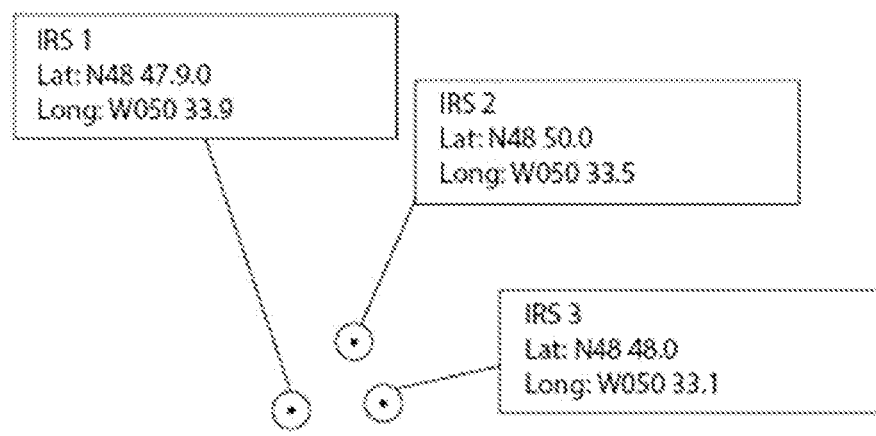

Figure 17 - GPS- exact positions shown
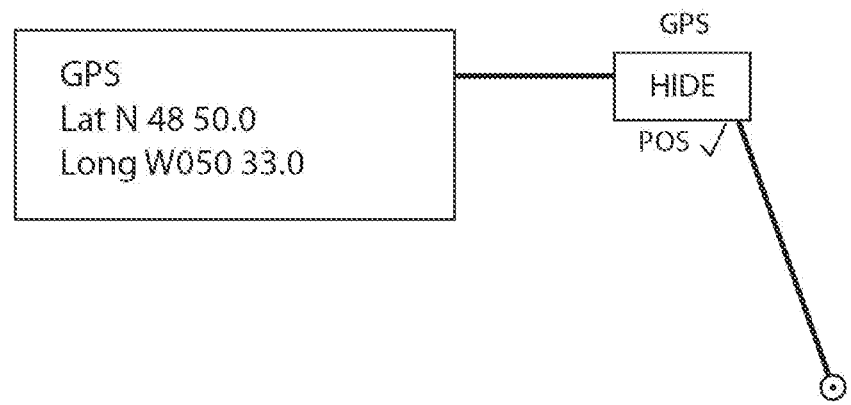
Figure 18 - Navigation System Position Check Sensor Listing
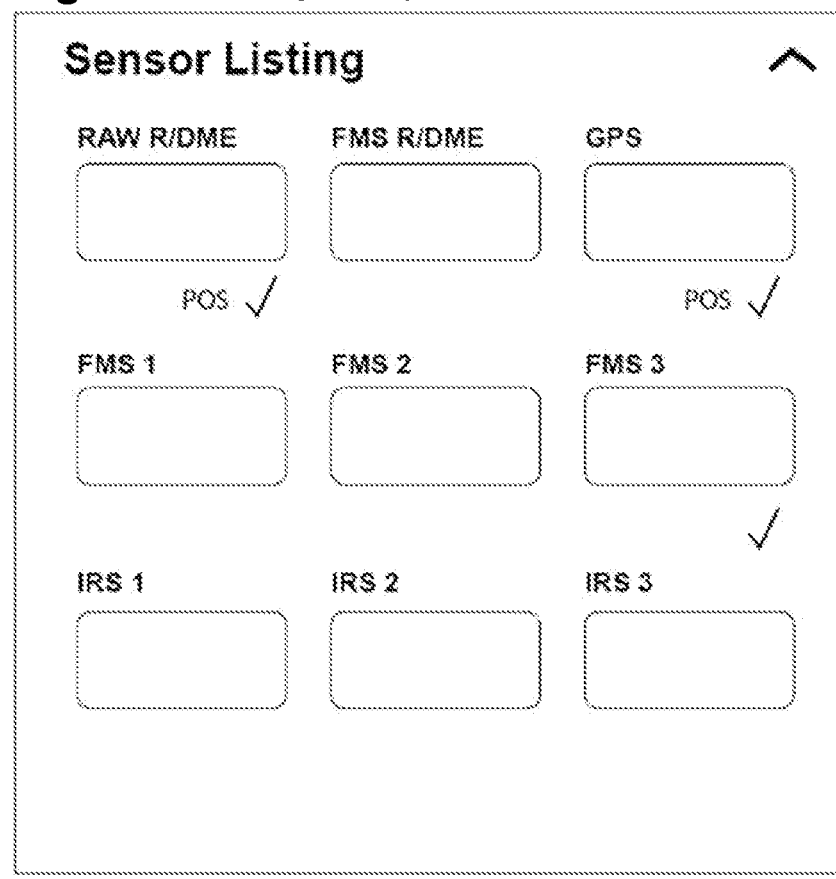

Figure 19- Flight Planning Checklist

Figure 20 - Preflight Checklist

| Preflight (At the Aircraft Prior to Departure) | | |
|---|---|---|
| Preflight | Complete | ✓ |
| Passports | Check | ✓ |
| Logbook and MEL | Check | ✓ |
| Long Range Navigation System | Load & Verify | ✓ |
| Projected Winds | Upload (if able) | ✓ |
| Master Clock | Set to UTC or Use GPS | ✓ |
| RVSM Altimeter | Check +/- 75ft or A/C criteria | ✓ |
| HF / SELCAL | Check | ✓ |
| Present Position Coordinates | Confirm | ✓ |
| Groundspeed | Check | ✓ |

Figure 21 - Off Blocks Taxi Prior to Takeoff Checklist

| OFF Blocks Taxi Prior to Takeoff | | |
|---|---|---|
| Groundspeed | Check (During Taxi) | ✓ |
| Present Position | Check | ✓ |
| Departure Clearance | Obtain | ✓ |
| Time | Note T/O Time | ✓ |

Figure 22 - Prior to Coast Out

| Checklist name ✓ | Jump to section | ✕ |
|---|---|---|
| Scott IPC Oceanic Checklist ver 1.0 ▼ | Prior to Coast Out or Oceanic Entry ▼ | |

\+ Clear

| Prior to Coast Out or Oceanic Entry | | |
|---|---|---|
| HF Radio / SELCAL | Check | ✓ |
| Altitude Capability | Determine | ✓ |
| ETA to Outbound Gateway +/- 2 mins | Check | ✓ |
| SATCOM / Datalink | Check Operational | ✓ |
| CPDLC | Log on 10 - 25 mins prior to entry | ✓ |
| Oceanic Clearance | Obtain (Voice or Datalink) | ✓ |
| Receiving Datalink Clearance via ACARS | See ACARS Datalink Checklist in ICRH | ✓ |
| Oceanic Clearance | Load & Verify | ✓ |
| Reroutes or Amendments | See ICRH for Considerations and Action Items | ✓ |
| RNP | Check RNP Value set in FMS | ✓ |
| Nav System Position Accuracy | Check | ✓ |
| Weather | Update if Needed | ✓ |
| Altimeters | Verify within 200'... log result | ✓ |
| Cruise MACH | Establish | ✓ |
| Compass Heading | Check (if INS Only) | ✓ |
| Approaching First and All Waypoints | Uncheck All | |
| CPDLC | Confirm Next Data Authority (NDA) | ✓ |

Figure 23 - Approaching Waypoints Checklist

Figure 24 - Enroute After Passing Each Oceanic Waypoint
Figure 25 - Coast In Checklist

Figure 26- 10 Min Check
Figure 27- 10 minute check as posted on plotting chart
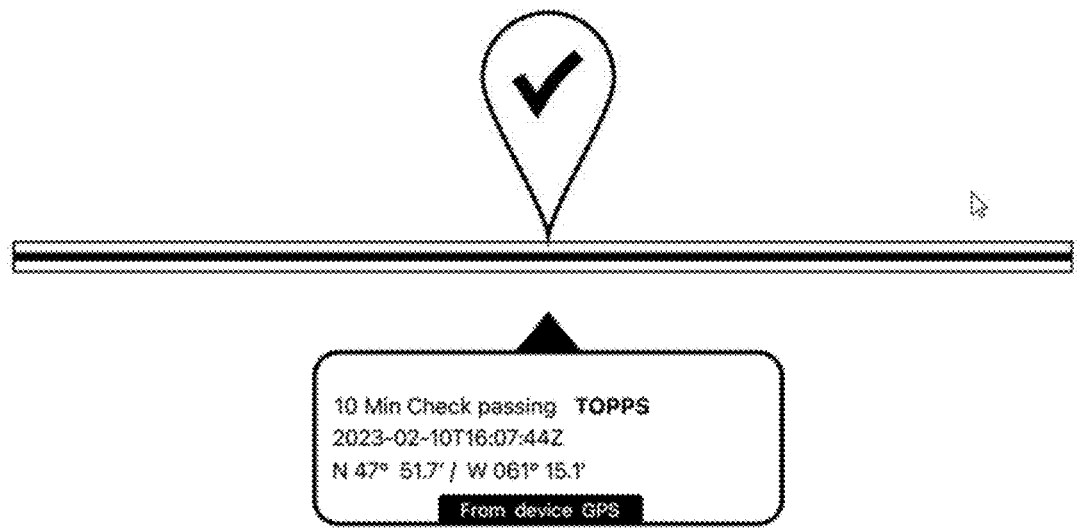

Figure 28A - Waypoint Position Report Form

Figure 28B - Waypoint Position Report Form (cont...)

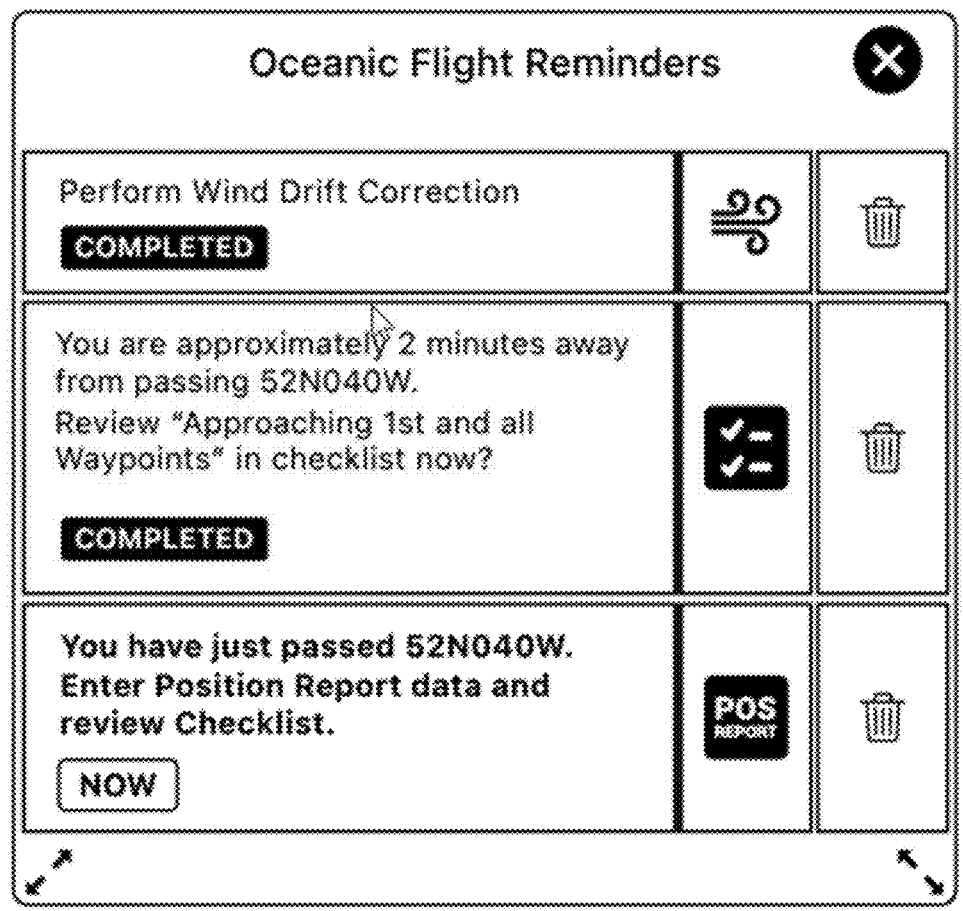
Figure 28C - After Passing Waypoint Reminder

- Table Position Report Form. "+" adds another column

Figure 29B - Table Position Report Form additional rows

| | | | | | | |
|---|---|---|---|---|---|---|
| DATE | 01 25 23 | POSITION REPORT FORM | | | | ✖ |
| A/C IDENT | N767FL | SELCAL | | ■ Clear All | | * = REQUIRED |

*If a report is not in the correct location, drag the column to the desired position in the form*

| | | | | | | |
|---|---|---|---|---|---|---|
| OCA Freqs | | P | S | P | S | P |
| Additional Freq | | | | | | |
| FUEL | | | | | | |
| Planned Fuel | | lbs | | lbs | | |
| Actual Fuel | | lbs | | lbs | | |
| Running Fuel Adjustment | | | | | | |
| MET *if required* | | | | | | |
| Temp | | SAT | TAT | SAT | TAT | SAT TA |
| Wind Dir/Spd | | / | | / | | / |
| Turb | | Select | | Select | | Select |
| Icing | | Select | | Select | | Select |
| MIDPNT WX | | | | | | |
| Temp | | SAT | TAT | SAT | TAT | SAT TA |
| Wind Dir/Spd | | / | | / | | / |
| At | | | | | | |
| Altimeters | | #1 #2 STBY | | #1 #2 STBY | | #1 STBY |
| Time Sent | | z HHMMz | | z HHMMz | | z |
| 10 Minute Check | | ☐ | | ☐ | | ☐ |

➕

Figure 30 - Custom Keypad for the Position Report Form
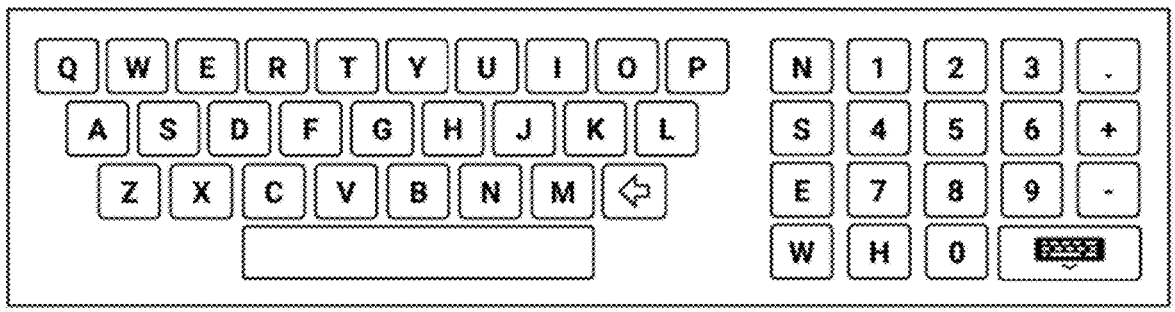
Figure 31 - Plot Position by Lat/Long with custom keypad
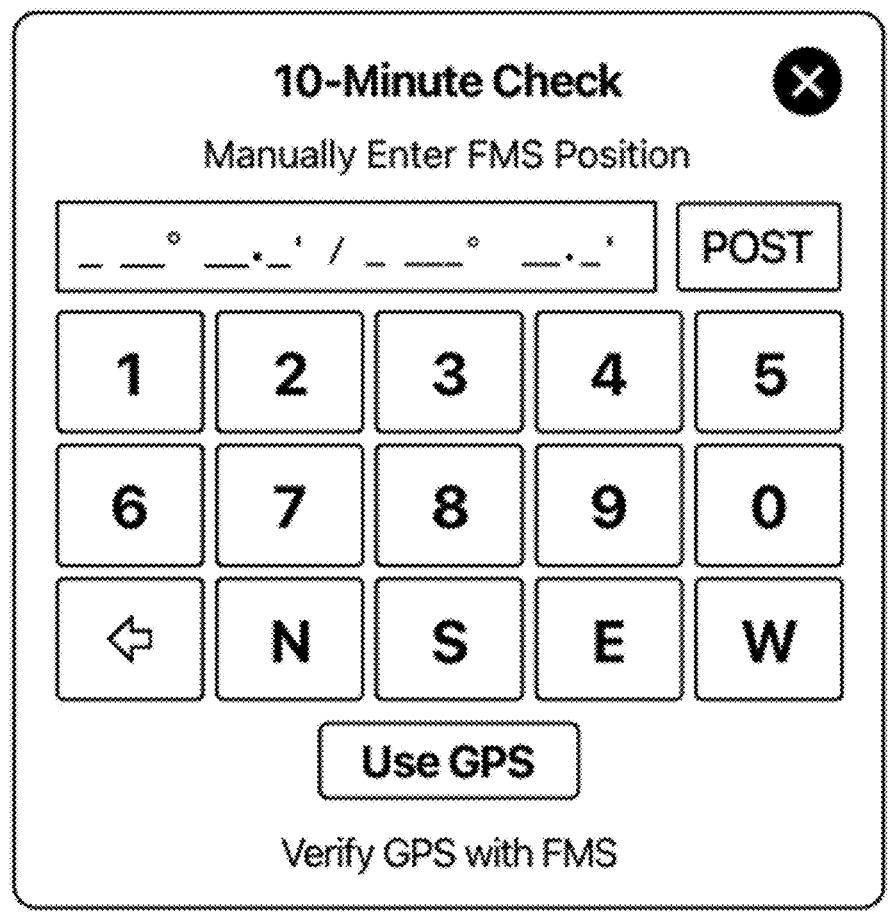

Figure 32- Distance Tool
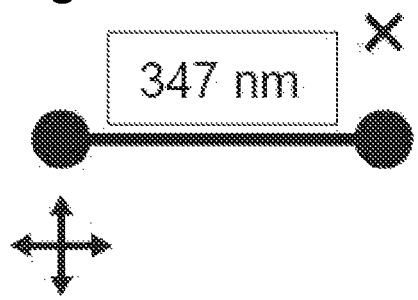
Figure 33- Annotation tool menu
Figure 34- ETP Depiction on route once processed, with labels included.
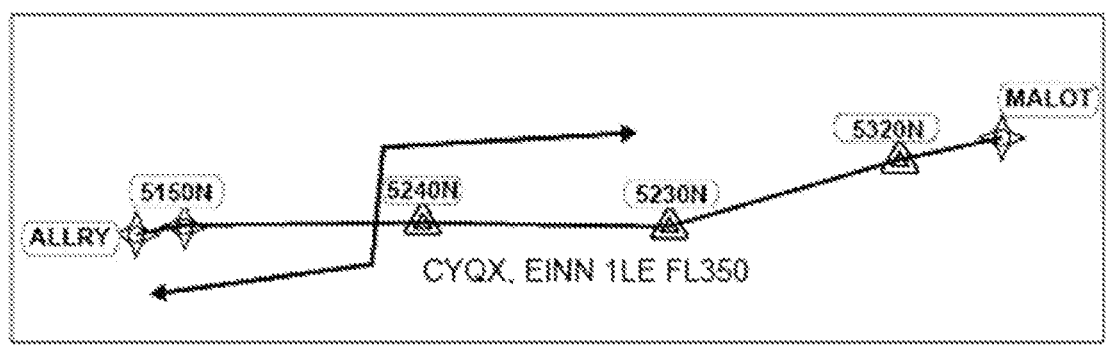

Figure 35- Two ETPs on a route depiction on Plotting Chart, with labels.
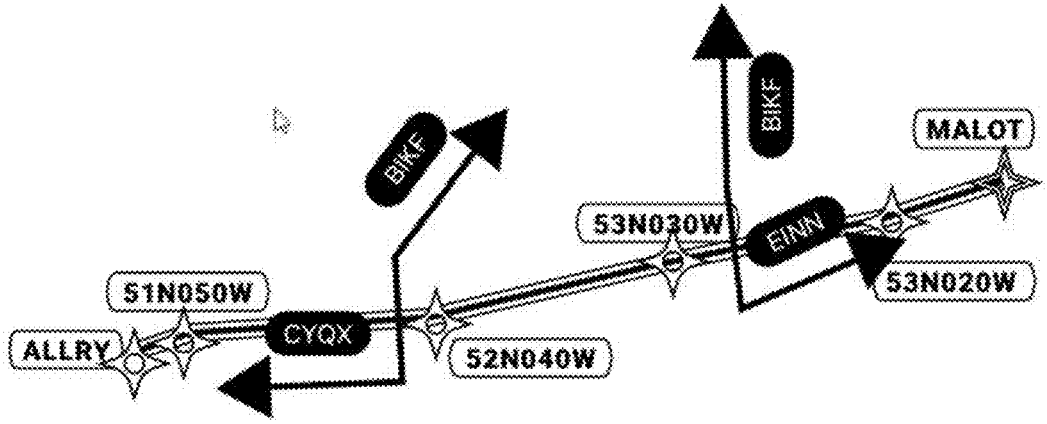
Figure 36a- Automatically build ETPS by programmatically reading flight plans.
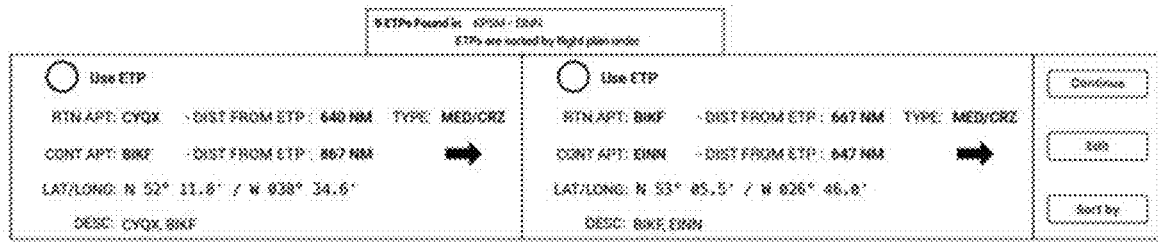
Figure 36b- ETPs by LAT/LONG data entry form presentation.

Figure 37- ETPs AUTOBUILD entry form
Figure 38a- Exact ETP- line bisecting the route indicates position of ETP.
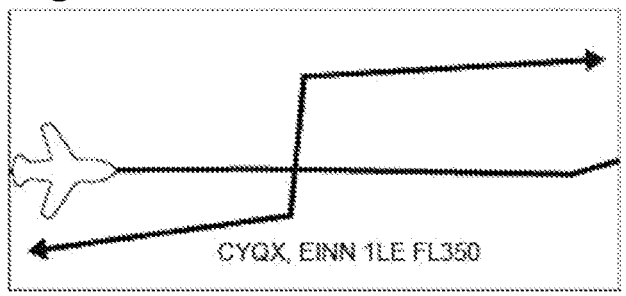

Figure 38b. Custom Keypad for entering ETPs
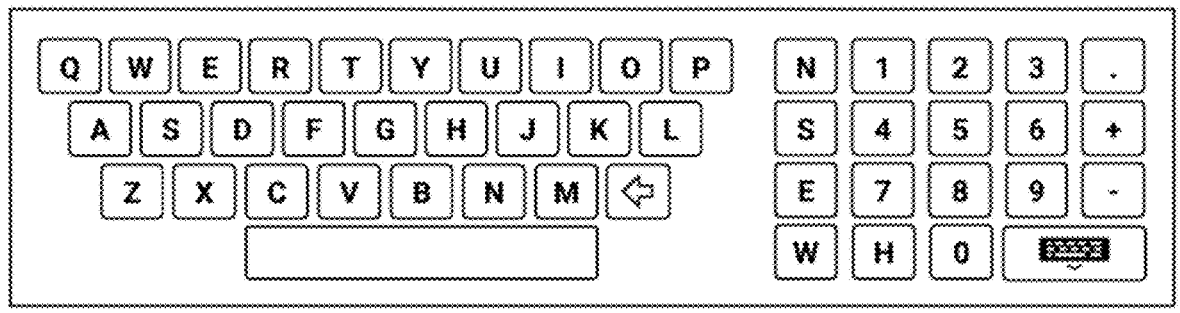

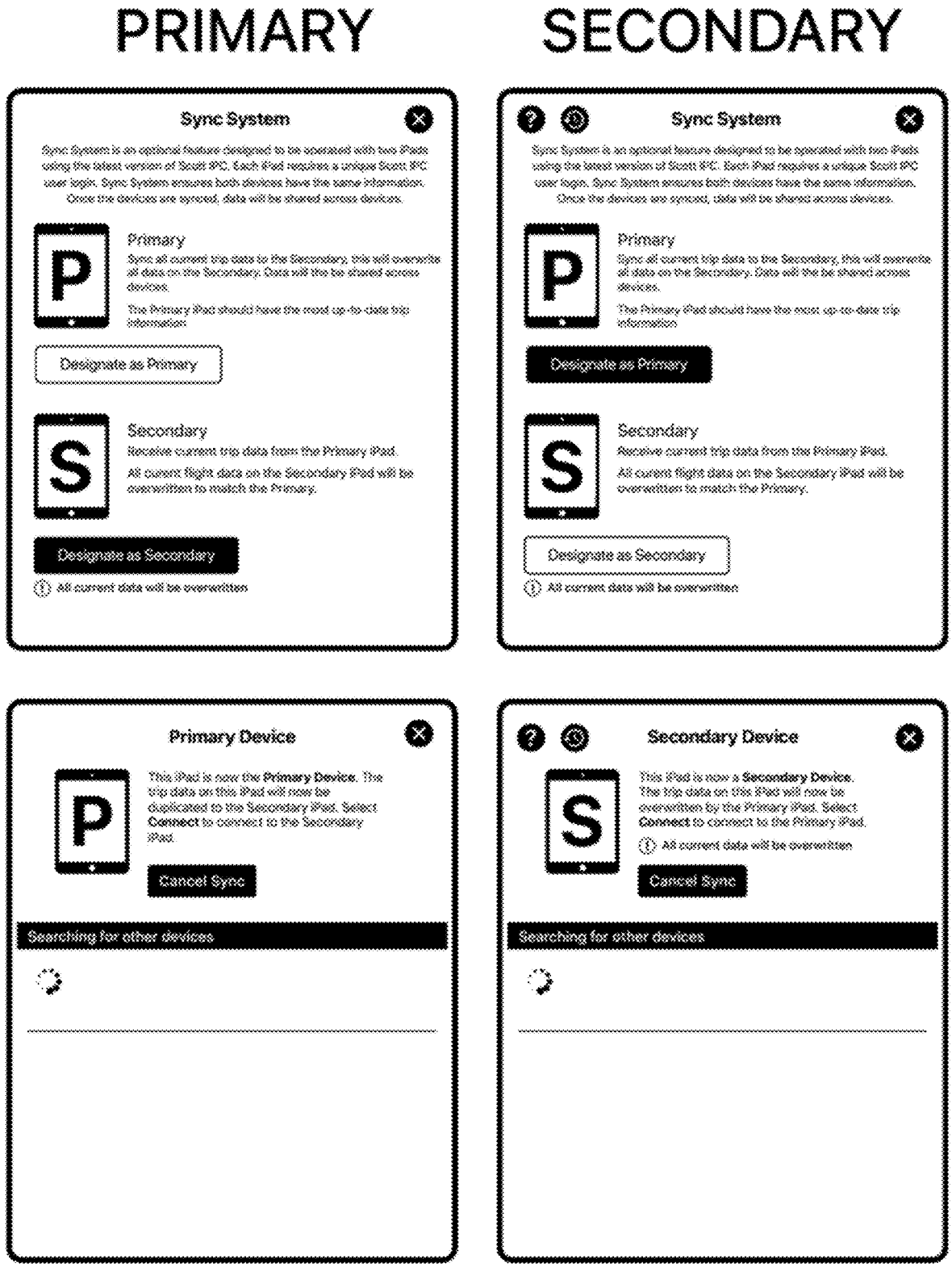
Figure 39A - Sync Process for UI (1 of 2) (light colored buttons "Designate as Primary" left and "Designate as Secondary" right represent the selected state.

Figure 39B - Sync Process for UI (2 of 2)

Figure 40- Primary Icon
Figure 41- Secondary Icon
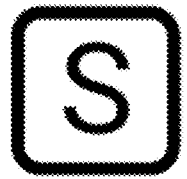
Figure 42A- Previous Primary icon of syncing
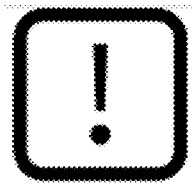
Figure 42B- Previous Secondary icon of syncing
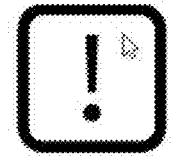

Figure 43- Not Synced icon
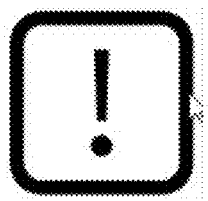
Figure 44a- Connection Process for linking Scott IPC navigation tools.
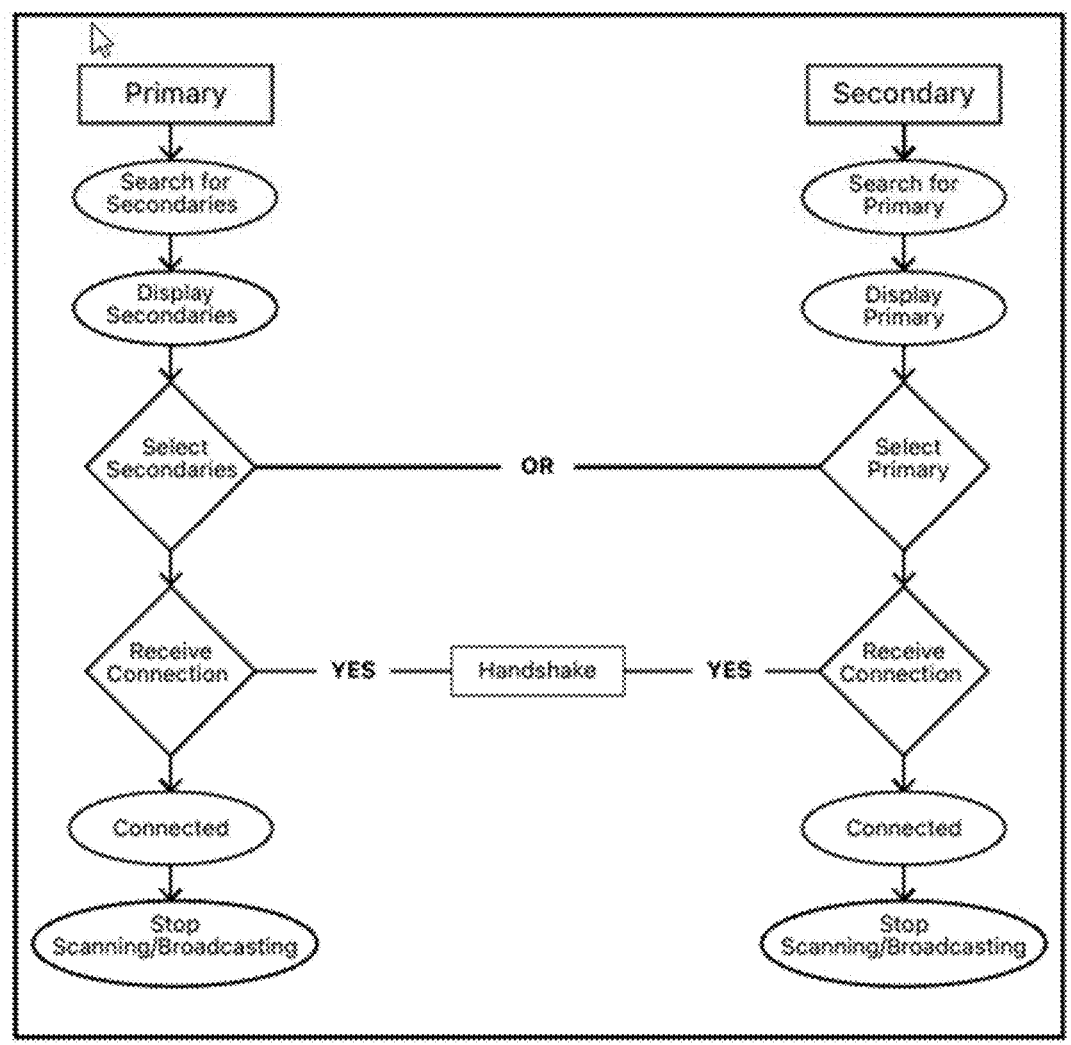

Figure 44b - Database Updating for Synced devices
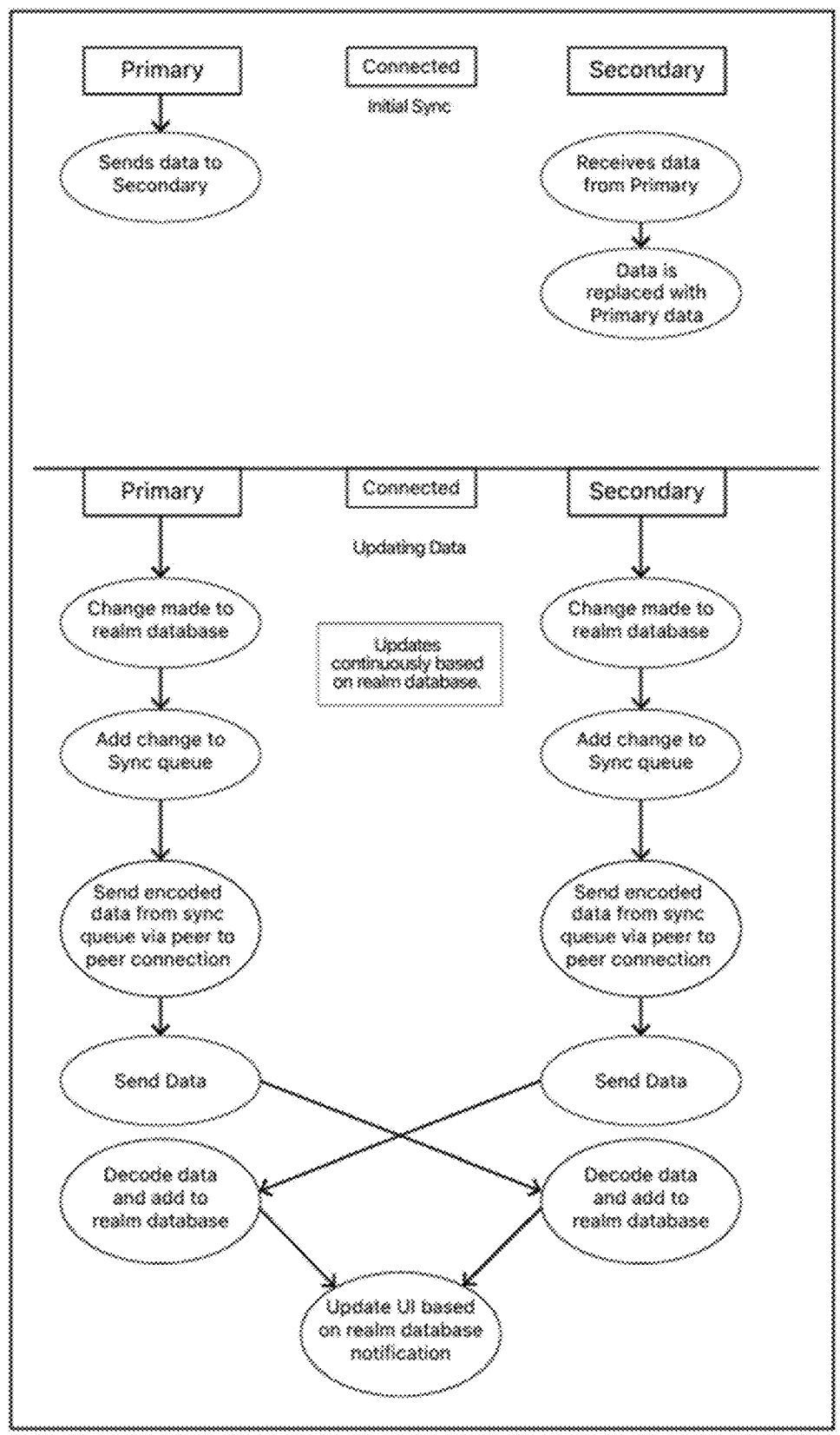

Figure 45a - Sync Transfer Primary Role to other device
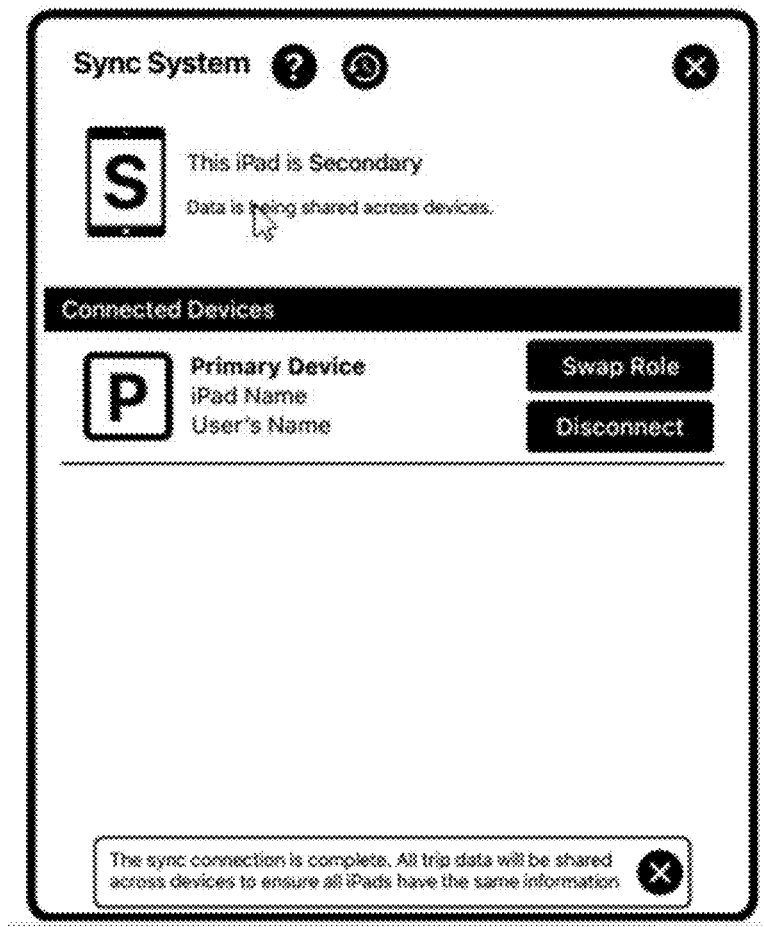
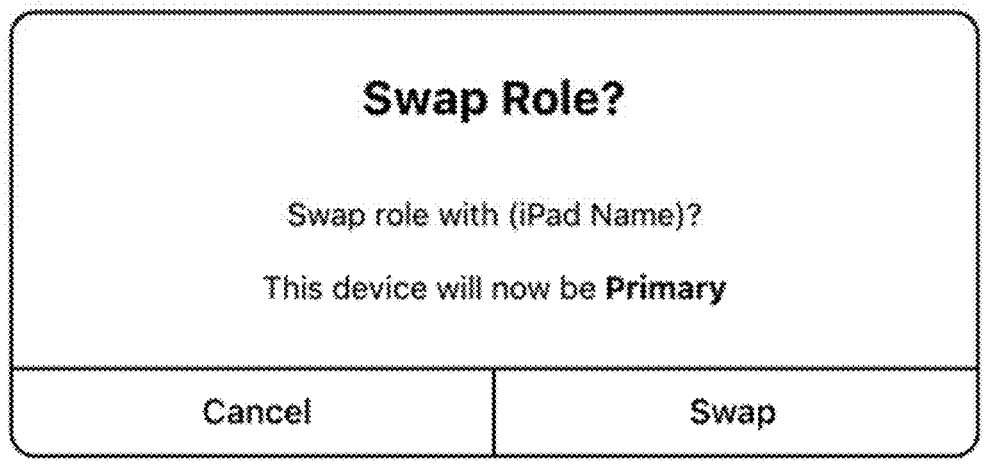

Figure 45B - Sync Auto Reconnect

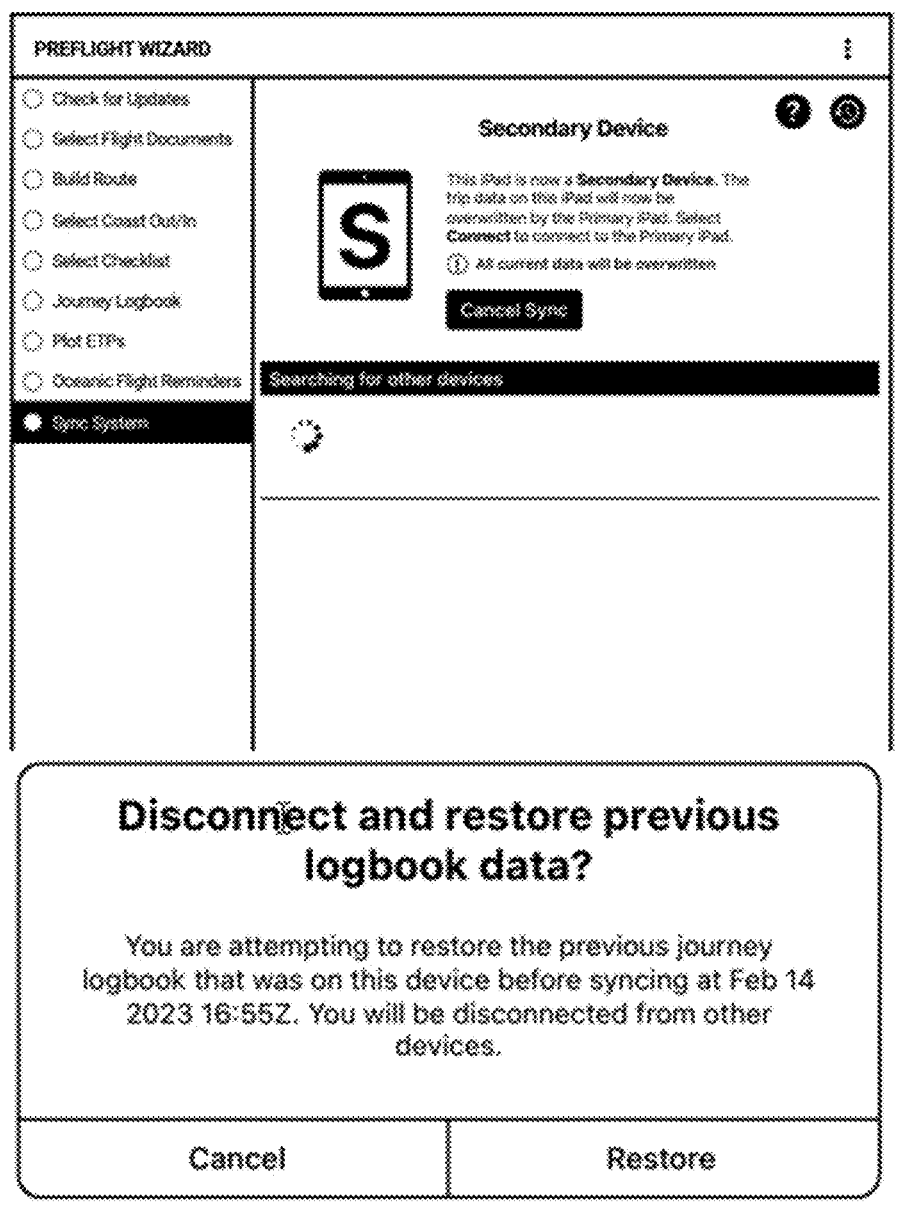
Figure 45C - Sync Auto Restore Overwritten Flight Data

Figure 46A - Route Details shown on route segment with GPS active
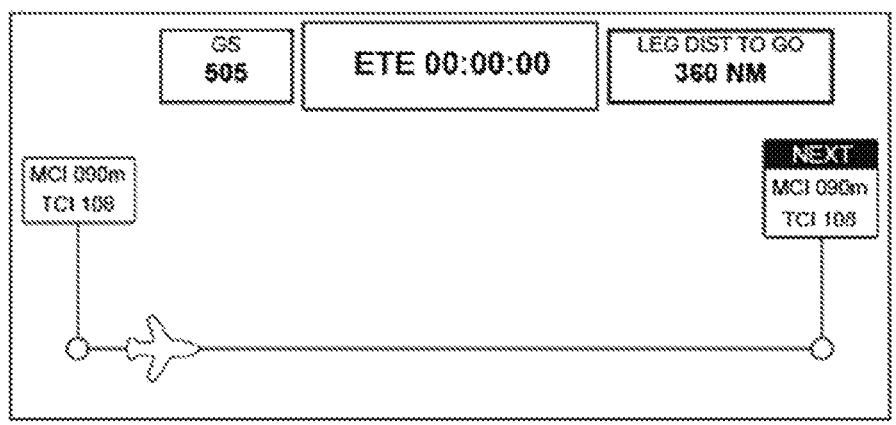

Figure 47 - GPS Timestamp
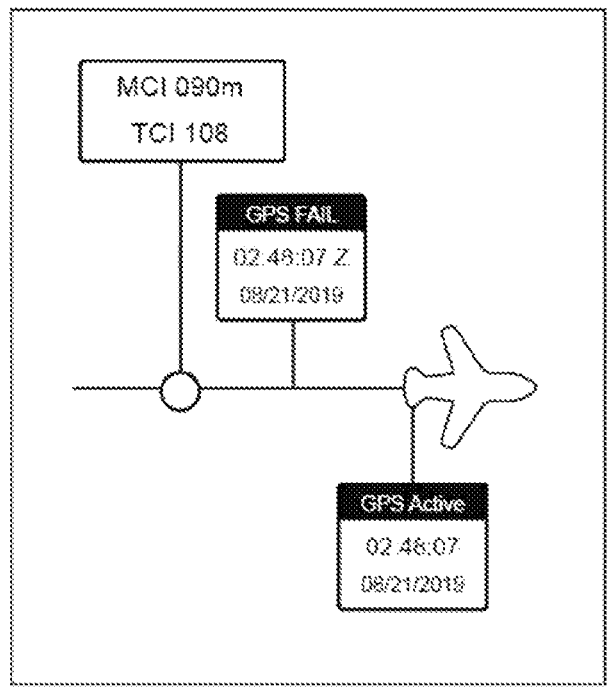
Figure 48 - Wind Correction Entry Form and Plotting Chart Stamp
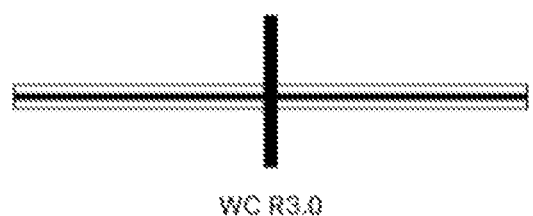

Figure 49- Selectable Layers
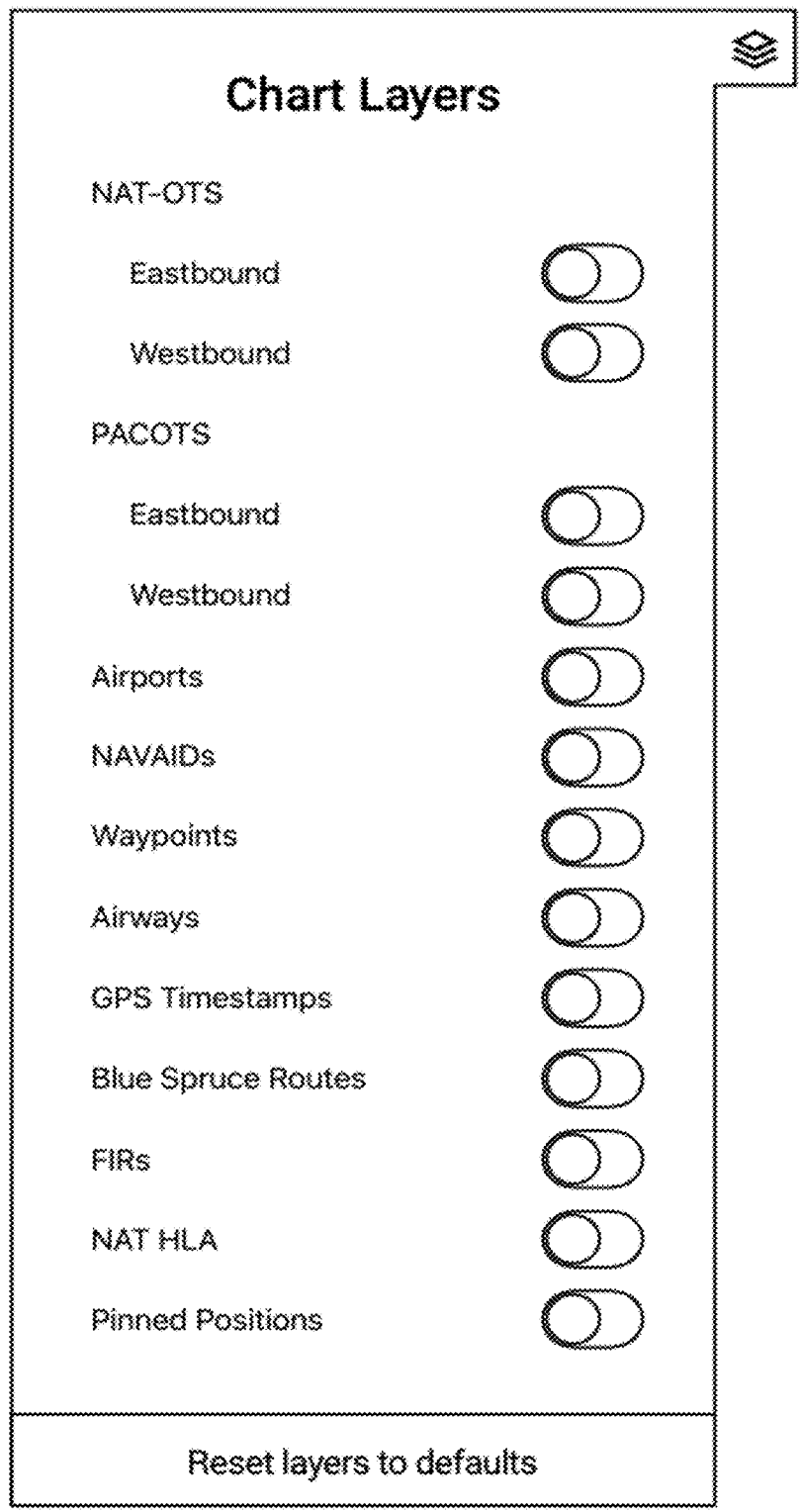

Figure 50- Track Message Icon- to select viewing of a full Track Message.
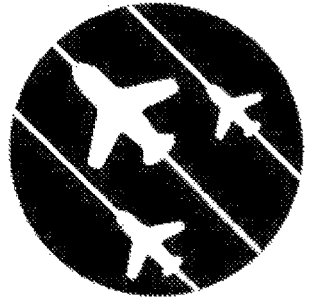
Figure 51- Auto Distance Layer depiction of distances for legs on Plotting Chart when Auto Distance tool is enabled
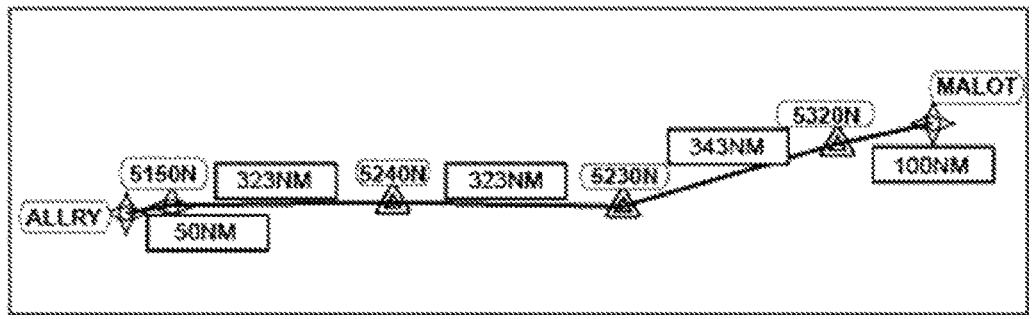
Figure 52- Speed-Distance Time Calculator

Figure 53- Freeplay Message
YOU ARE NOW IN FREEPLAY MODE - GPS INACTIVE
Figure 54- Freeplay Screen Controls
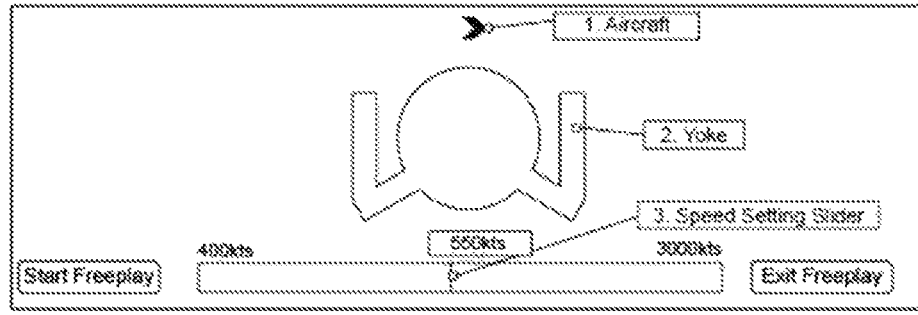
Flag 1- Yoke
Flag 2- Speed Setting Slider
Flag 3- Red Chevron to represent aircraft

Figure 55A Journey Logbook Entry Form - Flight Information, Actuals, Nav Systems Verification

Figure 55B Journey Logbook Entry Form - Sensors/Systems and Altimeters

Figure 55C Journey Logbook Entry Form - ATIS, Clearances

Figure 55D Journey Logbook Entry Form - Notes, Photos, PDFs

Figure 56- form for designating e-mail recipients of a PDF of completed Journey Logbook, utilizing Apple share arrow.
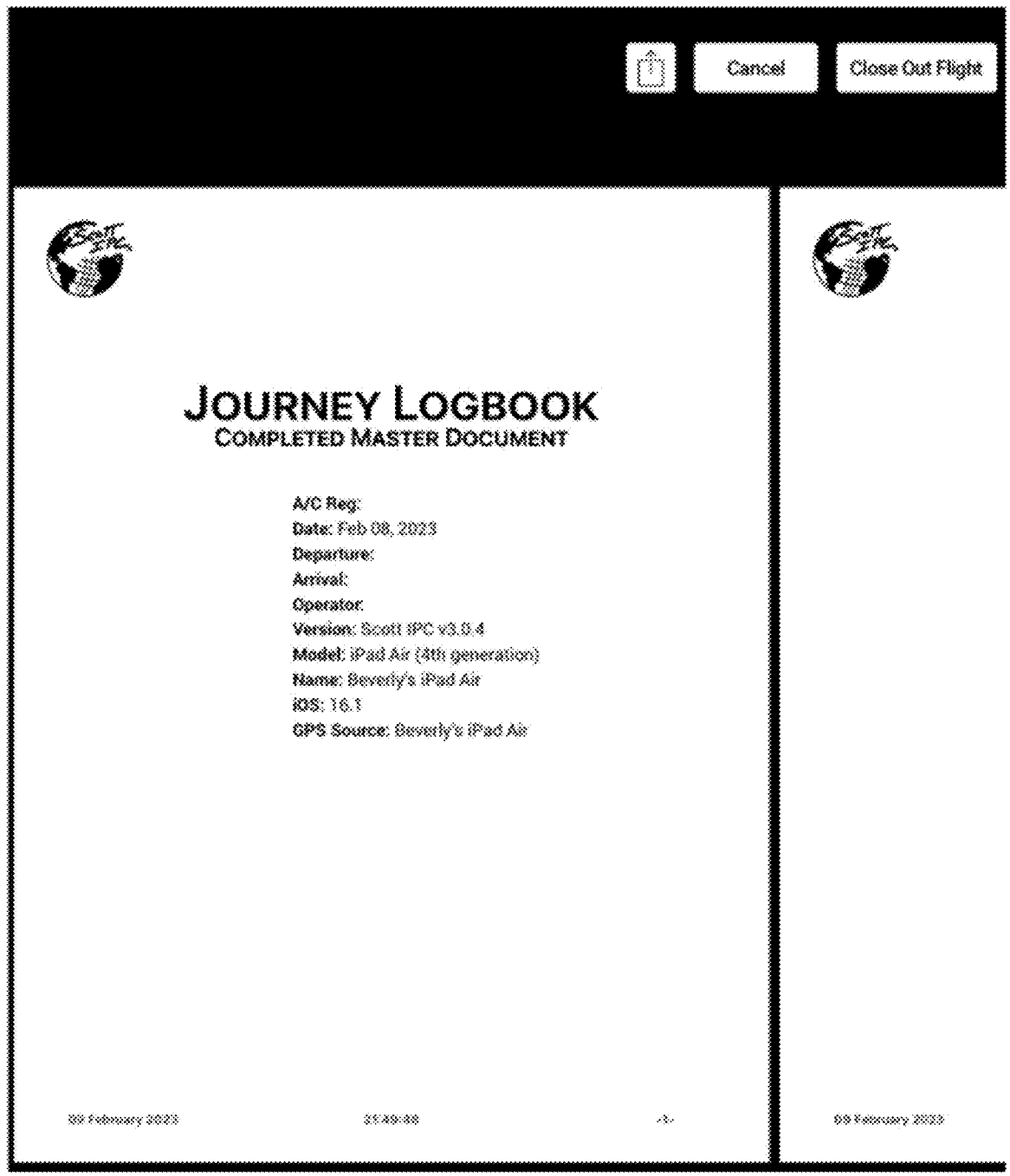

Figure 57a Journey Logbook Restore and Edit Past Flight Data - Step 1, tap Restore Previous Flight Data.
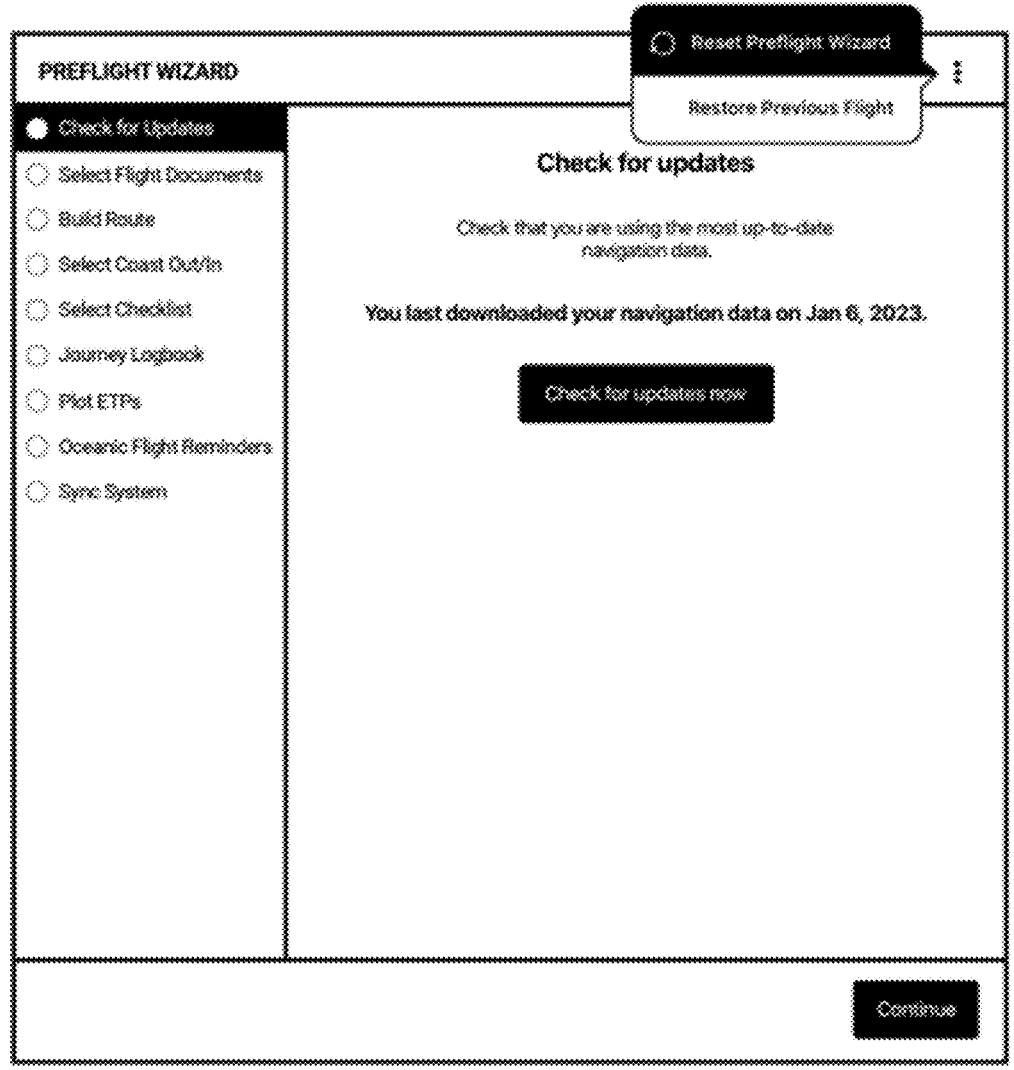

Figure 57b Journey Logbook Restore and Edit Past Flight Data - Step 2, select a flight to restore by tapping on it.

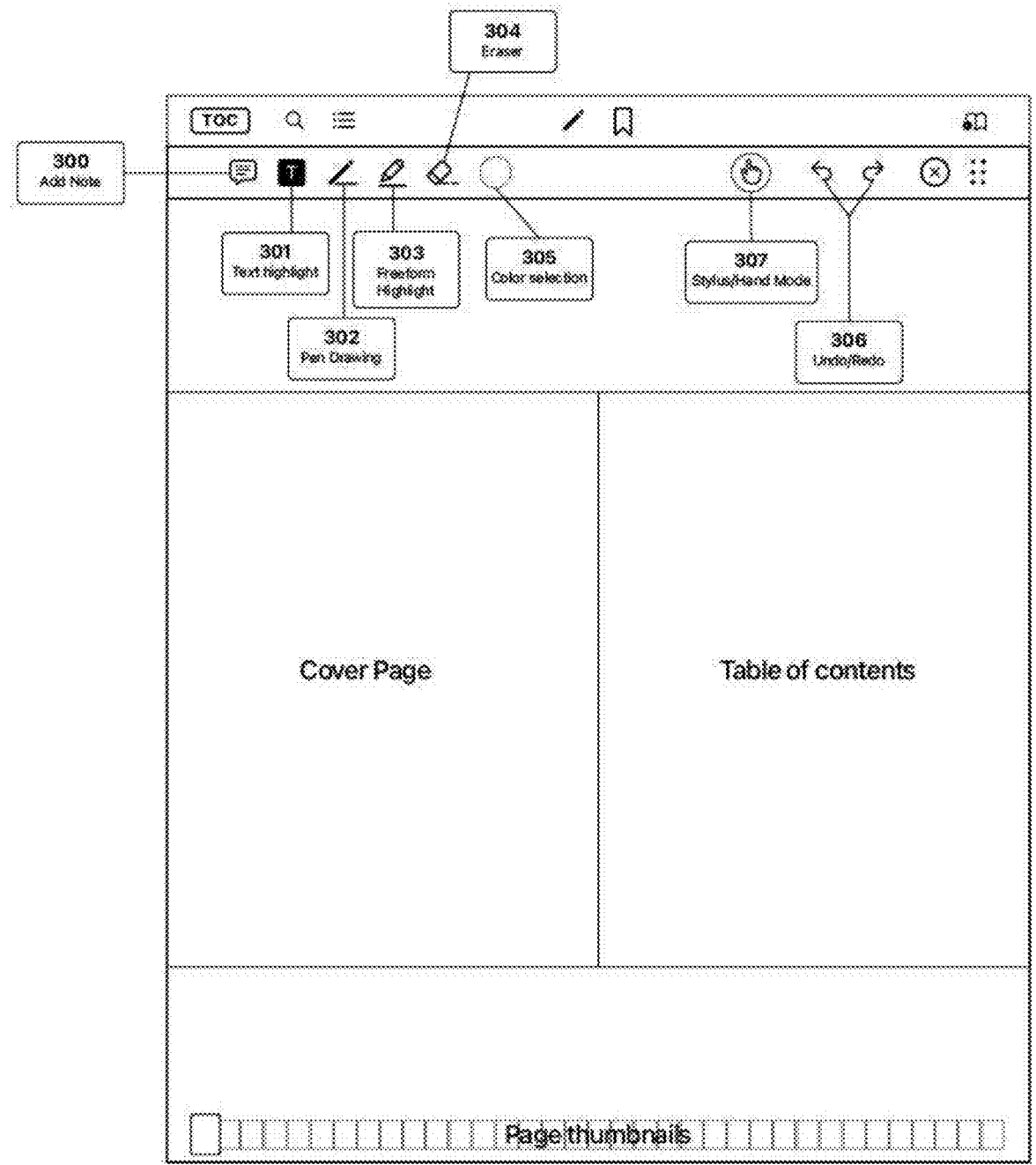
Figure 58 Integrates Scott IPC ICRH (International Cockpit Reference Handbook)

Figure 59 - Zoom Level 1 Up to 80 degrees North latitude
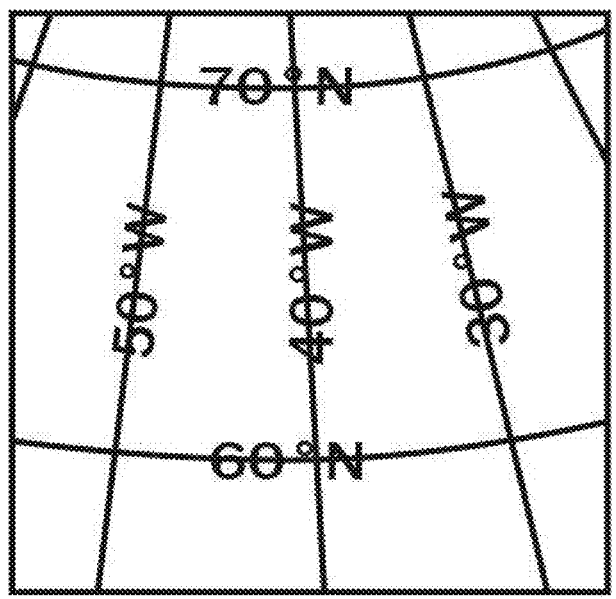
Figure 60 Zoom Level 1 From 80 to 90 degrees latitude
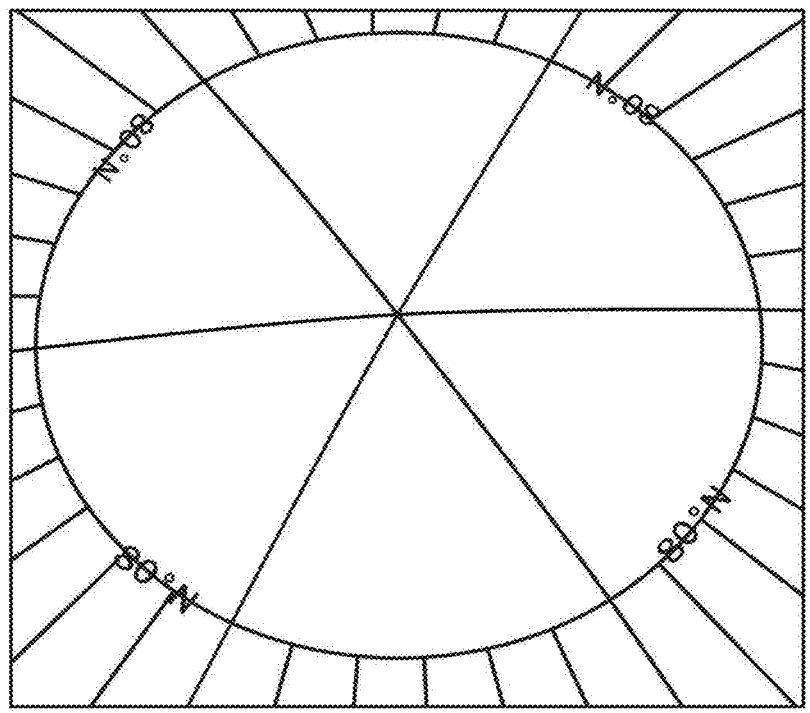

Figure 61A Zoom Level 2 Up to 80 degrees Latitude
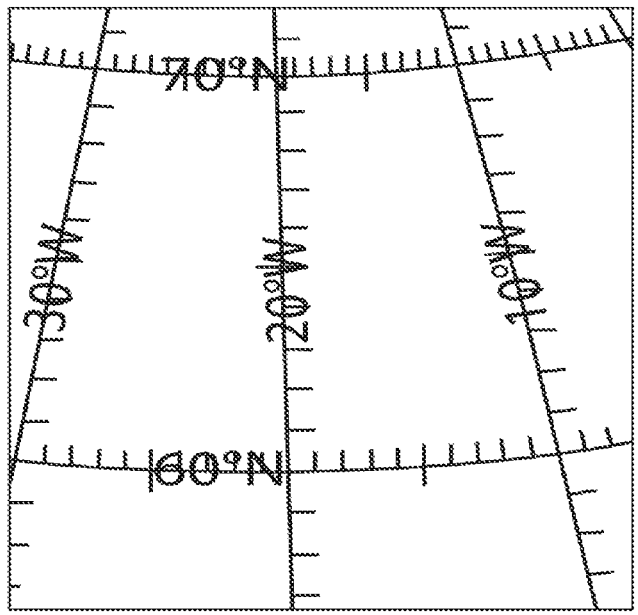
Figure 61B- Zoom Level 2 From 80 degrees latitude
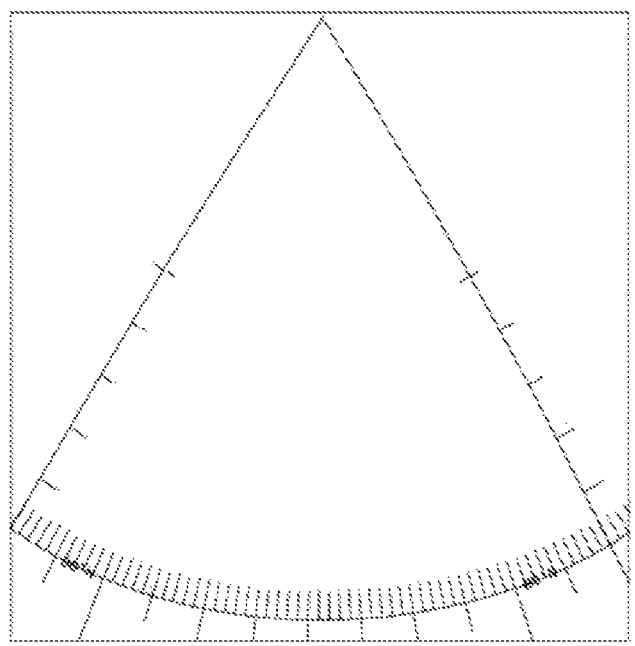

Figure 62 Zoom Level 3 Up to 70 degrees latitude
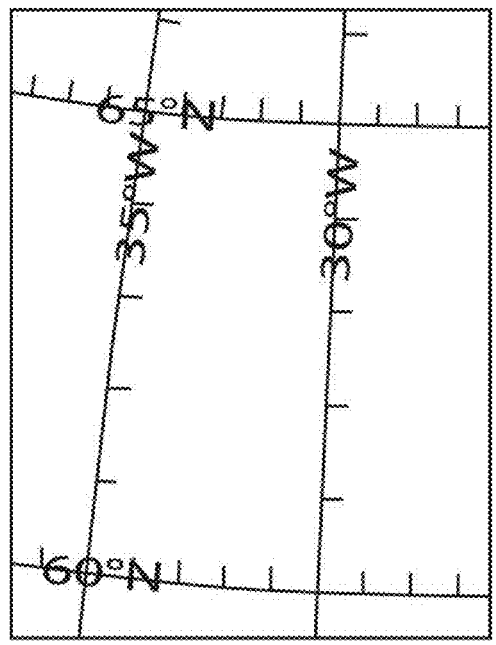
Figure 63 Zoom Level 3 from 70 to 80 degrees latitude
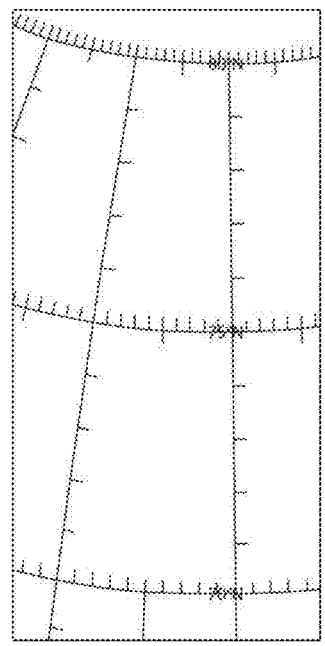

Figure 64 Zoom Level 4 Up to 80 deg latitude
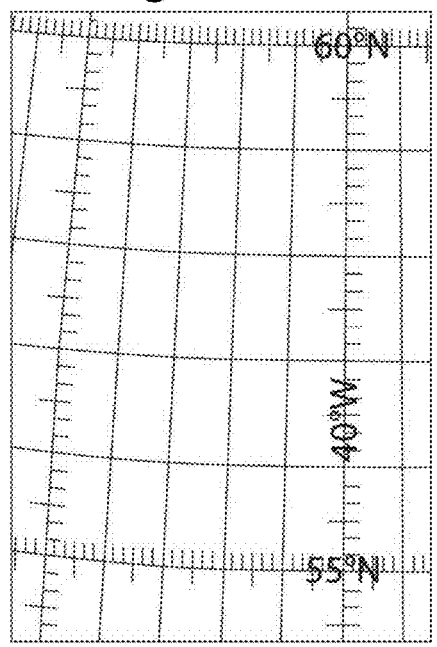
Figure 65 zoom level 5 up to 80 degrees latitude
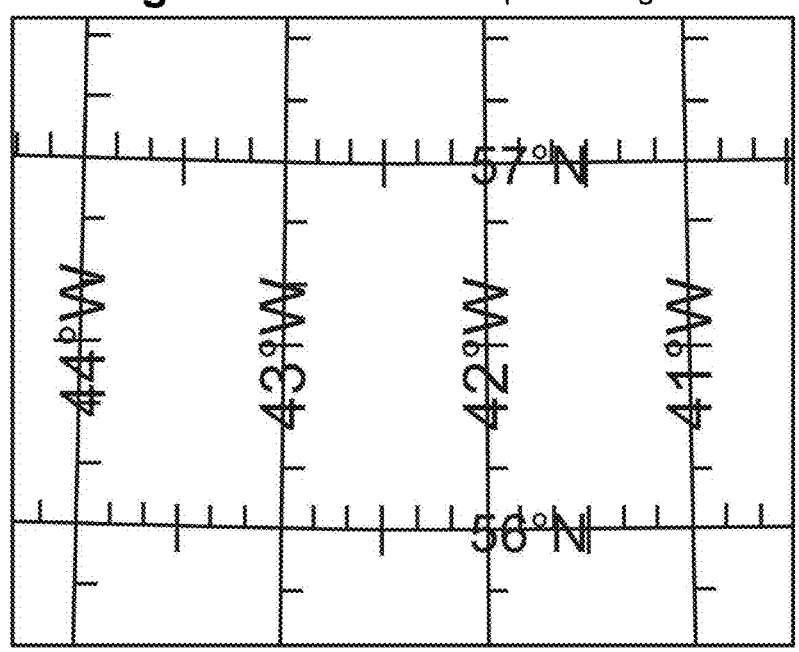

Figure 66 zoom level 6
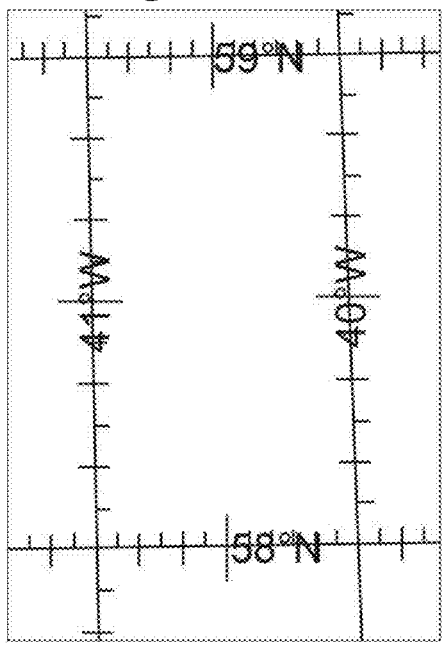
Figure 67 zoom level 7
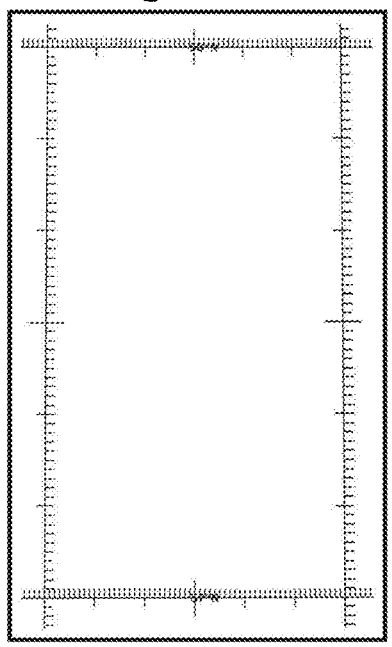

Figure 68. Present Position (PP) Direct to entry form

For LAT/LONG: N 48 00.0' / W 050 00.0'
Format for Named: KLAX, DOTTY 4850N = 48N 050W | H4850 30'N 050W Present Position
__ __° __ __.__' / __ __ __° __ __.__'

Named

CLR  +  ✕

To
__ __° __ __.__' / __ __ __° __ __.__'

Named

CLR  +  ✕

Post

✕ All

Figure 69 - Preflight Setup Wizard
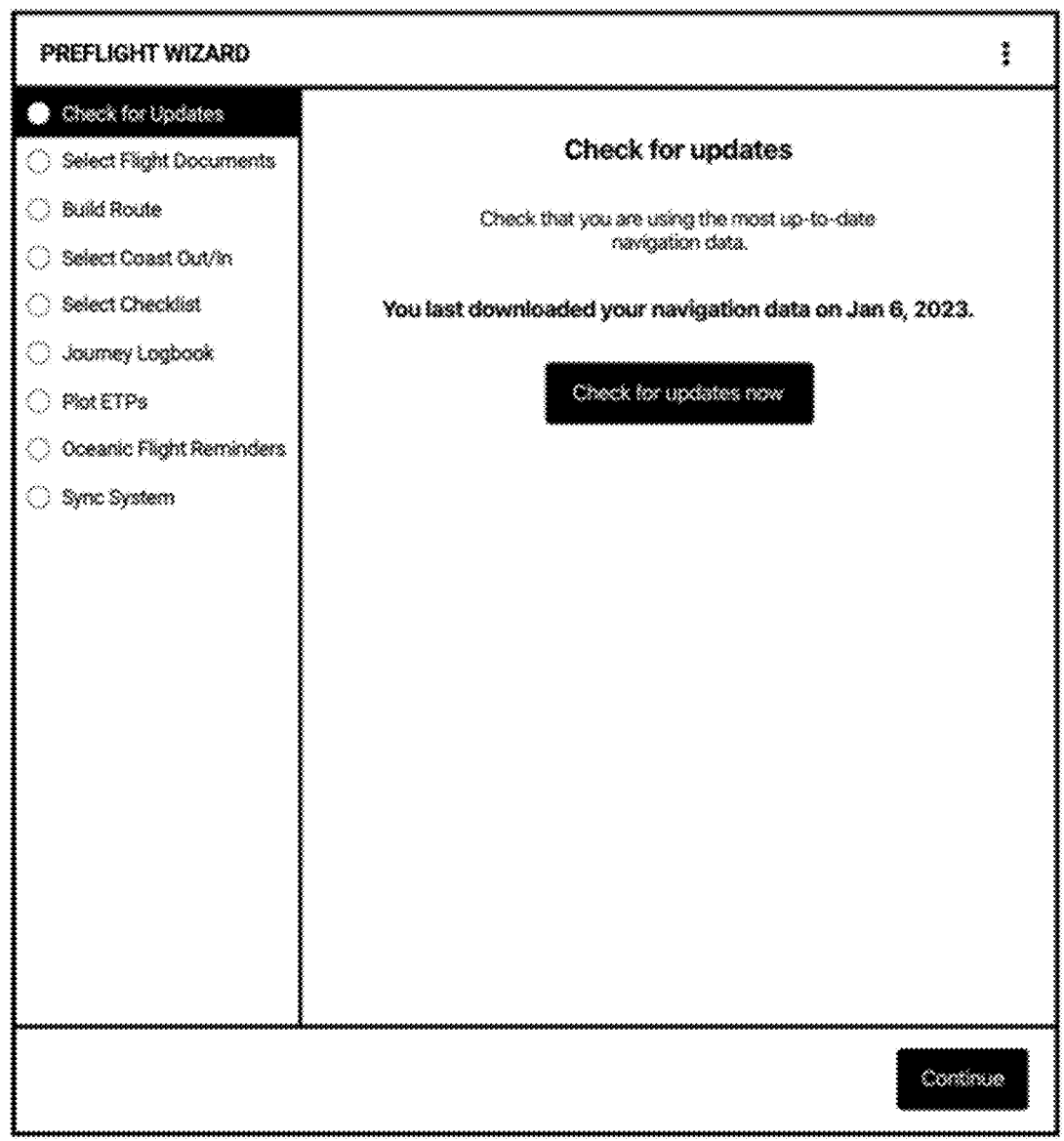

Figure 70- Preflight wizard Check for Data Updates
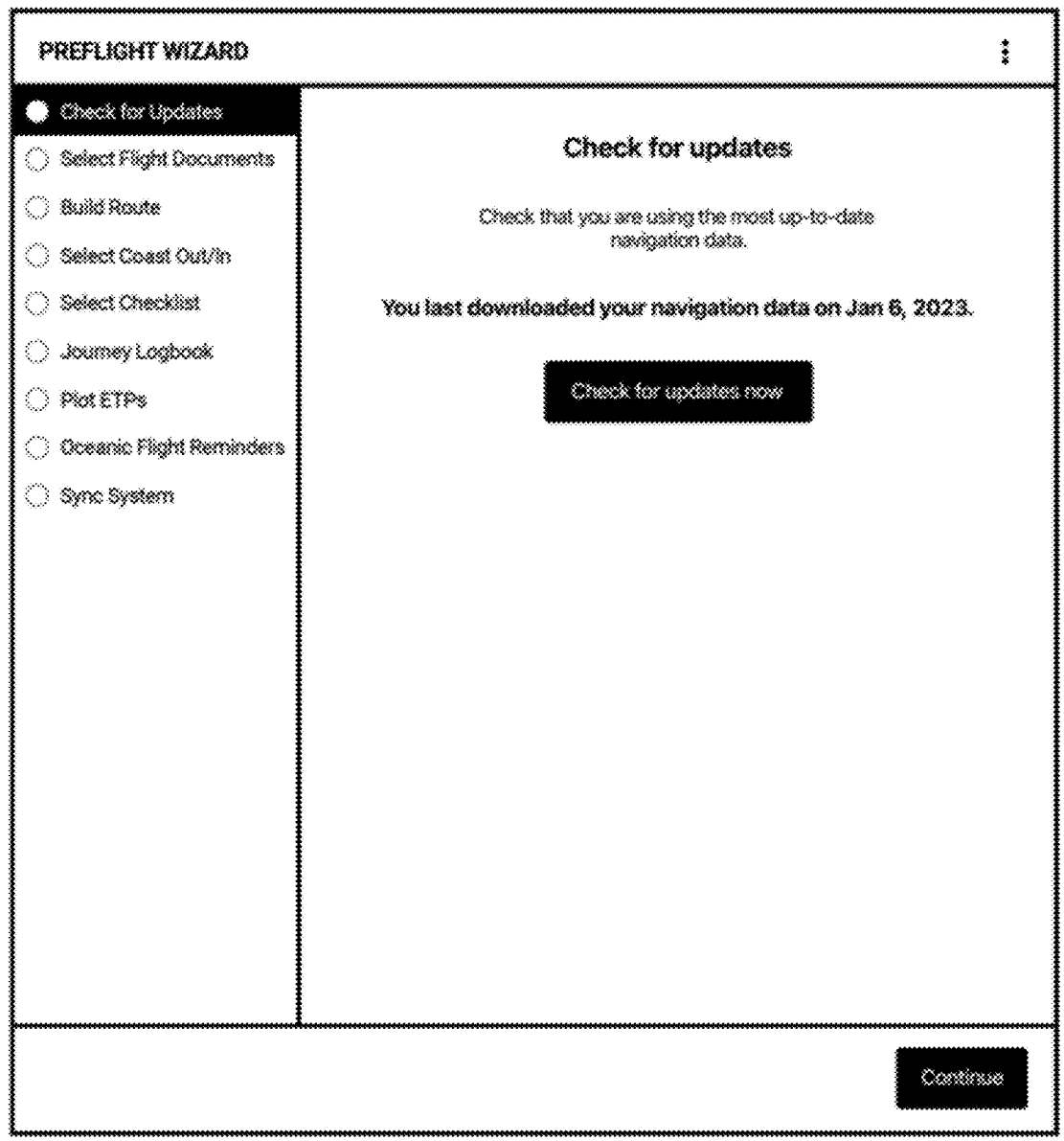

Figure 71 - Preflight Wizard Select Flight Documents

Figure 72. Preflight Wizard Build Route
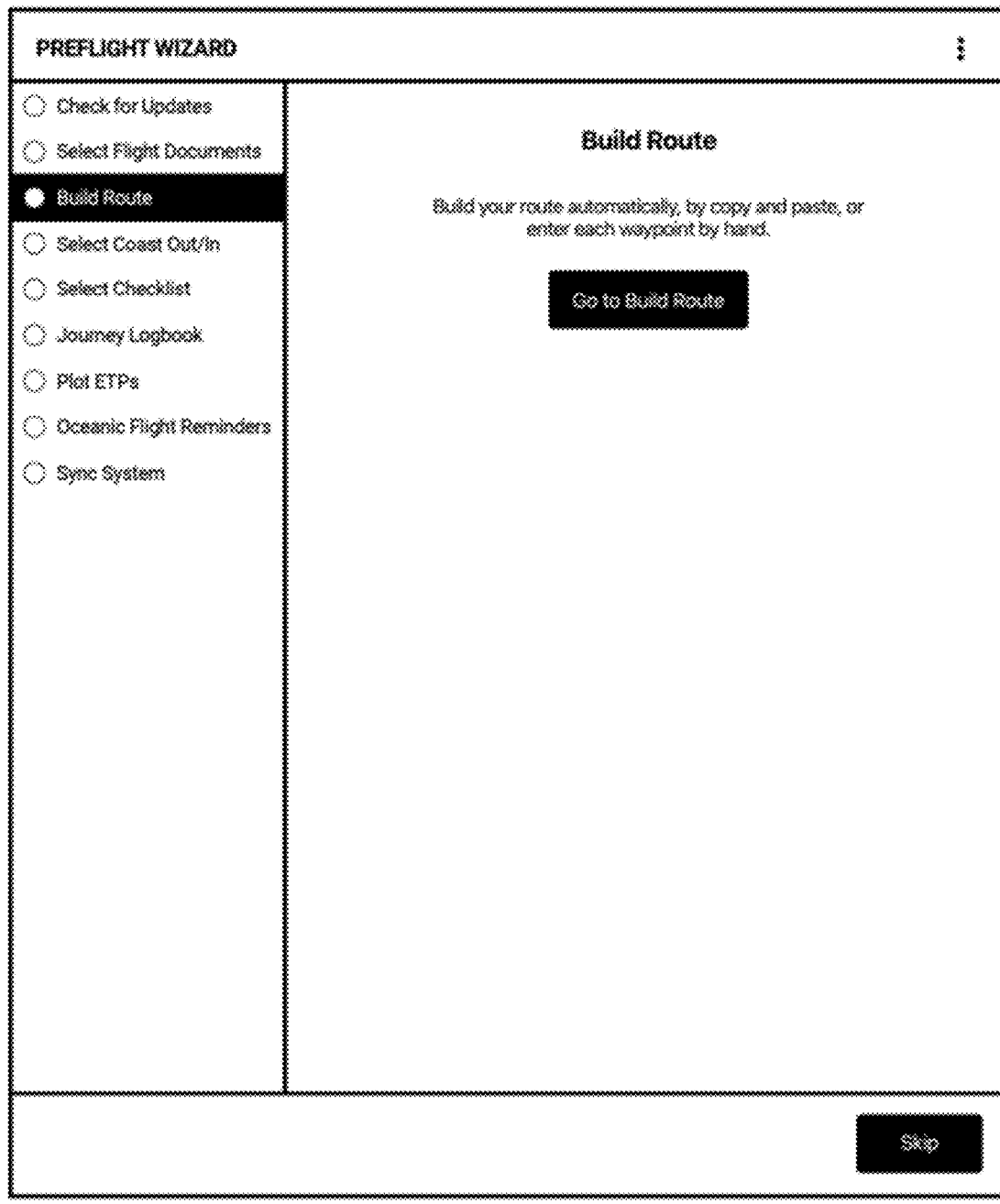

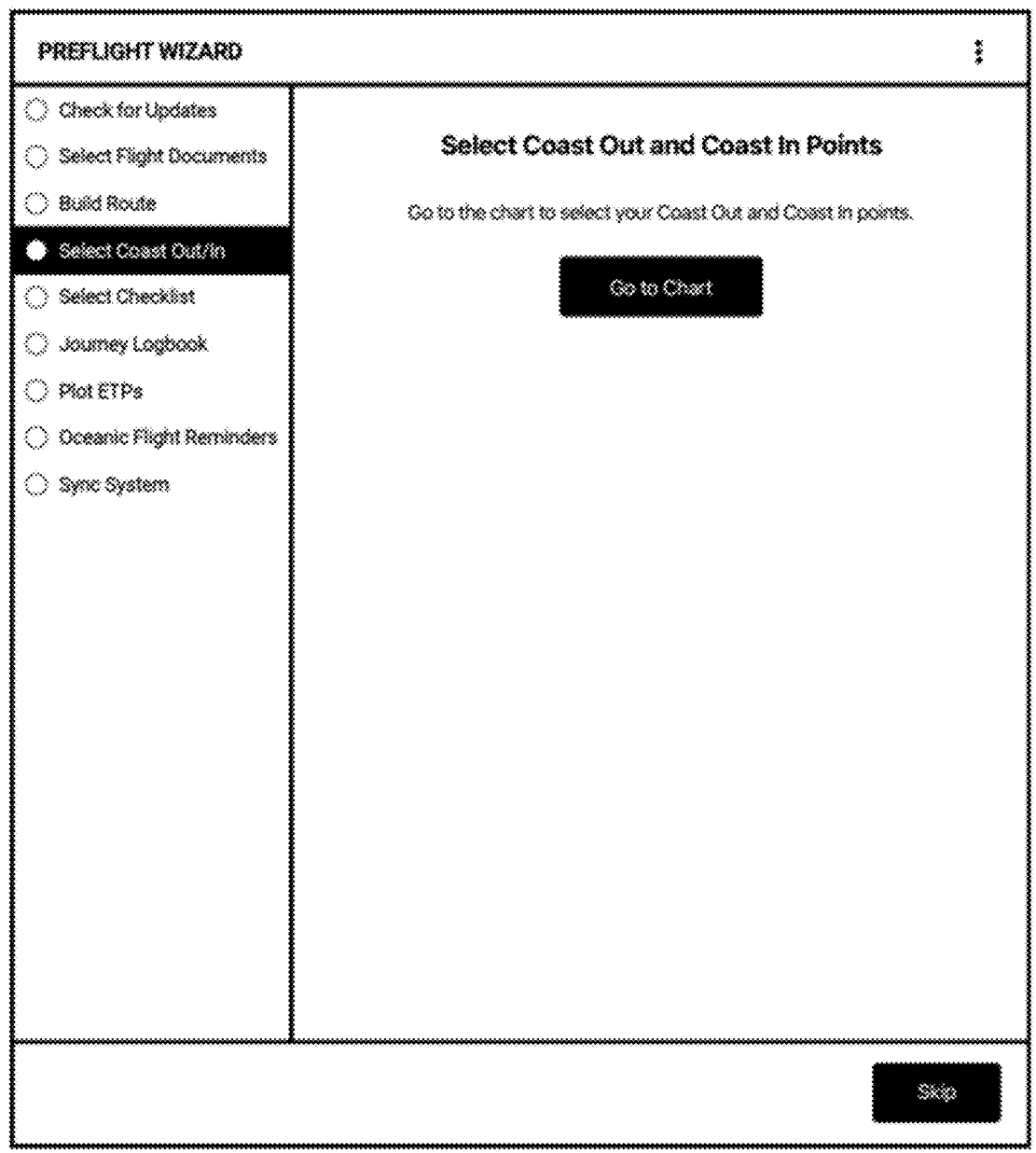
Figure 73 - Preflight Select Coast Out/In

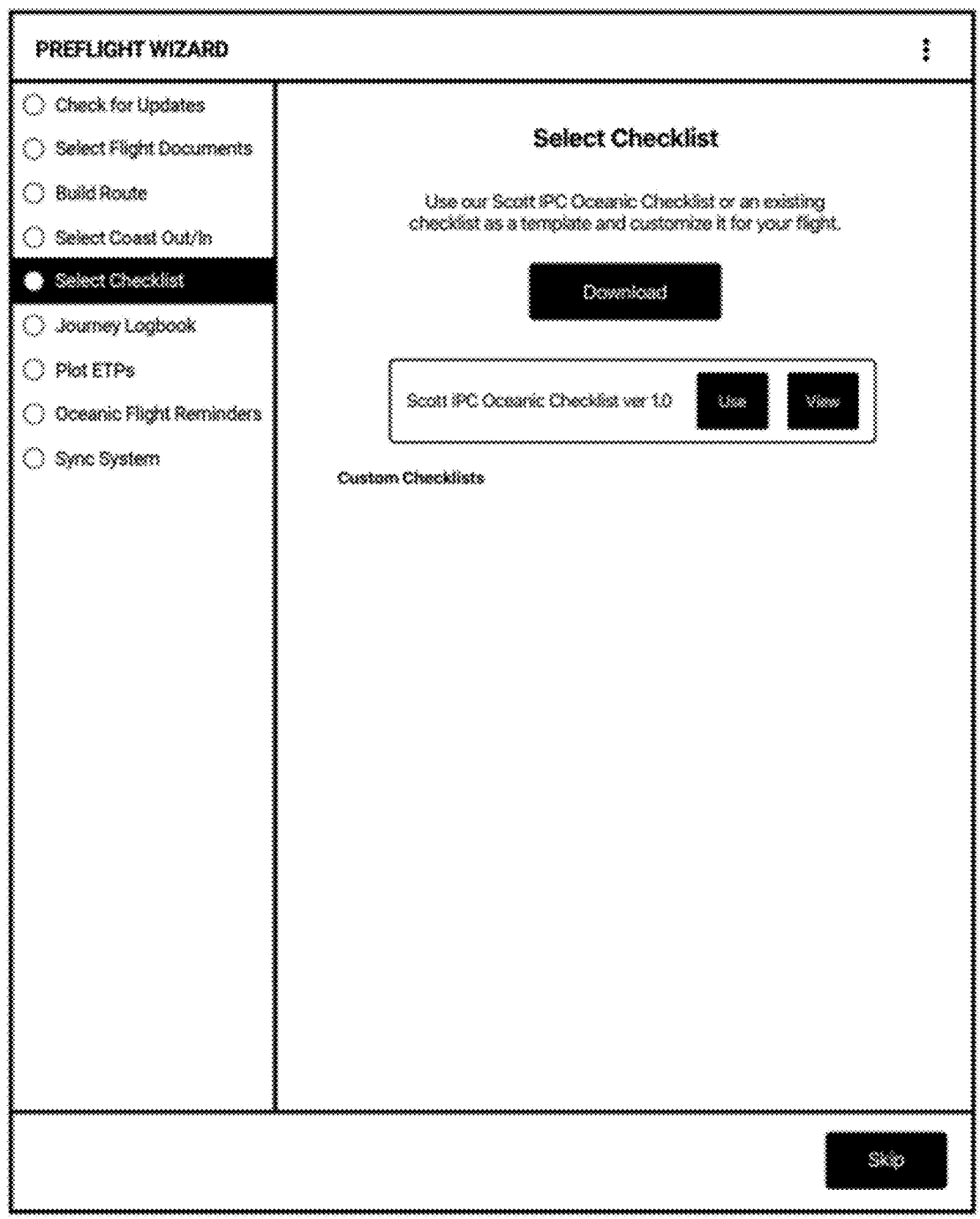
Figure 74 - Preflight Wizard Selection of Checklist to use for flight

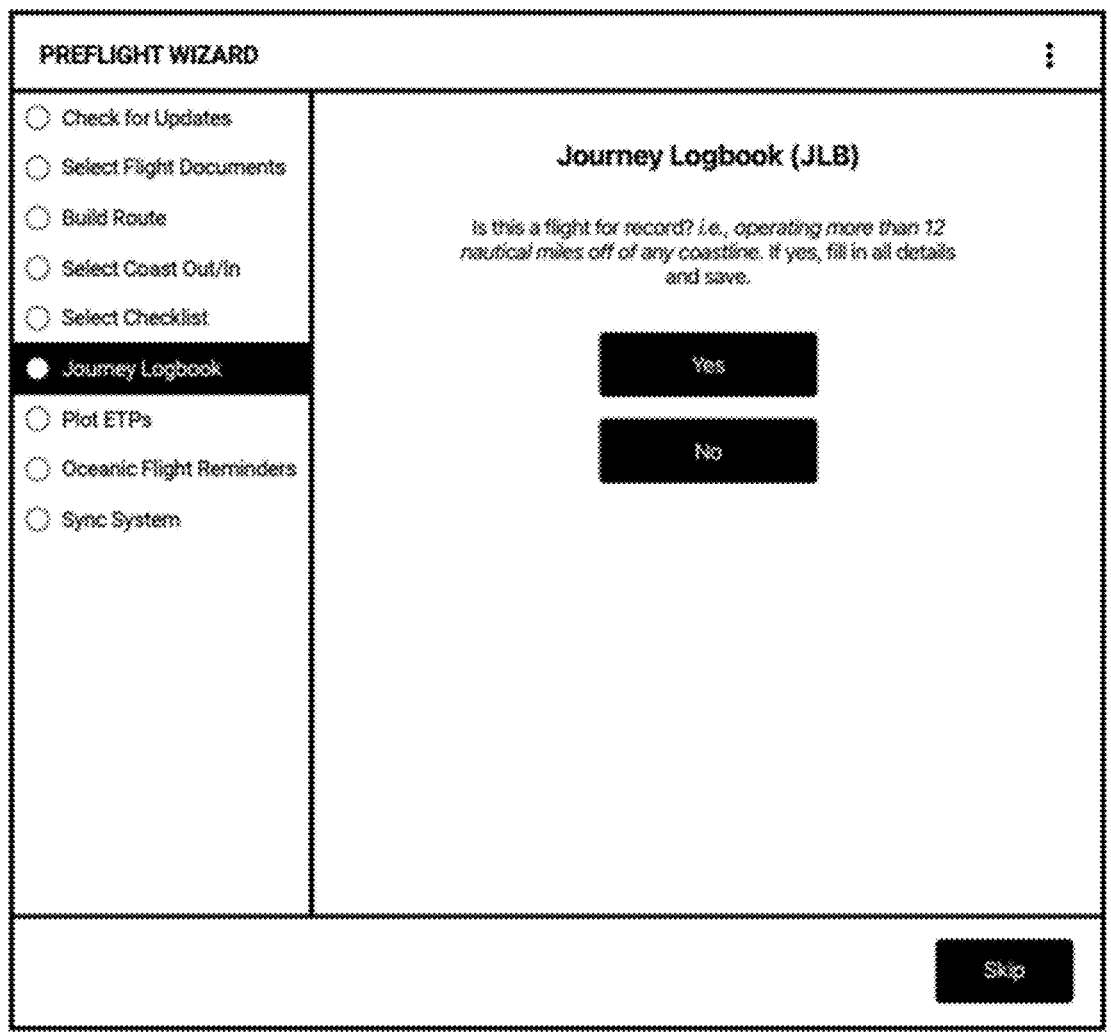
Figure 75 - Preflight Wizard Journey Logbook (Flight For Record)

Figure 76- Preflight Wizard Plot ETPs

Figure 77 - Preflight Wizard Oceanic Flight Reminders
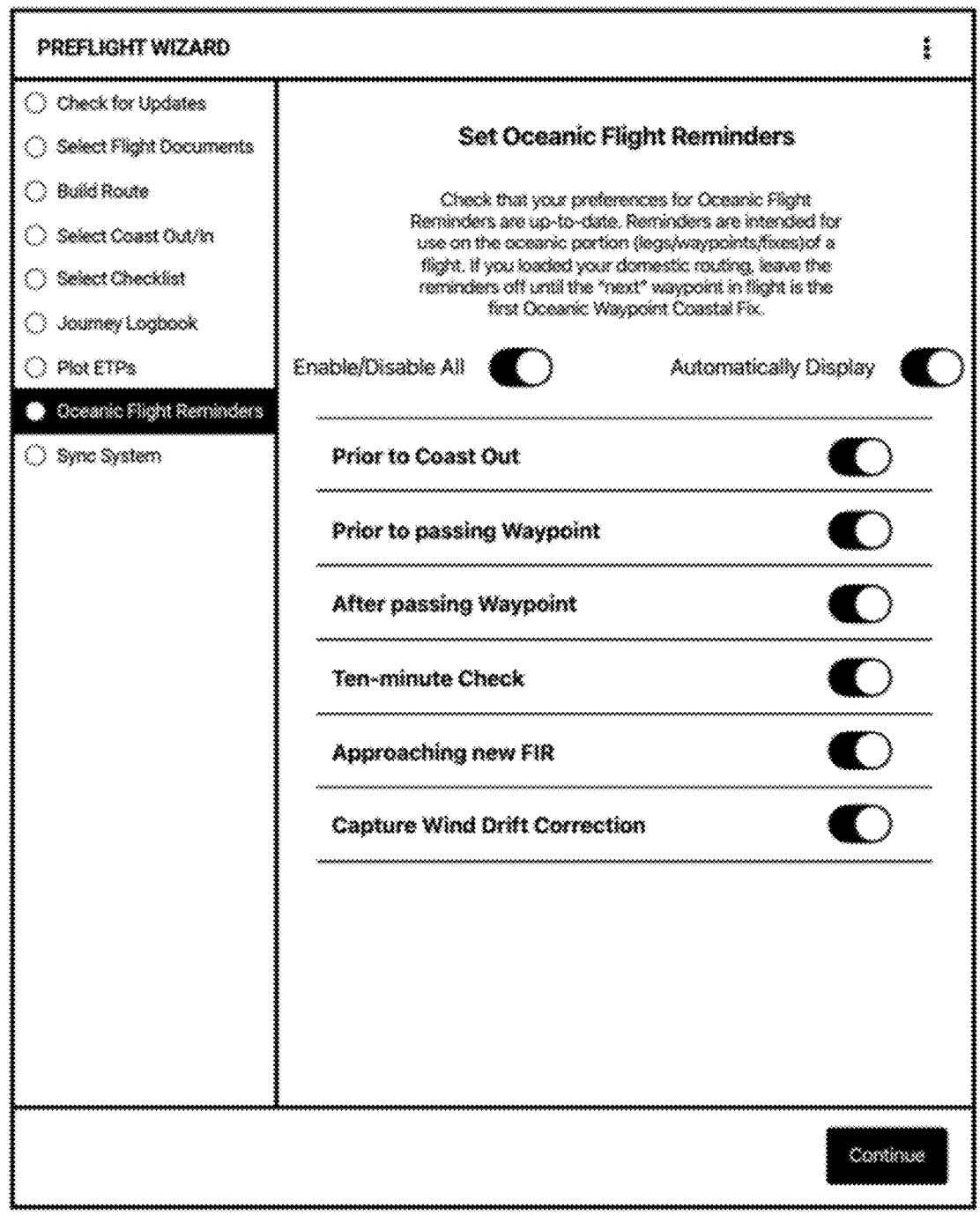

Figure 78- Preflight Wizard Sync System
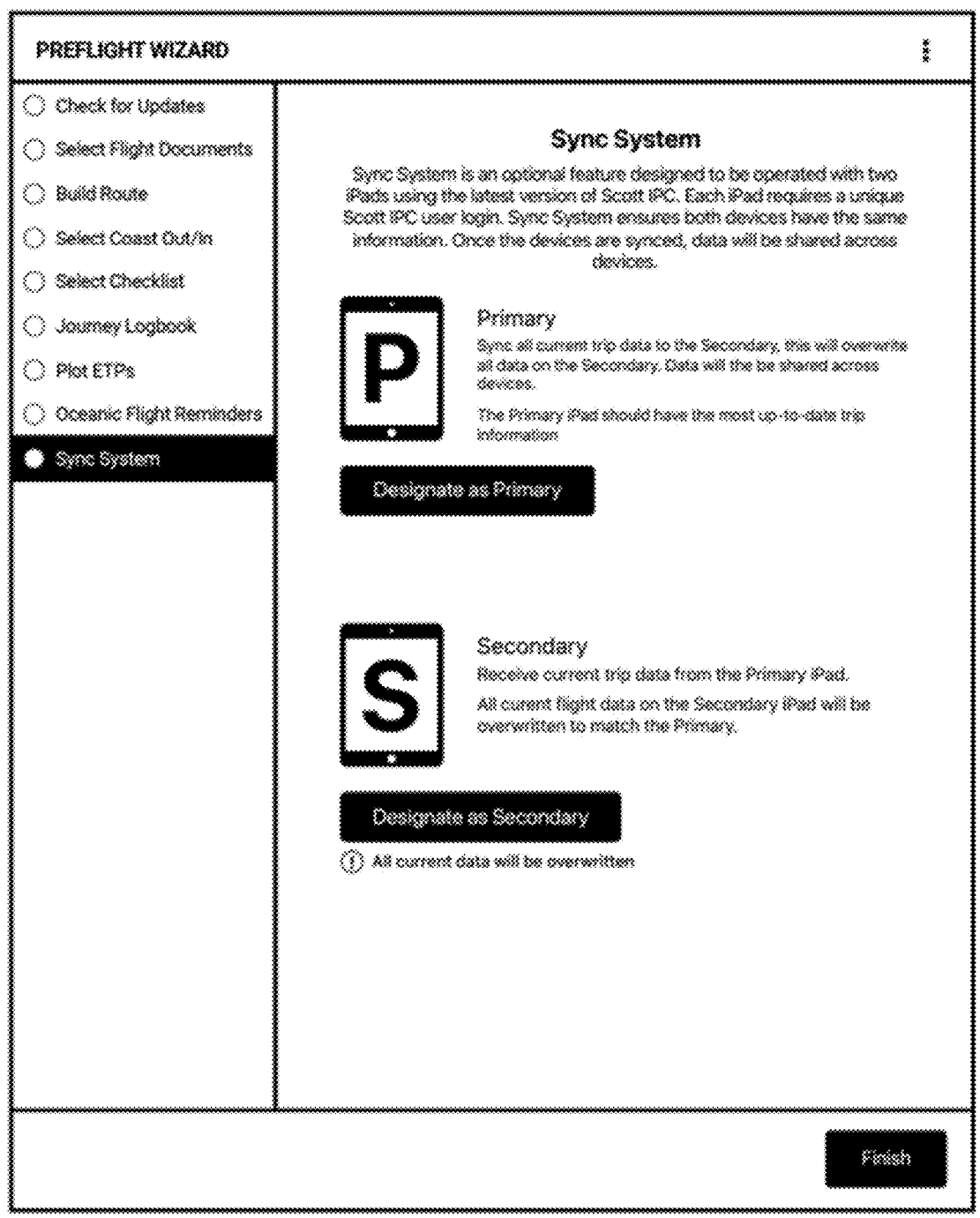

Figure 79 - Red Toolbox
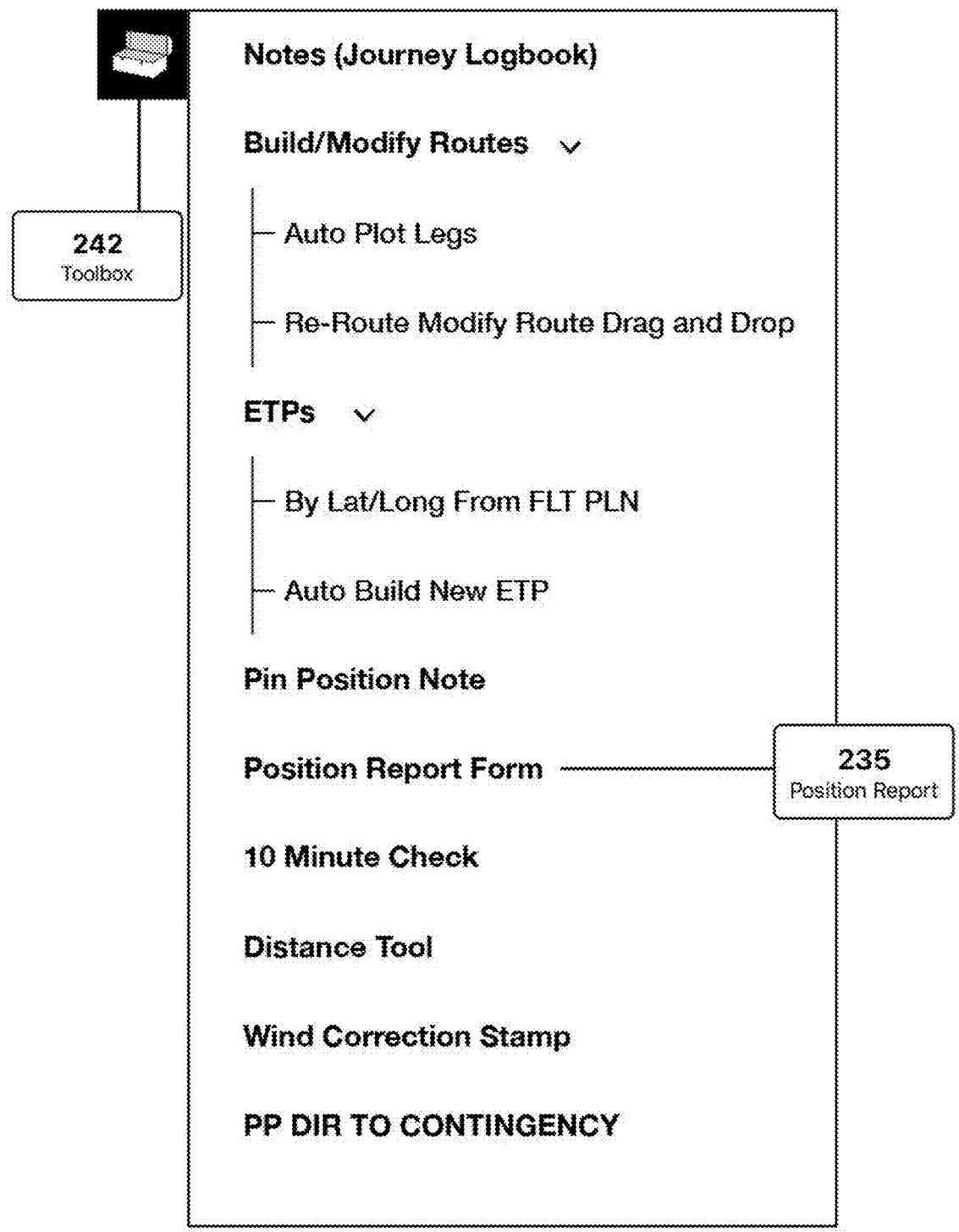

Figure 80-Overview main position reporting and chart layer toolbar

Figure 81 Chart layers function turns navigation chart layers on/off
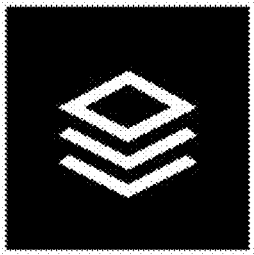
Figure 82 Track details function provides details for NAT and PAC tracks
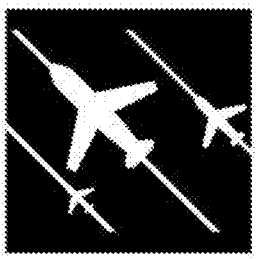
Figure 83 Leg function turns additional chart navigation details on/off (Ground speed, ETE/ETA, LEG DIST REM)
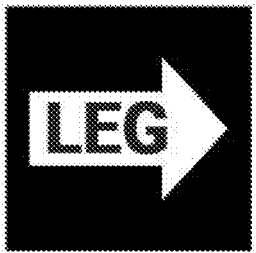
Figure 84 10 minute check function for pilot input of position information

Figure 85 Position Report function, presents table for pilot to enter position report information.
Figure 86 Oceanic Flight Reminders function, turns on/off pilot reminders
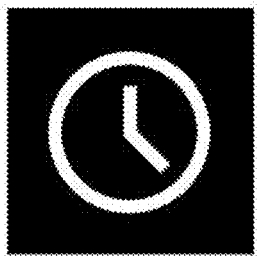
Figure 87 Pin Position function, allows pilot to drop a position pin on chart
Figure 88 Notepad function allows pilot to quickly record notes

Figure 89 Chart annotation function, allowing the pilot to turn on/off capability to write on chart or flight plan.
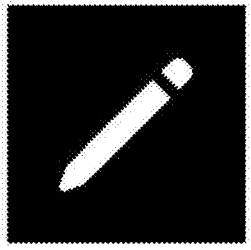
Figure 90 Horizontal Route Waypoint List
Dead Reckoning (DR) Figures
Figure 91 DR GPS Failure Popover
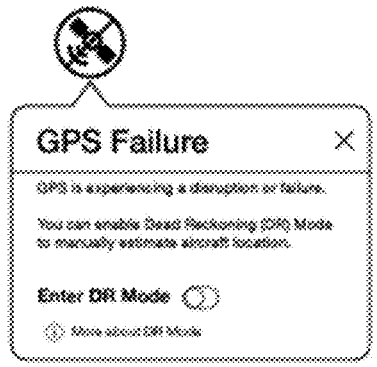
Figure 92 DR Panel Mode Header
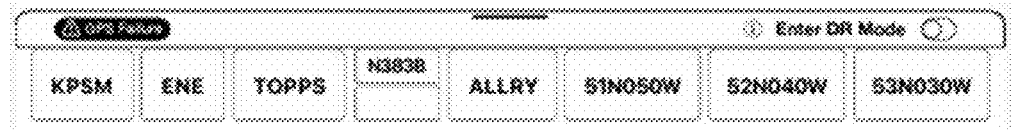

Figure 93 DR Panel Mode Header and GPS Failure Popover within Scott IPC app
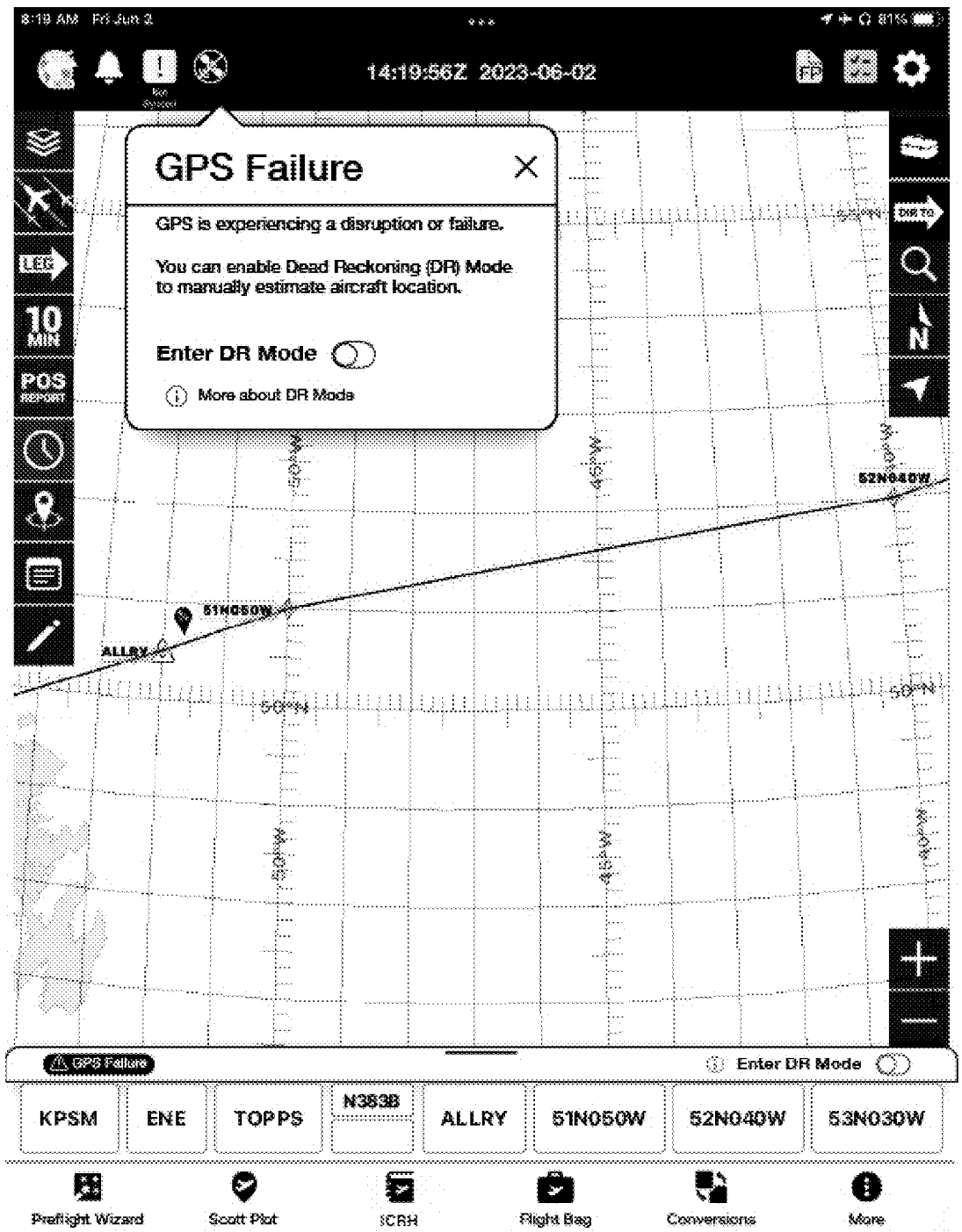

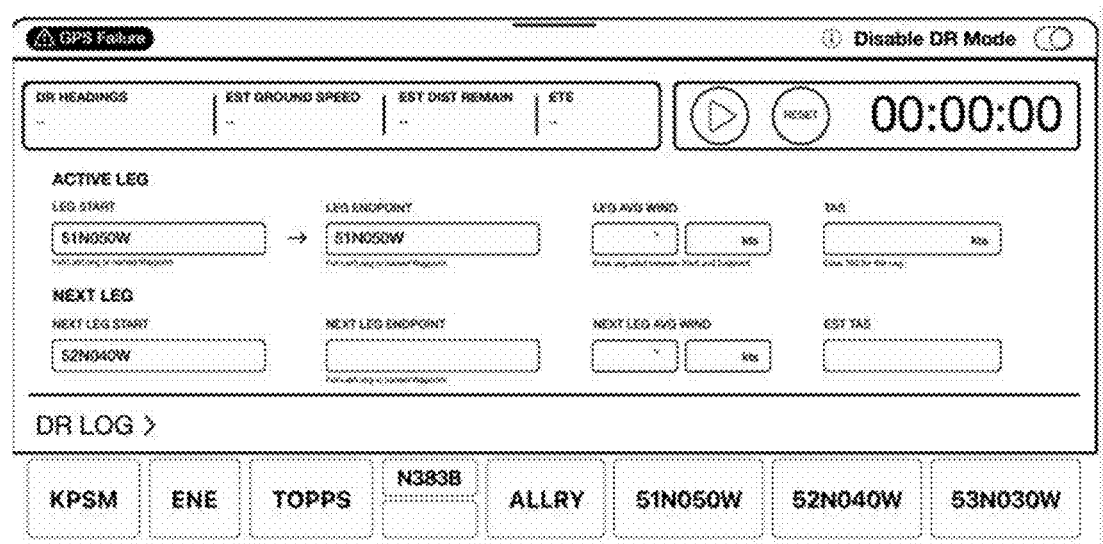
Figure 94 DR mode enabled, initial state

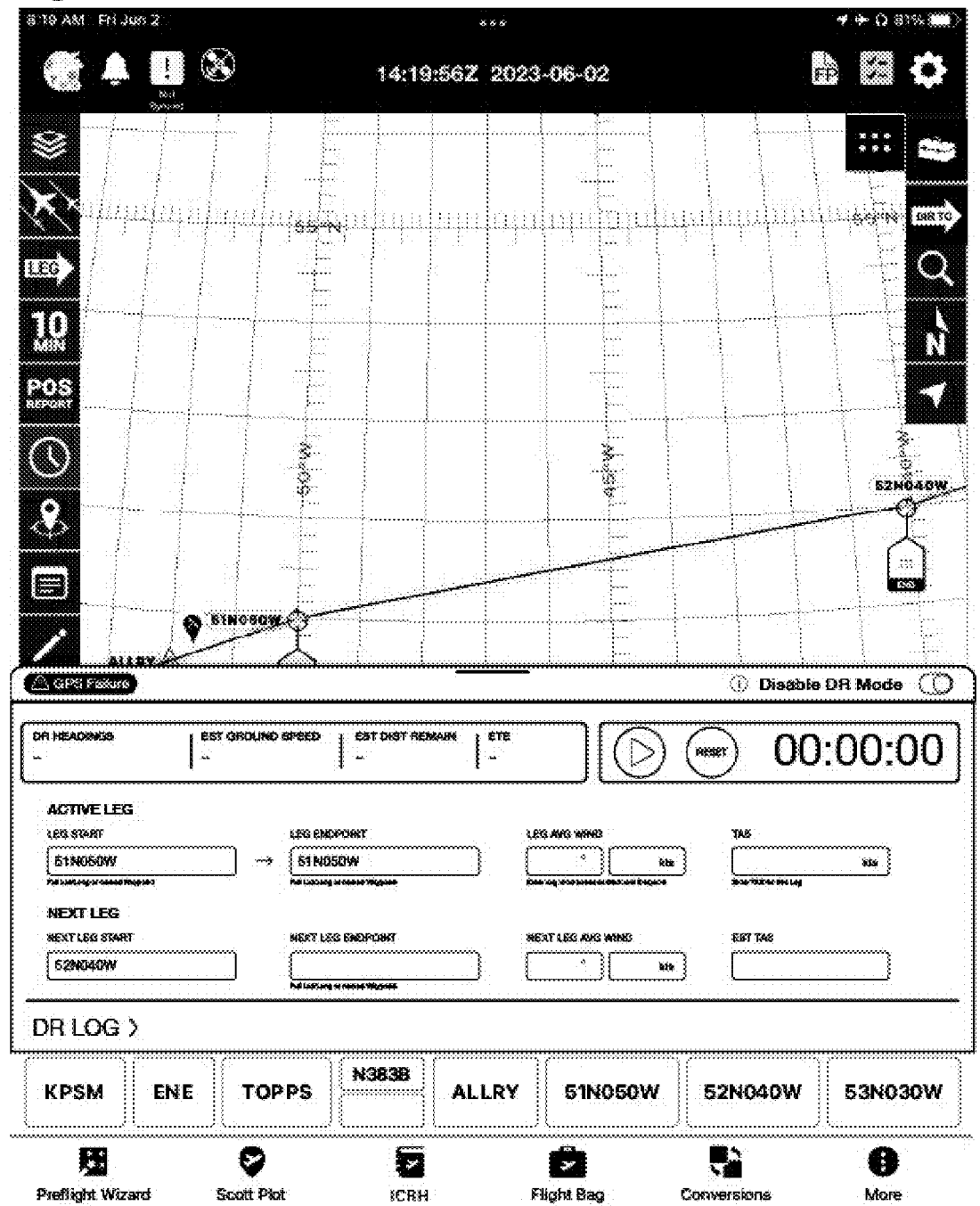
Figure 95 DR mode enabled, initial state within Scott IPC app

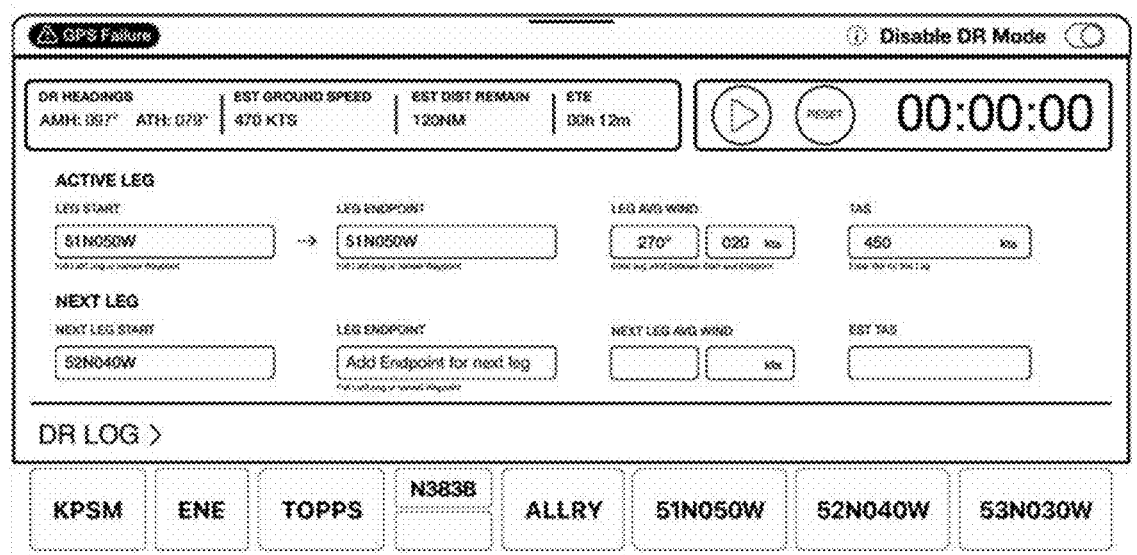
Figure 96 DR mode enabled, pilot inputs completed

Figure 97 DR mode enabled, pilot inputs completed, within Scott IPC app
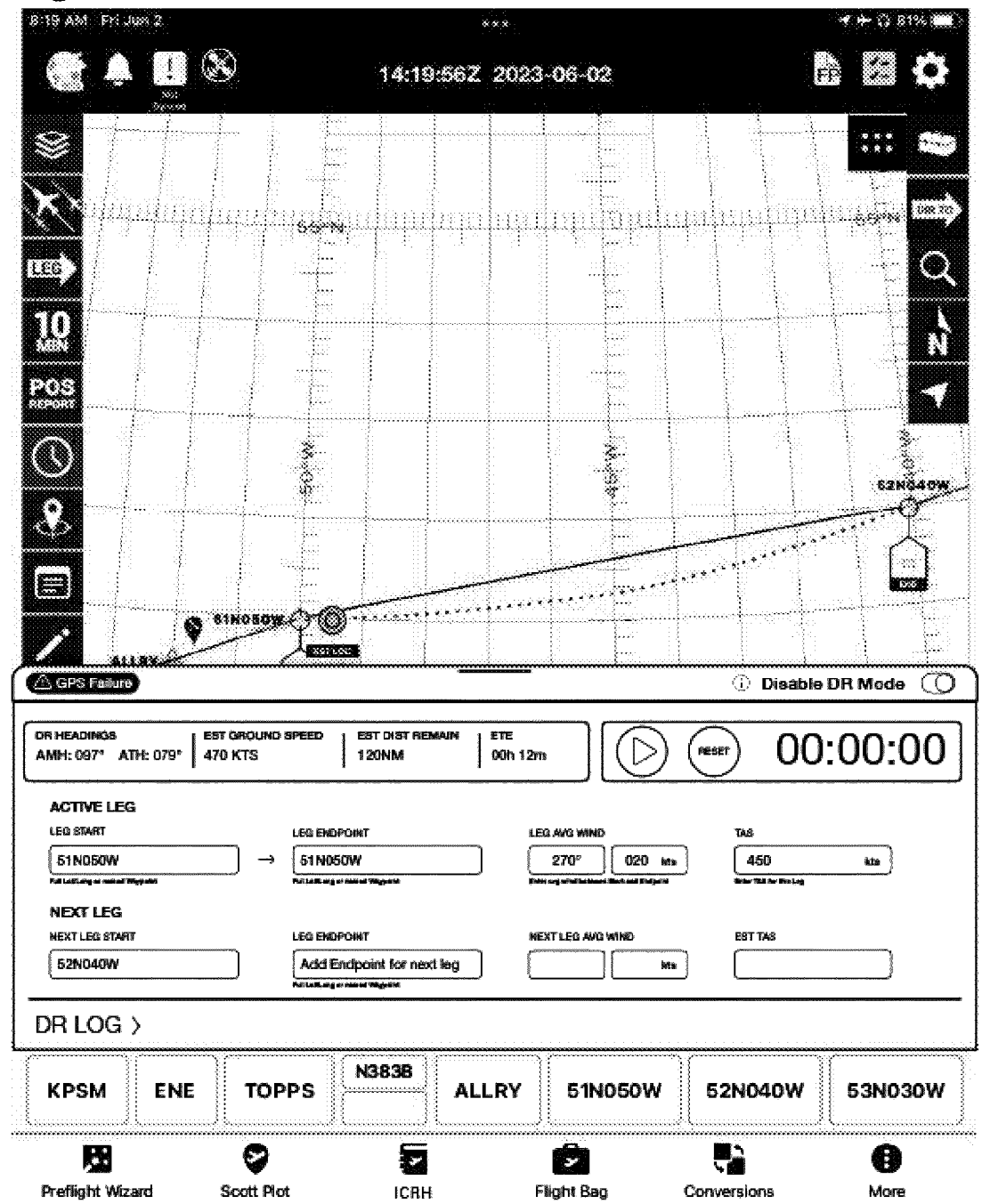

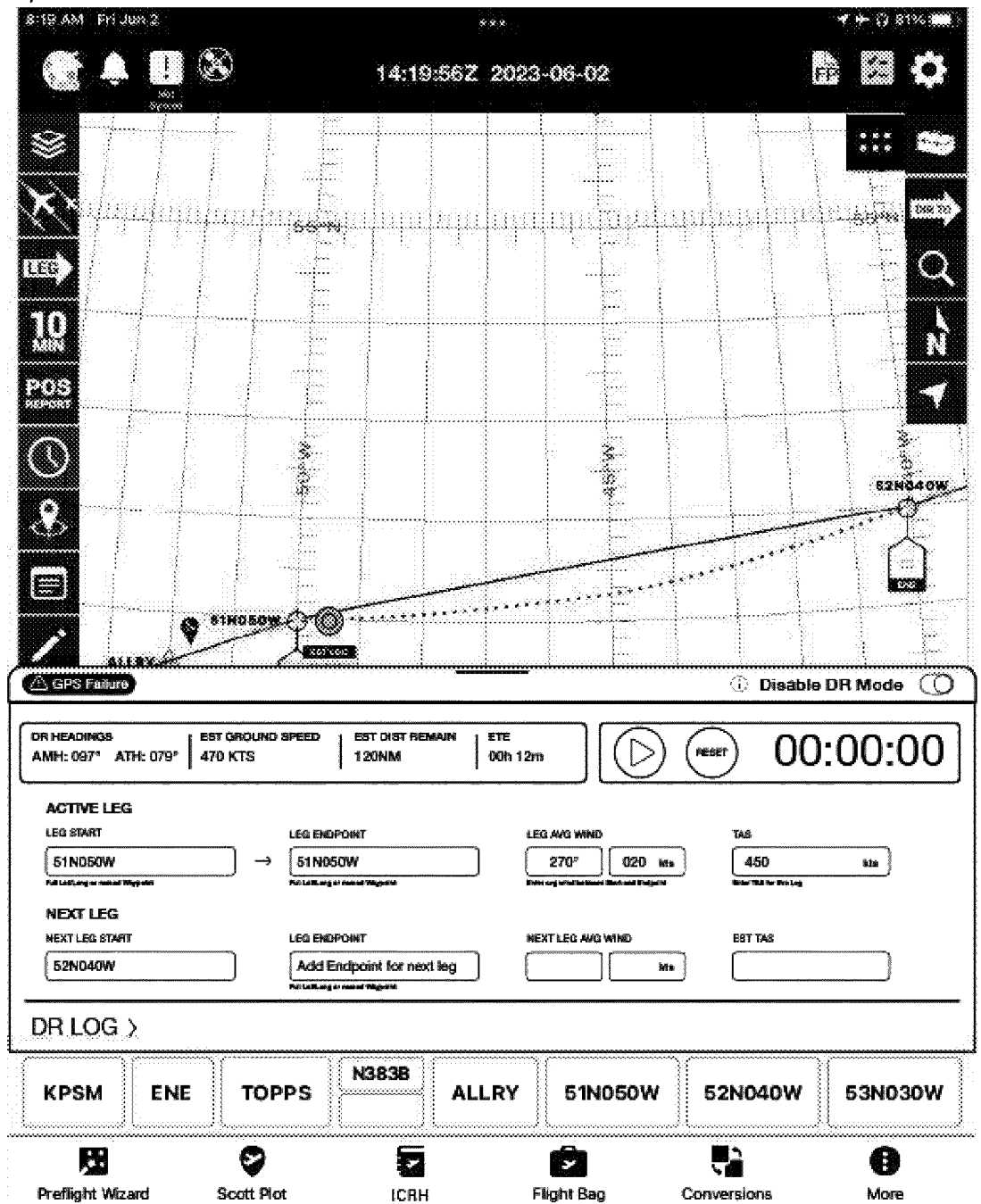
Figure 98 DR mode enabled, aircraft estimated location (EST LOC) and pilot input details Figure 99 DR mode enabled, quick view state
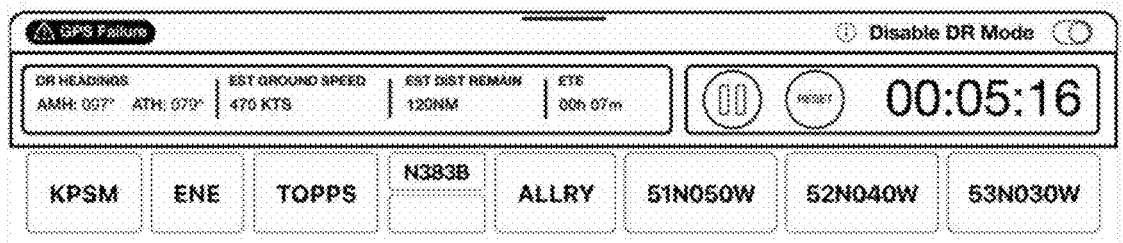
Figure 100 DR mode enabled, quick view state within Scott IPC app
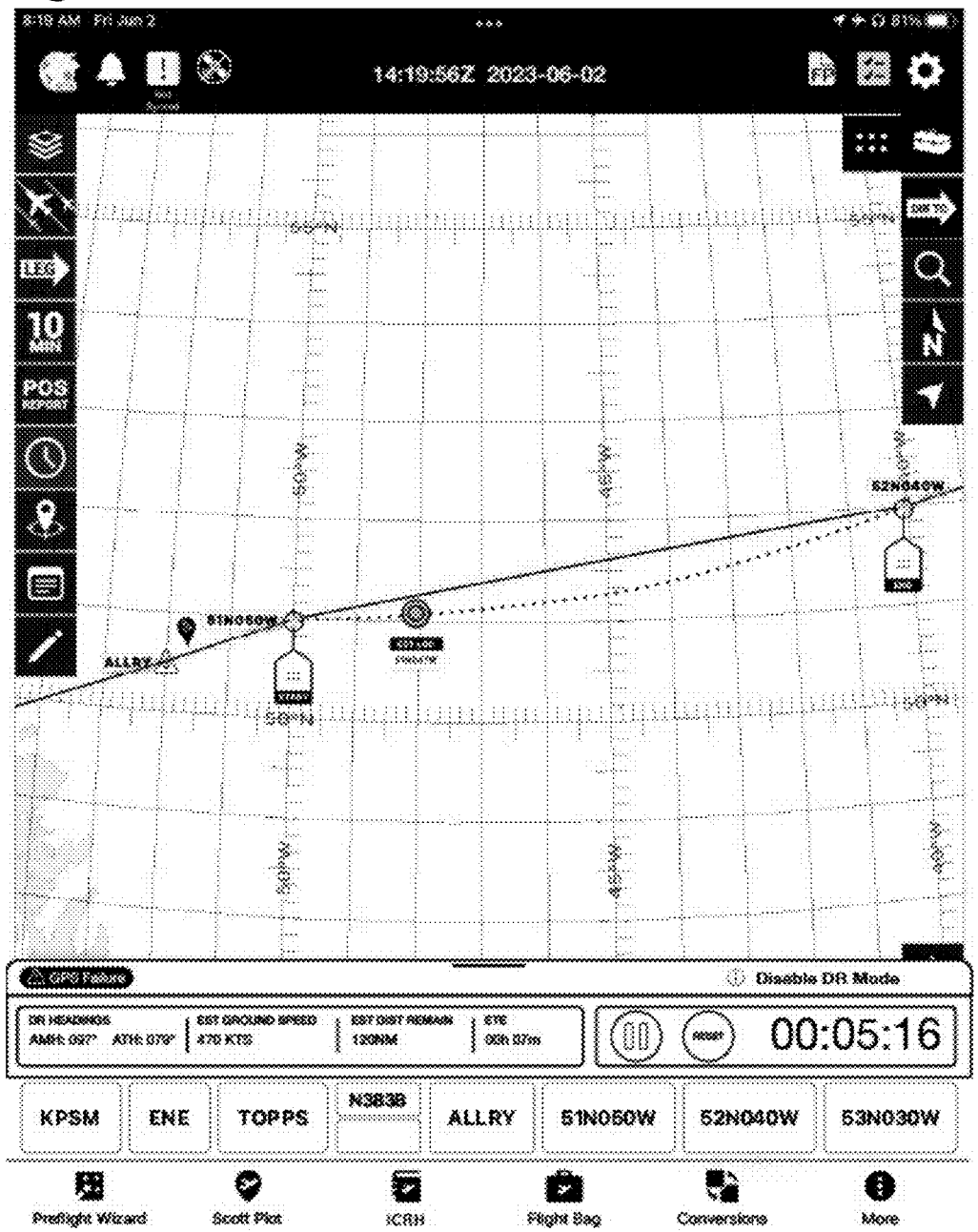

Figure 101 DR mode enabled, quick view state, approaching leg end alert
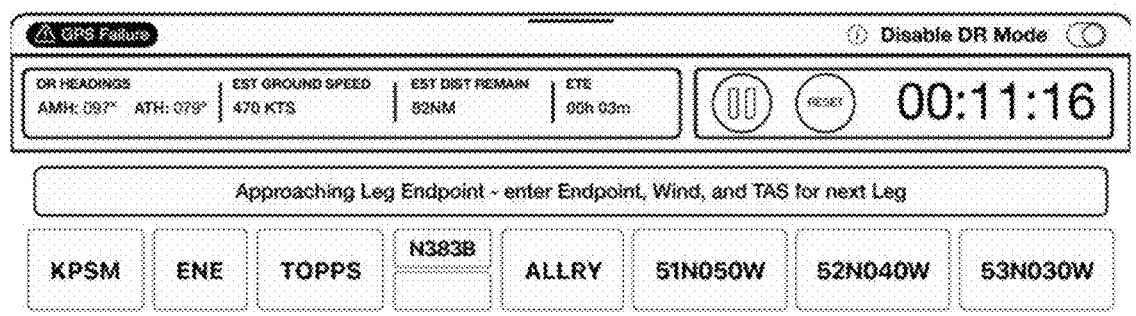
Figure 102 DR mode enabled, quick view state, approaching leg end alert within the Scott IPC app
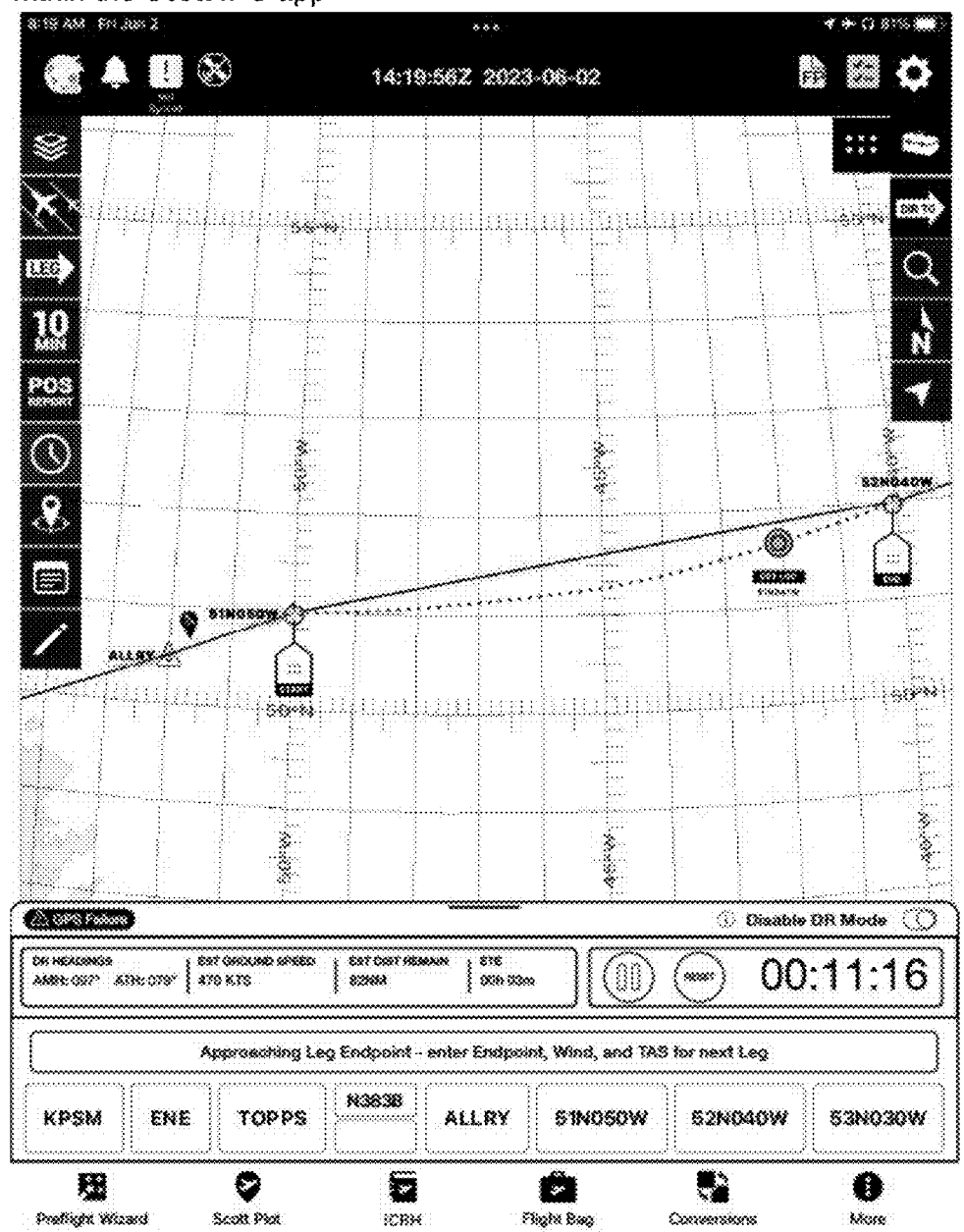

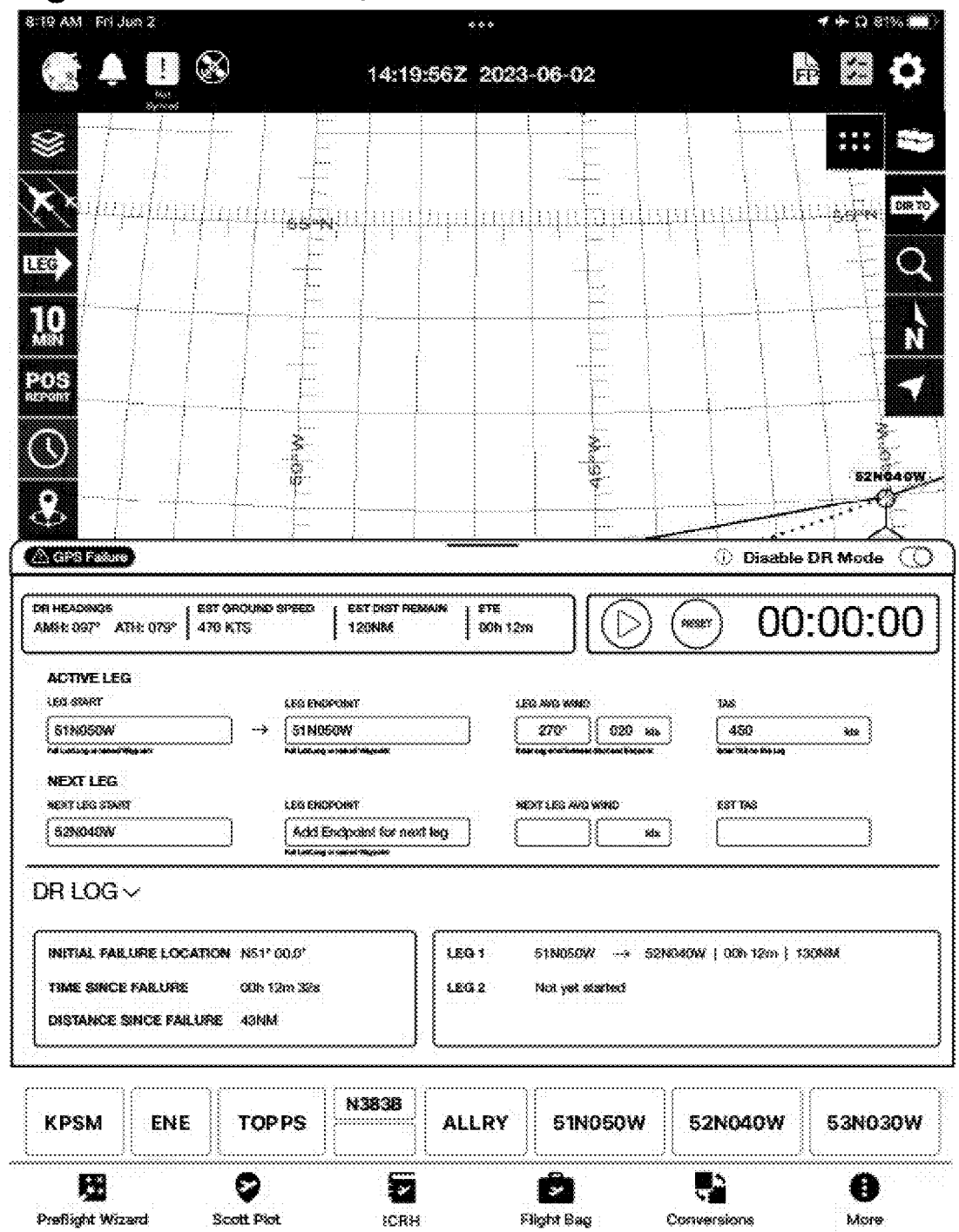
Figure 103 DR mode log

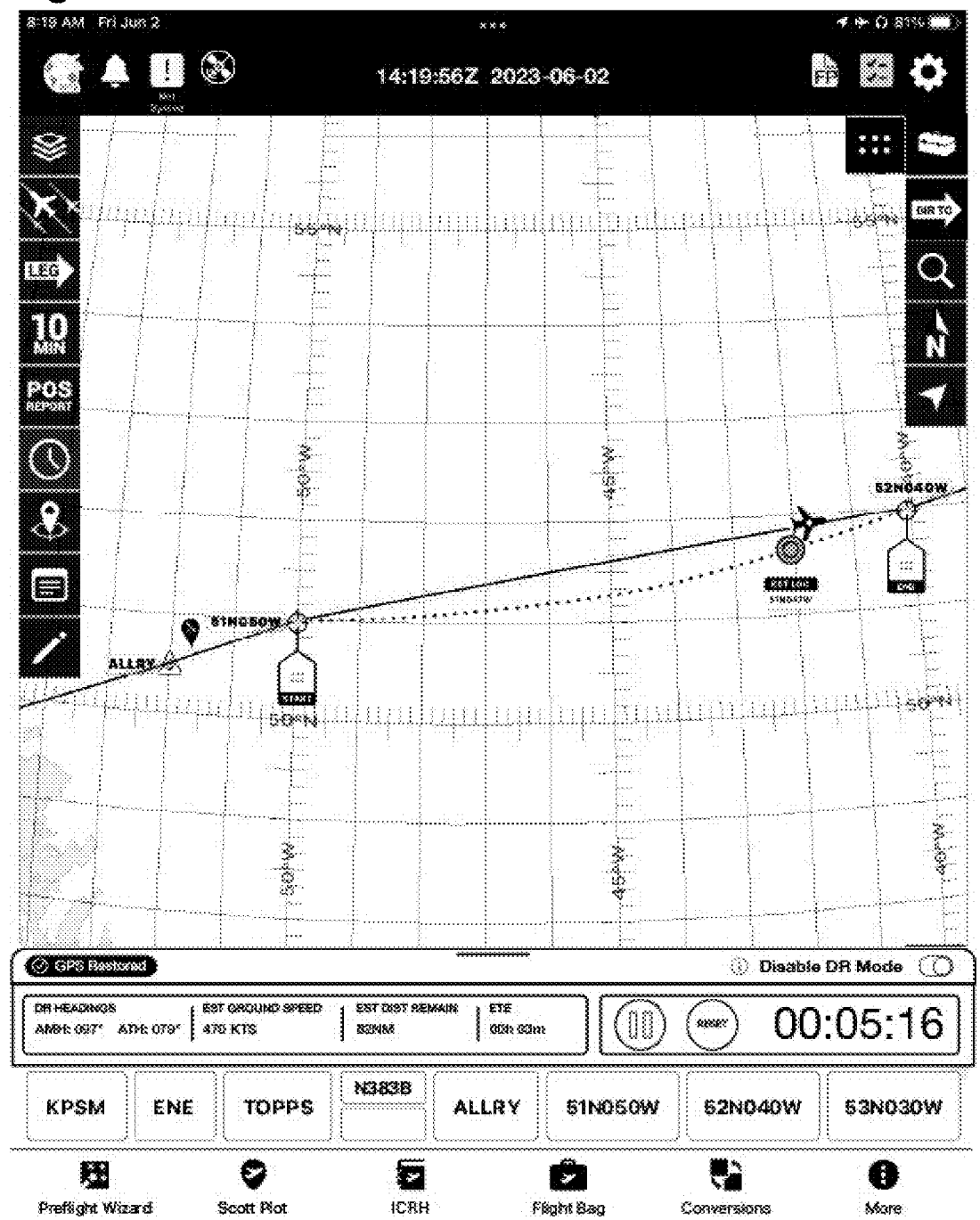
Figure 104 DR Mode Enabled, GPS Restored

Figure 105 DR Mode Manually Enabled for training
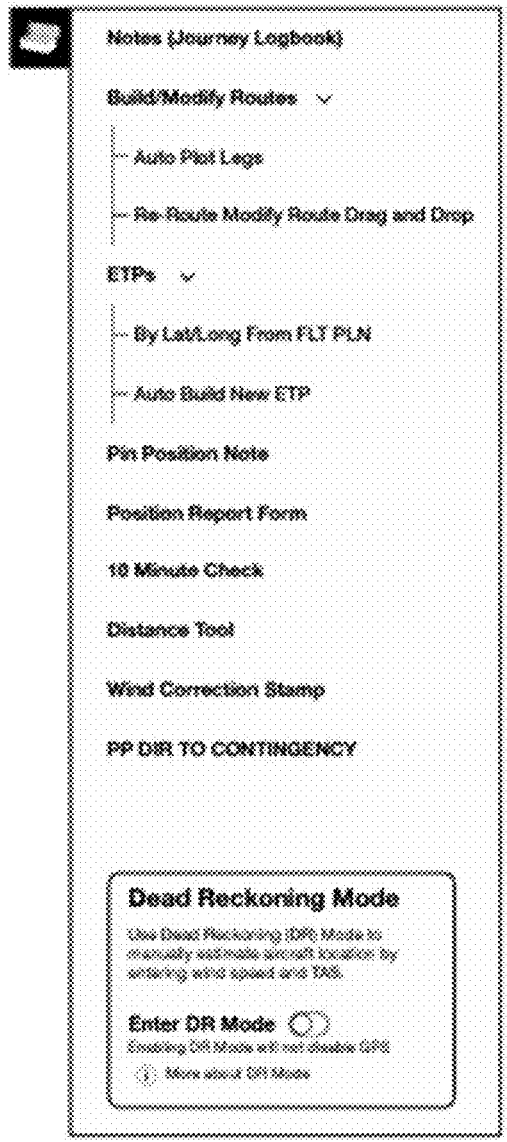

PORTABLE FLIGHT NAVIGATION TOOL ADAPTED TO ASSIST PILOTS IN COMPLIANCE WITH INTERNATIONAL FLIGHT PROCEDURES AND NAVIGATION

PRIORITY CLAIM

The present document claims priority to U.S. patent application Ser. No. 18/046,009 filed 12 Oct. 2022, which in turn is a continuation of U.S. patent application Ser. No. 16/653,748 filed Oct. 15, 2019, and now issued as U.S. Pat. No. 11,512, 959. U.S. patent application Ser. No. 16/653,748 in turn claims priority to U.S. Provisional Application No. 62/745,879 filed on Oct. 15, 2018. The contents of all the foregoing patent applications are hereby incorporated herein by reference in their entirety.

BACKGROUND

Most aircraft pilots are familiar with operations within their home country. When these pilots operate across borders, they become subject to laws and rules imposed by other countries that may differ from those that they are used to. U.S. Code of Federal Regulations 14 CFR 91.703—Covers: Operations of civil aircraft of U.S. registry outside of the United States. It states in part:
   (a) Each person operating a civil aircraft of U.S. registry outside of the United States shall—
   (1) When over the high seas, comply with Annex 2 (Rules of the Air) to the Convention on International Civil Aviation and with §§ 91.117(c), 91.127, 91.129, and 91.131;
   (2) When within a foreign country, comply with the regulations relating to the flight and maneuver of aircraft there in force These laws and rules include differing standards and contact information for preflight weather briefings, filing visual flight rules (VFR) and instrument flight rules (IFR) flight plans, obtaining and receiving clearances, customs rules including arrival notification and port of entry requirements, position reporting requirements, metric versus English altitude requirements, designated airways and transatlantic tracks, prohibited and restricted areas, aircraft identification zones, warning and alert areas, and other rules. Violations, whether intentional or from ignorance, of these rules may have drastic legal consequences and may impair safe operations of both the violating pilot and other aircraft. Aside from the safety concern, violating aircraft have even been shot down. It is mandatory for commercial operators to train pilots in international operations, and in particular transoceanic operations, prior to their engaging in such operations; and to provide inflight reference information for their use during such operations.

Global satellite navigation systems have been installed by the United States, Europe, Russia, and other countries. The United States system is known as the Global Positioning System, the Europe system is known as Galileo, and the Russian system as Global Navigation Satellite System or GLONASS. For purposes of this document, the term "GPS receiver" includes a receiver capable of receiving position information from any one or more of the Global Positioning System, GLONASS, Galileo and other future satellite-based navigation systems.

The term "tablet computer" as used herein shall include portable computing devices having an internal processor, random access memory, nonvolatile memory, capable of operation on an internal battery, and having a touch-panel display. Tablet computers may run the iOS operating system from Apple®, the Android operating system, or the Microsoft Windows operating system.

The term "tracks" includes routes of an organized route system published by air traffic control authorities and frequently flown by aircraft on international overwater flights; tracks exist worldwide and include but are not limited to tracks of the North Atlantic Organized Track System, the Transpacific Organized Track System, and the Australian Organized Track Structure; in some regions published tracks of organized track systems are updated frequently, with the North Atlantic track system being updated as often as twice daily.

Nonvolatile memory includes one-time programmable and electrically erasable memory of the type that operates by storing electrostatic charge on a floating gate or on a silicon nitride-silicon dioxide interface under a gate of a transistor. Nonvolatile memory is characterized by the ability to retain data contents for more than an hour without the data contents being refreshed and includes several types of magnetic memory including core memory.

SUMMARY

An app known as the Scott IPC app, is configured to download over a cellular or IEEE 802.11 Wi-Fi internet connection and run on an Apple iPad® (trademark of Apple, Cupertino, CA), the Apple iPad being a particular brand of tablet computer adapted to run the iOS operating system; future versions of the Scott IPC app may be configured to run on alternative tablet computers. The Scott IPC app configures the Apple iPad to operate independent of an internet connection allowing the Apple iPad to operate as a portable navigation tool, the Scott IPC navigation tool, that is adapted to assist pilots in compliance with international flight procedures and navigation. The Scott IPC flight navigation tool contains several tools including an International Cockpit Reference Handbook (ICRH) with information useful to pilots operating in and between many countries around the world with a focus on International Oceanic Operations. Rules included in the Scott IPC flight navigation tool include national rules published in many national Aeronautical Information Publications as updated and International Civil Aviation Organization (ICAO) rules applicable beyond 12 nautical miles (NM's) off a coastline in international airspace.

Cellular-network capable iPads have an integral Global Positioning System (GPS) satellite navigation system receiver that allows determination of an approximate location. The Scott IPC flight navigation tool operate as an independent International Oceanic Navigation Assistance Flight Tool which functions with or without incorporating a GPS.

Position recenterable, precise Plotting Chart map display showing Latitude and Longitude graticule lines capable to zooming to more than a 1-minute arc accuracy allows for plotting precise Latitude and Longitudes, user-selected and user-entered waypoints, tracks, airways, and key airspace boundaries and features of oceanic airspace including selectable world-wide area of coverage. The Scott IPC flight navigation tool can serve as a Dead Reckoning navigational tool allowing near-precise navigation when navigation GPS sensor information is unavailable. This allows conflict resolution from other aircraft and accurate navigation given an aircraft navigation system failure.

Embodiments of the Scott IPC flight navigation tool can be linked by Wi-Fi or Bluetooth connections to an Automatic Dependent Surveillance Broadcast (ADS-B) receiver to provide a user with traffic advisories and other real-time aircraft information when in range of other aircraft.

In embodiments, the Scott IPC flight navigation tool supports slaving a second Scott IPC flight navigation tool to a primary Scott IPC flight navigation tool; this permits both a pilot and a copilot to have access to the same data and thereby meet an ICAO requirement to only have one Master Document on the flight deck at a time. This ensures pilots are not making decisions using independent or conflicting information entered on either Scott IPC flight navigation tool as such devices are synced.

In an embodiment, a portable flight navigation tool for use in aircraft has a tablet computer, a GPS receiver, and a memory system incorporating nonvolatile memory, the nonvolatile memory contains an operating system, a flight navigation routine, an aviation database with international operating rules including transoceanic flight rules, machine readable code configured to display portions of the international operating rules upon demand, a moving-map database configured with transatlantic, transpacific, and other tracks, coastal airport identifiers and locations, predefined routes, and predefined reporting point locations for transoceanic operations. The navigation tool also includes machine readable code configured to read a current location from the GPS receiver, and to indicate the current location on a moving map display representing a portion of the moving-map database, and a trip database with machine readable code configured to interface with a user with a touchscreen and to use either direct entry of waypoint coordinates or names and selection of predefined tracks to configure the trip database with a planned transoceanic route for an individual flight.

In embodiments, the flight navigation tool also has a checklist database and machine-readable code for comparing the current location with popup display locations at which checklists from the checklist database are automatically displayed on the moving map display; in some embodiments the checklist database is user configurable, and the checklist database includes checklists for a pre-departure flight phase, a coast-out flight phase, a waypoint-reached flight phase, and a coast-in flight phase.

In embodiments, the flight navigation tool displays graticule lines at a density, such as 60 lines per degree of longitude, that decreases with increasing latitude; and may also provide a heading and next-waypoint timing for a rhumb-line route from a location where the GPS fails to the next waypoint of the currently active route.

In embodiments the flight navigation tool is configured to link to a second flight navigation tool over a short-range radio as a flight navigation tool pair, the flight navigation tool configured to identify flight navigation tools of the pair as a primary flight navigation tool and a secondary flight navigation tool, and includes code to synchronize the flight navigation tools of the pair by transmitting updates from a trip database of the secondary flight navigation tool to the primary flight navigation tool and update the trip database of the secondary flight navigation tool from the trip database of the primary flight navigation tool, and to send a heartbeat message repeatedly from the primary flight navigation tool to the secondary flight navigation tool.

In another embodiment, a method of assisting pilots performing overwater flight operations includes providing a portable navigation tool having a GPS receiver and a memory system having recorded therein a moving-map database configured with transatlantic, transpacific, and other tracks, coastal airport identifiers and locations, and predefined routes and predefined reporting point locations for transoceanic operations, with machine readable code configured to read a current location from the GPS receiver, and to indicate the current location on a moving map display representing a portion of the moving-map database. The portable navigation tool also contains a trip database. The method includes interfacing with a user with a touchscreen to configure the trip database with a planned transoceanic route for an individual flight by direct entry of waypoint coordinates or names and selection of predefined routes, segments and tracks. The method includes reading a current location from the GPS receiver, and indicating the current location on a moving map display representing a portion of the moving-map database, comparing the current location with checklist display locations, and displaying checklists from a checklist database upon reaching checklist display locations; in some embodiments the checklist database is user configurable and has checklists for at least a pre-departure flight phase, a coast-out flight phase, a prior to waypoint-flight phase, a waypoint-reached flight phase, and a coast-in flight phase.

In some embodiments, the method includes displaying the moving map display with graticule lines at a density of 60 lines per degree of longitude that decreases at high latitudes and provides pilots with a heading and next-waypoint timing for a rhumb-line route from a location where the GPS fails to the next waypoint of a currently active route.

BRIEF DESCRIPTION OF THE FIGURES

FIG. 1 is a menu of switches to permit setting Oceanic Flight Reminders to be delivered enroute for a pilot thru the reminder tool by phase of flight.

FIG. 1B is an illustration of the Home Screen of the Scott IPC navigation tool with main menu icons that user can access from all locations within the tool, as detailed below.

FIGS. 2A, 2B illustrate a GPS icon indicating GPS functions are active or disabled to alert the pilot of GPS function state.

FIGS. 3A, 3B, 3C, 3D, and 3E illustrate map navigation function icons for use with the Scott IPC tool while enroute and connected to a GPS for the moving-map displays.

FIG. 4 is an illustration of a GPS icon indicating GPS is unusable, the icon is white, surrounded by a red circle with a red line when GPS is unusable or unavailable.

FIG. 5 is an illustration of a GPS menu indicating GPS is Active (green), with menu selections to Enable and Disable GPS.

FIG. 6 is an illustration of a GPS menu indicating GPS functions are Enabled (green) and Disabled (red) with a button to Enable or Disable a GPS source. The GPS Source list can contain one or more GPS options, if connected.

FIG. 7 is an illustration of GPS FAIL and ACTIVE Stamps that may be displayed on a moving map Plotting Chart display indicating location and times of GPS failure and re-acquisition of GPS signal.

FIG. 8 is an illustration of an Auto Plot Oceanic Route builder entry form, with indication of correct format of entries.

FIG. 9 is an illustration of a Confirm Delete Waypoint popup provided to pilots prior to deleting a waypoint from a route.

FIG. 10A, 10B, illustrate screens provided during Modify Routes Drag and Drop operations while allowing pilots to accurately drag and drop a waypoint to a new position while entering a route.

FIG. 11 is an illustration of a popup that permits users to set a "snap to" mode for precise drag and drops.

FIG. 12 is an illustration of a Navigation System Position Check Form that permits aircraft Navigation System Sensor position entry to confirm accurate GPS function.

FIG. 13 is an illustration of RAW R/DME A/C sensor position shown on the Plotting Chart after conversion from pilot entered VOR selection, Radial, and DME Distance to Latitude and Longitude.

FIG. 14 is an illustration showing an FMS R/DME calculated exact position shown on plotting Chart after pilot entry of raw R/DME data into the accuracy check form of FIG. 12.

FIG. 15 is an illustration of FMS1, FMS2, and FMS3 positions shown on the moving Plotting Chart display after pilot entry into the accuracy check form.

FIG. 16 is an illustration of IRS1, IRS2, and IRS3 positions shown on the Plotting Chart display after pilot entry into accuracy check form.

FIG. 17 is an illustration of GPS exact positions shown on the plotting Chart after pilot entry into the accuracy check form.

FIG. 18 is an illustration of a Navigation System Position Check Sensor selection list allowing pilots to view each aircraft sensor type individually on the Plotting Chart display.

FIG. 19 is an illustrative example of a Flight Planning Checklist; this flight planning checklist is an inter active, modifiable checklist allowing pilots to identify outstanding issues prior commencement of the flight.

FIG. 20 is an illustrative example of a Preflight Checklist; this interactive, modifiable checklist allowing pilots to identify outstanding issues during aircraft preflight.

FIG. 21 is an illustrative example of an Off Blocks Taxi Prior to Takeoff Checklist; this interactive, modifiable checklist allows pilots to identify outstanding issues prior to take-off.

FIG. 22 is an illustrative example of a Prior to Coast Out, Enroute to Outbound Gateway interactive modifiable checklist indicating required items to verify before entering overwater international airspace.

FIG. 23 is an illustrative example of an Approaching Waypoints Checklist; an interactive, modifiable checklist allowing the pilots to identify procedures and issues as waypoints are approached.

FIG. 24 is an illustrative example of an Enroute After Passing Each Oceanic Waypoint checklist, this checklist is an interactive, modifiable checklist presenting pilots items to address after passing waypoints.

FIG. 25 is an illustrative example of a Coast In Checklist; this checklist is an interactive, modifiable Coast In Checklist presenting items to address entering domestic airspace.

FIG. 26 is an illustration of a 10 Minute Check data entry form that allows a pilot to enter Latitude and Longitude to verify the aircraft's position on the plotting chart. The Latitude and Longitude can be entered by hand, or the pilot can elect to use the aircraft GPS position by tapping on the "Use GPS" button.

FIG. 27 is an illustrative example of a 10 minute check as posted on the plotting chart.

FIGS. 28A and 28B are an illustrative example of a Position Report Form that allows pilots to capture needed items for use in sending position reports to ATC.

FIG. 28C is an illustration of oceanic flight reminders, showing the status of oceanic flight reminders. This illustration shows two complete and one due to execute a position report.

FIGS. 29A and 29B are an illustrative example of a Position Report Table Form after adding a new column for multiple position reports.

FIG. 30 is an illustrative example of a Custom Keypad for touchscreen entry to the Position Report Form.

FIG. 31 is an illustrative example of a custom keypad for quick touchscreen entry into for Plot Position 10 minute check.

FIG. 32 is an illustrative example of a Distance Tool allowing measurement of routes and route segments on the plotting chart display.

FIG. 33 is an illustrative example of an Annotation Tool menu for entry of notes for display on flight plan and Plotting Chart displays.

FIG. 34 is an illustrative example of an ETP (equal time point) Depiction on a route displayed on the Plotting Chart display once processed, with labels included.

FIG. 35 is an illustrative example of two ETPs depicted on a route displayed on the Plotting Chart, with labels.

FIGS. 36A and B are an illustrative example of ETPs by LAT/LONG data entry form presentation.

FIG. 37 is an illustrative example of an ETPs AUTO-BUILD entry form presentation for capturing alternate airports to use.

FIG. 38*a* is an illustrative example of an Exact ETP presentation with a line bisecting the route to indicate position of the ETP.

FIG. 38*b* is an illustrative example of a Custom Keypad used for entering ETPs into the ETPs by LAT/LONG data entry form of FIGS. 36A and 36B.

FIG. 39A, 39B illustrates a Sync Process user status display proceeding through four states, where paired Scott IPC navigation tools progress from unsynched through a role selection state, and a synch pending state to a synchronized state where one Scott IPC navigation tool is a primary tool and the other of the pair is a secondary tool.

FIG. 40 illustrates a Primary Icon as shown on the primary Scott IPC navigation tool.

FIG. 41 illustrates a Secondary Icon as shown on the secondary Scott IPC navigation tool.

FIG. 42A illustrates a Previous Primary icon as shown on a previous Primary role Scott IPC flight navigation tool after disconnection of syncing.

FIG. 42B illustrates a Previous Secondary icon as shown on a previous Secondary role Scott IPC flight navigation tool after disconnection of syncing.

FIG. 43 illustrates a Not Synced icon as shown when a Scott IPC flight navigation tool is not synced with its paired tool.

FIG. 44*a* is a flowchart illustrating how Scott IPC navigation tools become linked as Primary and Secondary tools.

FIG. 44*b* is a flowchart illustrating initial data entry and synchronization of trip databases and use of realm databases to store, synchronize, and display changes on and between paired Scott IPC flight navigation tools, maintaining a single record for Journey Logbook.

FIG. 45A illustrates Primary/Secondary status displays in conjunction with change-primary commands.

FIG. 45B is an illustration of Sync Lost and Auto Reconnect functionality

FIG. 45C is an illustration of a configuration box for actions to be taken on restoration of a connection between primary and secondary systems to recover overwritten flight data.

FIG. 46A is an illustration of Full Route Details displayed on the Plotting Chart display on a route segment when Full Route details are selected with GPS active.

FIG. 47 is an illustration of GPS failure and re-acquisition timestamps on the Plotting Chart display while viewing Full Route Details.

FIG. 48 is an illustration of a Wind Correction Entry Form popup with custom keypad and a Plotting Chart Stamp showing wind correction information on the Plotting Chart display.

FIG. 49 is an illustration of a Selectable Layers menu use for selecting layers for depiction on the Plotting Chart display.

FIG. 50 illustrates a Track Message Icon for selecting viewing of a Track Message.

FIG. 51 illustrates an Auto Distance Layer depiction of distances for all legs on the Plotting Chart display when Auto Distance tool is enabled.

FIG. 52 illustrates a Speed-Distance Time Calculator form and custom touchscreen keyboard used with the Speed-Distance time calculator.

FIG. 53 illustrates a Freeplay Message warning the user is not using GPS but is in the Freeplay training mode.

FIG. 54 illustrates Freeplay Screen Controls allowing user to control the speed and direction of the simulated aircraft in Freeplay mode; in this mode Flag 1 is a yoke, flag 2 is a speed setting slider, and flag 3 is a red chevron representing the aircraft.

Figure 55A:
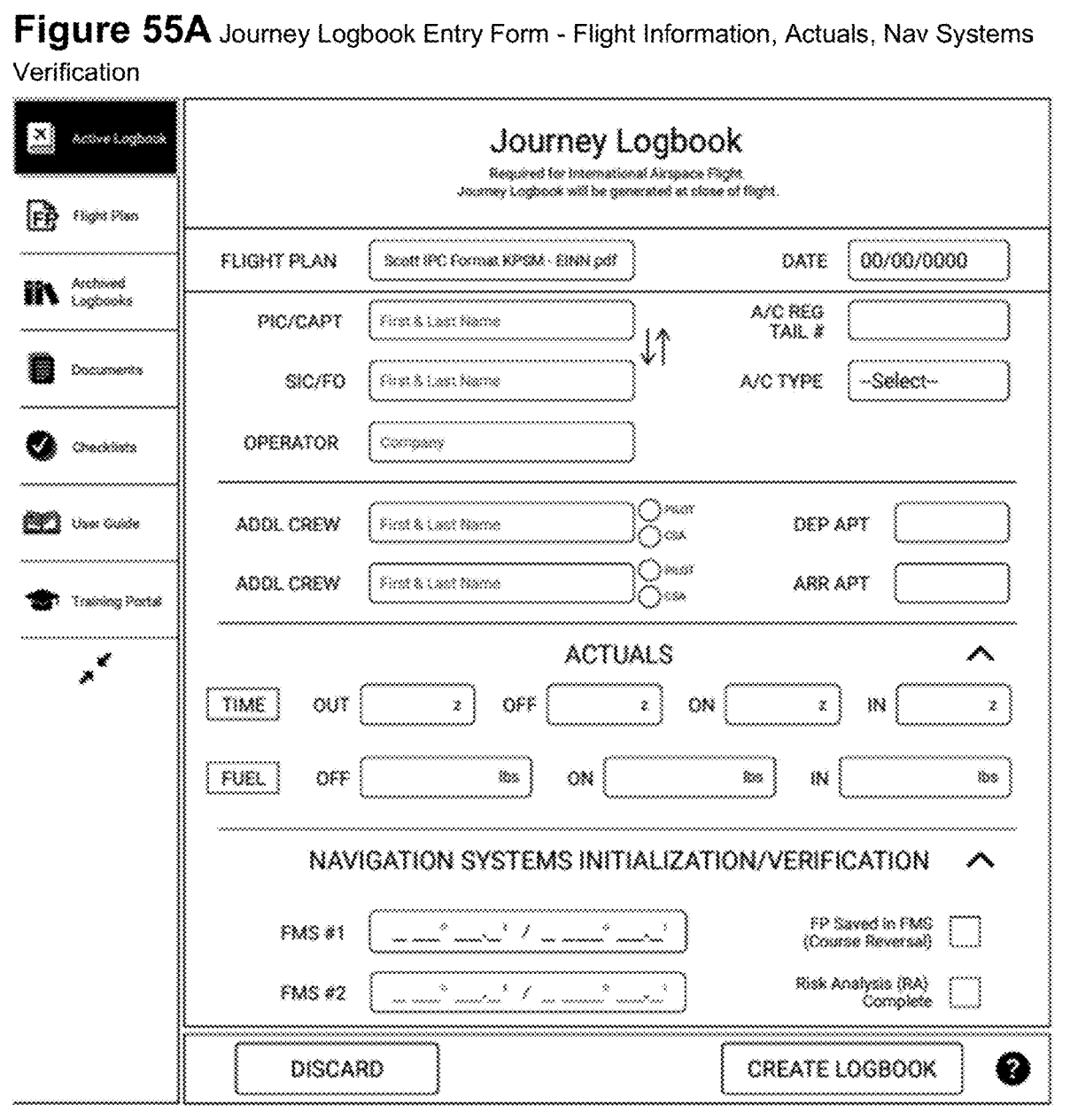
Figure 55B:
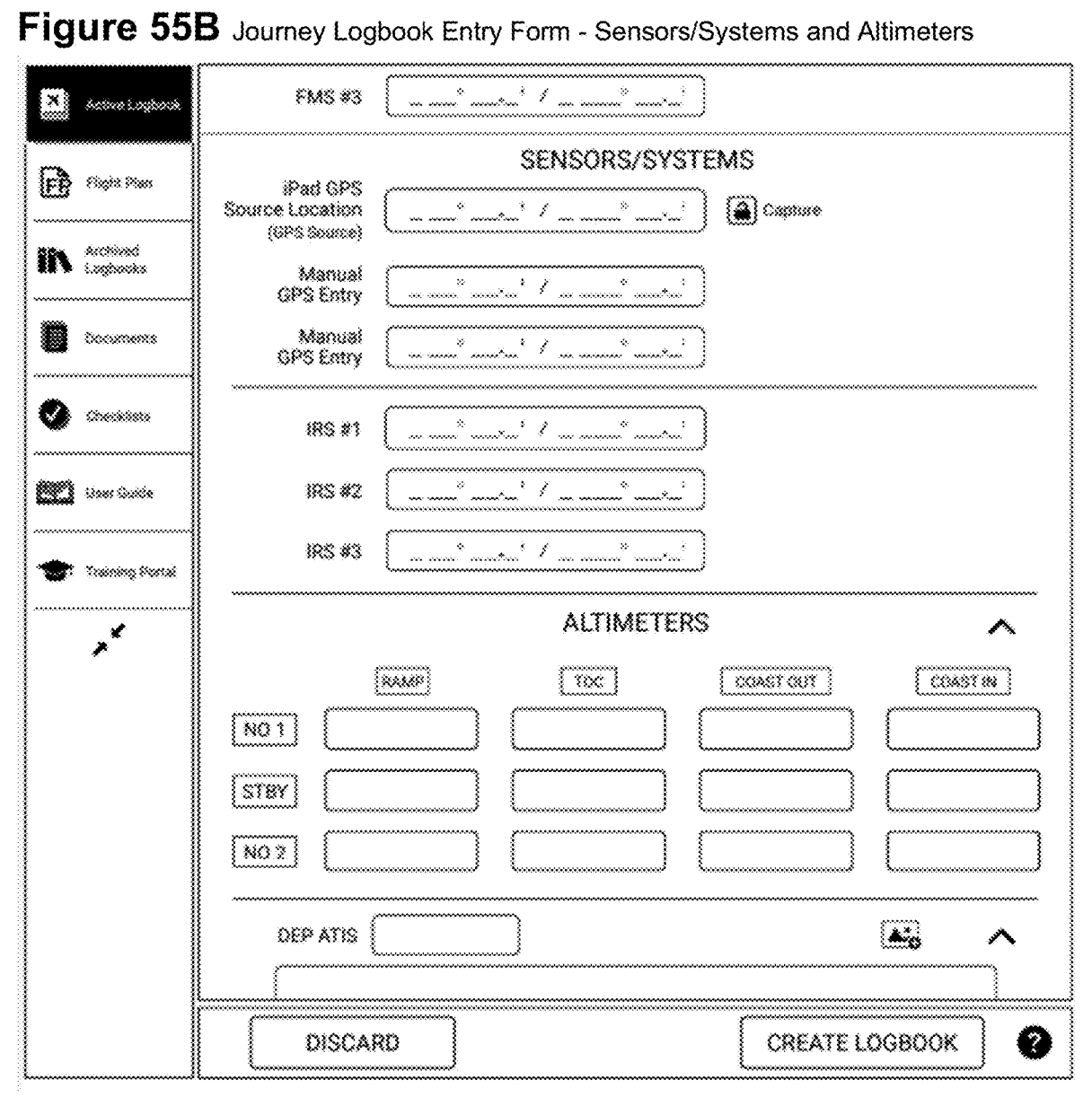
Figure 55C:
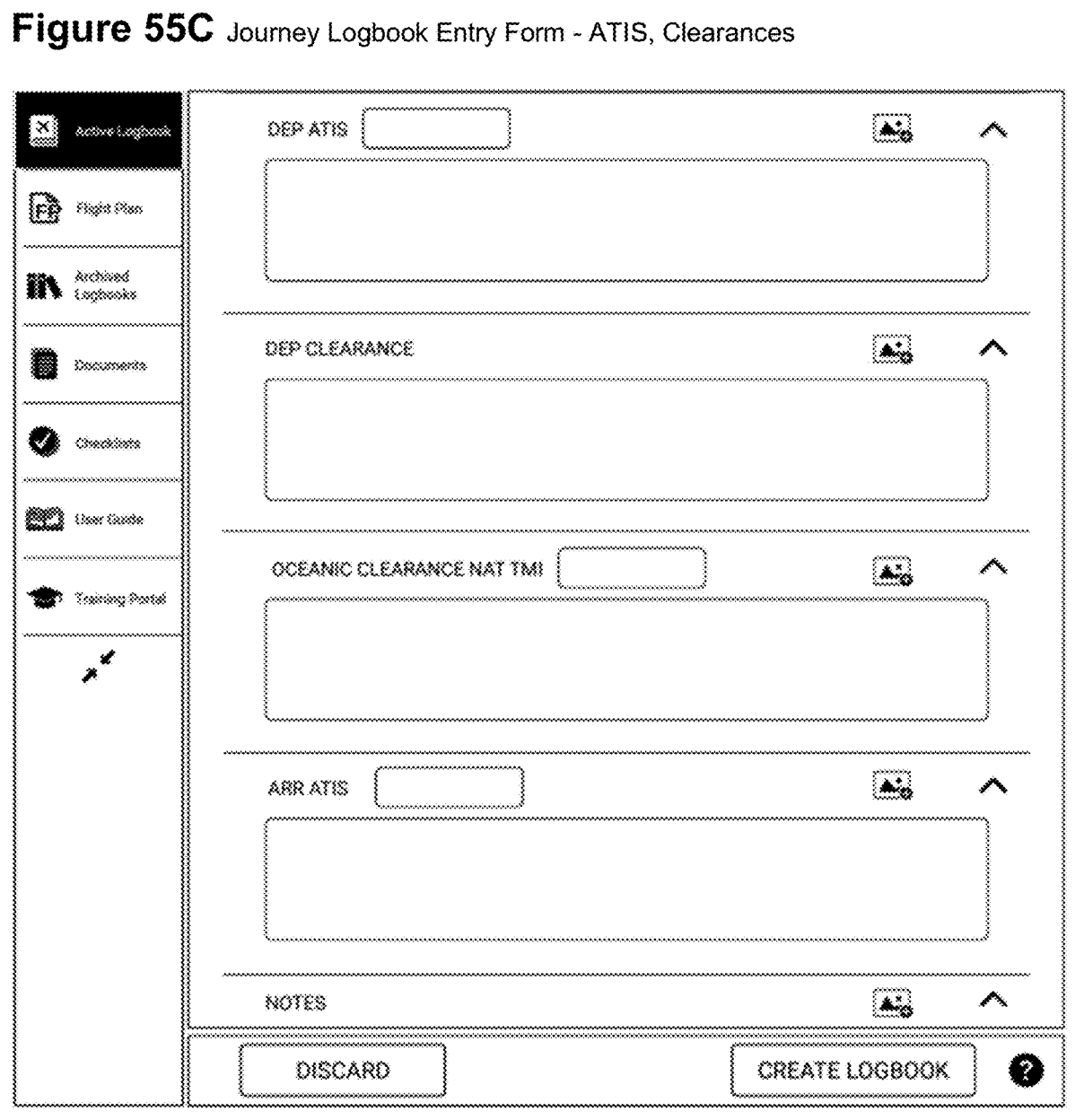
Figure 55D:
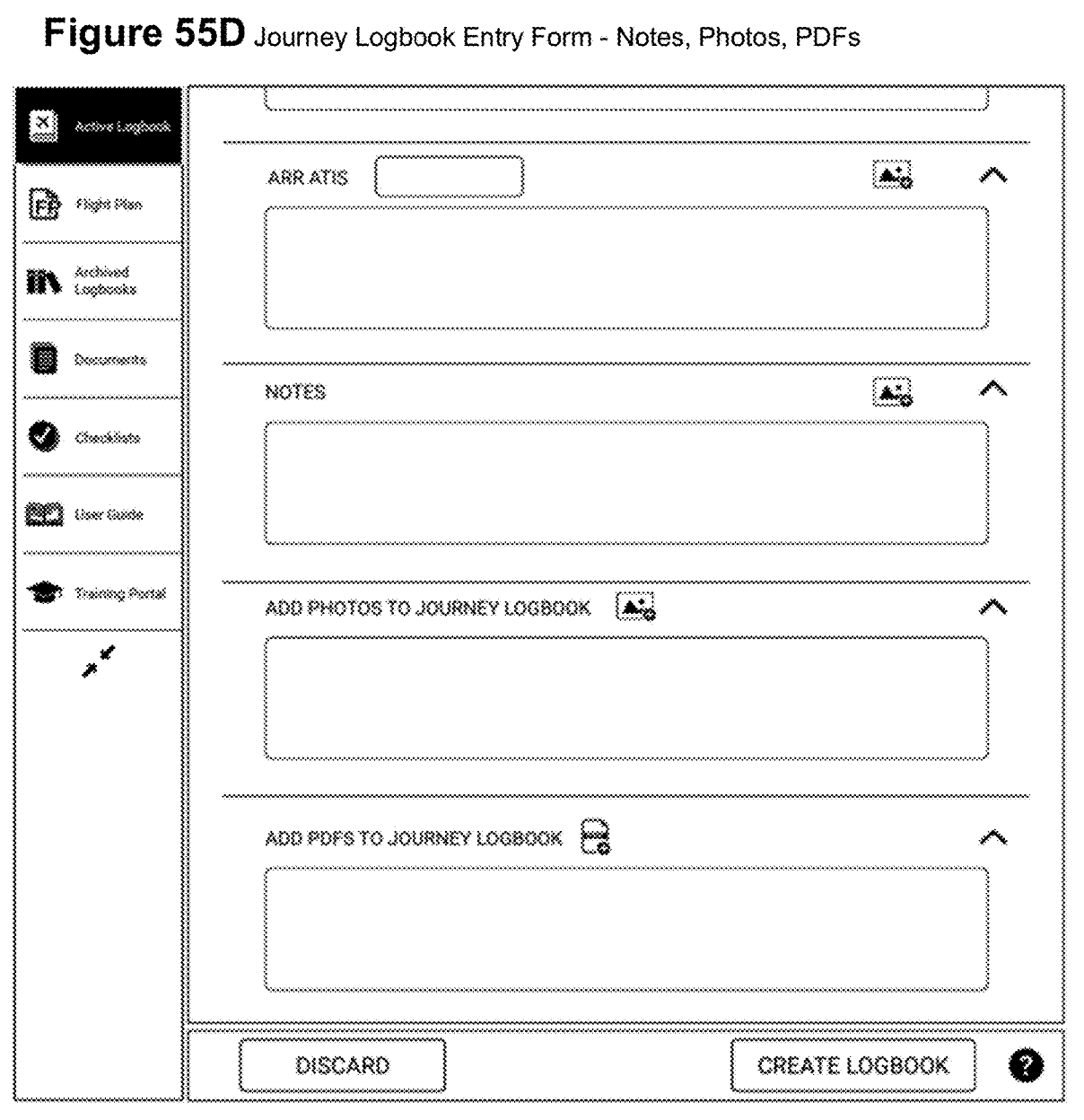

FIG. 55A illustrates a popup form for Journey Logbook Entries—Flight Information, Actuals, Nav Systems Verification.

FIG. 55B illustrates a popup form for Journey Logbook Entries—Sensors/Systems and Altimeters.

FIG. 55C illustrates a popup form for Journey Logbook Entries—ATIS, Clearances.

FIG. 55D illustrates a popup form for Journey Logbook Entries—Notes, Photos, PDFs.

FIG. 56 sharing of the journey logbook via AirDrop, Box, messaging apps, etc.

FIG. 57A illustrates the first step in the Restore Previous Flight functionality as mentioned in [00564].

FIG. 57 B illustrates the second and final step in the Restore Previous Flight functionality as mentioned in [00564].

FIG. 58 illustrates Scott IPC ICRH (International Cockpit Reference Handbook).

FIG. 59 illustrates the moving map display with zoom level 1 as displayed for up to 80 degrees North latitude.

FIG. 60 illustrates the moving map display with zoom level 1 as displayed from 80 to 90 degrees latitude.

FIG. 61A illustrates the moving map display with zoom level 2 Up to 80 degrees latitude.

FIG. 61B illustrates the moving map display with zoom level 2 From 80 degrees latitude.

FIG. 62 illustrates the moving map display with zoom level 3 Up to 70 degrees latitude.

FIG. 63 illustrates the moving map display with zoom level 3 from 70 to 80 degrees latitude.

FIG. 64 illustrates the moving map display with zoom level 4 Up to 80 deg latitude.

FIG. 65 illustrates the moving map display with zoom level 5 up to 80 degrees latitude.

FIG. 66 illustrates the moving map display with zoom level 6.

FIG. 67 illustrates the moving map display with zoom level 7.

FIG. 68 illustrates a Present Position (PP) Direct To entry form that defaults to current GPS position but is user overwritable.

FIG. 69 is a Preflight Setup Wizard that assists in completing all steps necessary to use the ScottPlot tool on an oceanic flight.

FIG. 70 illustrates the Preflight Wizard step—Check for Data Updates. This updates enroute navigation data.

FIG. 71 illustrates the Preflight Wizard step—Select Flight Documents.

FIG. 72 illustrates the Preflight Wizard step—Build Route.

FIG. 73 illustrates the Preflight Wizard step—Select Coast Out/In.

FIG. 74 illustrates the Preflight Wizard step—Select Checklist.screen.

FIG. 75 illustrates the Preflight Wizard step—Journey Logbook (flight for record).

FIG. 76 illustrates the Preflight Wizard step—Plot ETPs.

FIG. 77 illustrates the Preflight Wizard step—Oceanic Flight Reminders. Preferences selection screen, enabling users to turn on/off reminders.

FIG. 78 illustrates the Preflight Wizard step—Sync System. The user can elect to sync one or more iPads together so the flight data will be the same on each device.

FIG. 79 illustrates red toolbox menu access to position reporting along with other capabilities FIG. 80 illustrates an overview of the main position reporting and chart layer toolbar. FIGS. 81-89 provide details on each button.

FIG. 81 illustrates Chart layers function turns navigation chart layers on/off.

FIG. 82 illustrates the Track details function provides details for NAT and PAC tracks.

FIG. 83 illustrates Leg function turns additional chart navigation details on/off (Ground speed, ETE/ETA, LEG DIST REM).

FIG. 84 illustrates the 10 minute check function for pilot input of position information.

FIG. 85 illustrates Position Report function, presents table for pilot to enter position report information.

FIG. 86 illustrates Oceanic Flight Reminders function, turns on/off pilot reminders.

FIG. 87 illustrates the Pin Position function, allowing the pilot to drop a position pin on the chart.

FIG. 88 illustrates a notepad function, allowing the pilot to quickly record notes.

FIG. 89 illustrates the Chart annotation function, allowing the pilot to turn on/off capability to write on chart or flight plan.

FIG. 90 illustrates a horizontal list of route waypoints.

FIG. 91 Dead Reckoning (DR) GPS Failure Popover indicator

FIG. 92 DR Panel Mode Header

FIG. 93 DR Panel Mode Header and GPS Failure Popover within Scott IPC app

FIG. 94 DR mode enabled, initial state display

FIG. 95 DR mode enabled, initial state within Scott IPC app

FIG. 96 DR mode enabled, pilot inputs completed

FIG. 97 DR mode enabled, pilot inputs completed, within Scott IPC app

FIG. 98 DR mode enabled, aircraft estimated location (EST LOC) and pilot input details FIG. 99 DR mode enabled, quick view state FIG. 100 DR mode enabled, quick view state within Scott IPC app FIG. 101 DR mode enabled, quick view state, approaching leg end alert FIG. 102 DR mode enabled, quick view state, approaching leg end alert within the Scott IPC app FIG. 103 DR mode log FIG. 104 DR Mode Enabled, GPS Restored FIG. 105 DR Mode Manually Enabled for training

DETAILED DESCRIPTION OF THE EMBODIMENTS

Figure 1A:
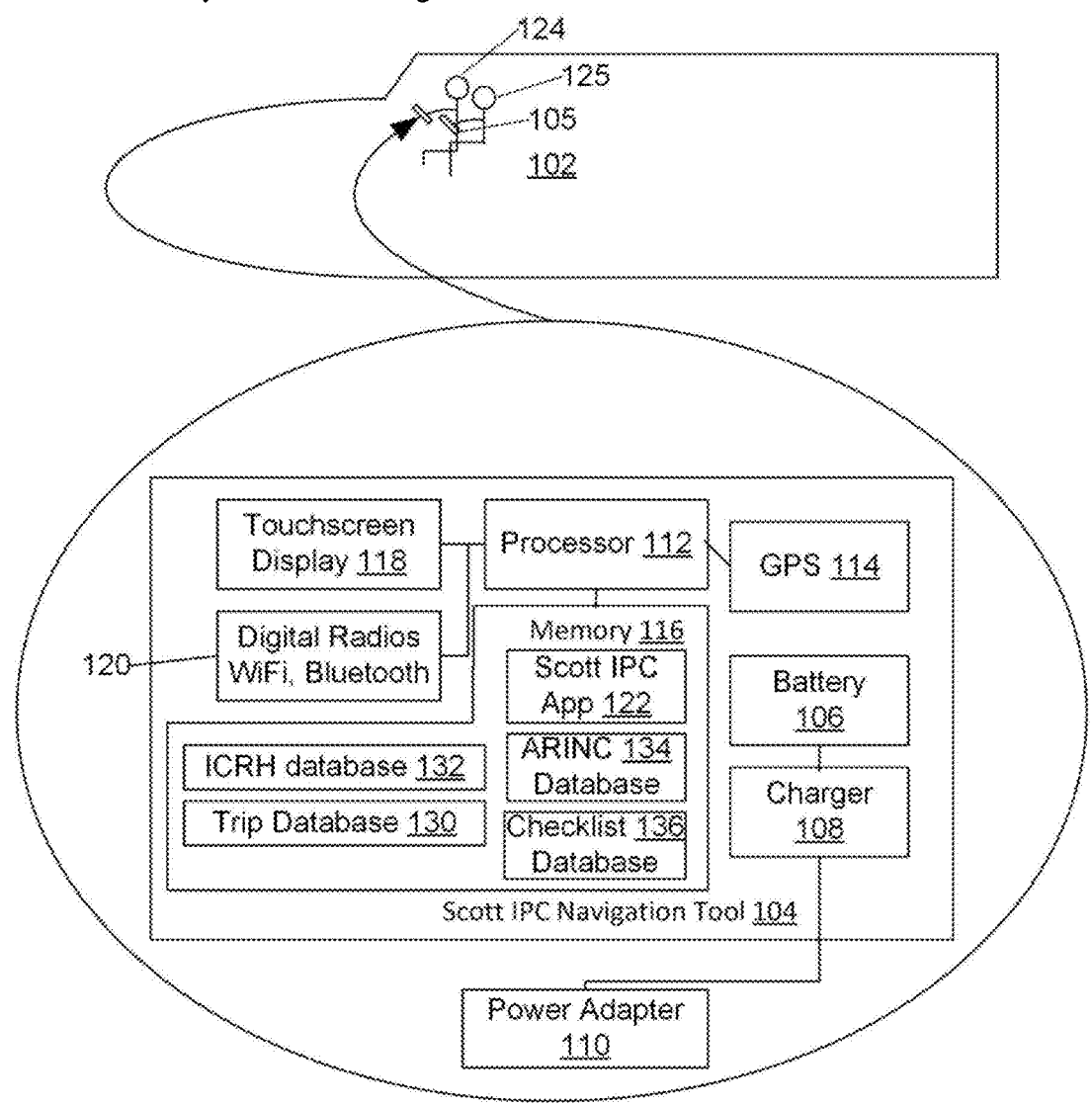
FIG. 1A illustrates a tablet computer adapted to be powered by an internal battery or a power socket useful as an International Oceanic Navigation Assistance Flight Tool by pilots in an aircraft.

An aircraft 102 (FIG. 1A) engaged in overwater international operations carries in its cockpit one, or preferably two, Scott IPC flight navigation tools 104, 105. The flight navigation tools 104 are typically provided one for each of, and accessible to, a pilot 124 and copilot 125. Each Scott IPC flight navigation tool 104 includes a tablet computer configured with power from an internal battery 106 and has as a battery charger 108 adapted for connection through an external power adapter 110 to aircraft power to ensure operation during long flights. Each flight navigation tool 104 has a processor 112 coupled to an internal GPS 114, memory 116, touchscreen display 118, and digital radios 120 adapted for IEEE 802.11 Wi-Fi and Bluetooth network connectivity. The flight navigation tools, typically implemented using Apple iPad tablet computers, are configured with a Scott IPC app 122 in memory 116, the Scott IPC app configures the iPads as flight navigation tools 104, 105 by providing machine readable code adapted to configure a trip database 130. The flight navigation tools are configured to be linked together through digital radios 120 and serve as an international procedures tool useful to the pilot 124 and copilot (not shown) while enroute during long, overwater, international flights.

The Scott IPC fight navigation tool 104, 105 is a portable device intended to assist pilots in compliance with international flight procedures and navigation for training while also providing in-flight operational guidance to pilots flying international, overseas flights. Once the app is downloaded onto a tablet computer and the tablet computer becomes a flight navigation tool with all components downloaded, an internet connection or IEEE 802.11 digital radio (Wi-Fi) connection is not required to utilize the capabilities of the device. The Scott IPC app contains an International Cockpit Reference Handbook (ICRH) covering areas of operation from around the world to include as a primary focus International Oceanic Operations, the flight navigation tool provides machine readable code for reading the ICRH 132. This information is provided to pilots to obtain critical in-flight and planning guidance to ensure crews have the required information to operate aircraft to ensure compliance with national authorities and the International Civil Aviation Organization (ICAO) requirements. Each country is responsible to establish and publish rules and procedures to operate aircraft in their airspace. These rules are published in each countries Aeronautical Information Publications and is updated on a fixed revision cycle. Oceanic Airspaces beyond 12 NMs off a coastline is recognized by ICAO and all signatory countries to the ICAO convention as international airspace. Although no country owns airspace beyond 12NM's from their shoreline, ICAO has an agreement with various countries to manage the airspace. The Scott IPC flight navigation tool as configured with the Scott IPC app also includes an ARINC 424 database 134 including ICAO-defined oceanic and domestic routes with associated named reporting points and coordinates of waypoints, international airport locations with frequencies, and NAVAID locations, frequencies, identifiers for all NAVAIDS worldwide. Also depicted boundary information for restricted, alert, and warning areas and other special use airspace at sea. The Scott IPC flight navigation tool also includes a configurable checklist database 136 containing checklists of actions to be performed at various phases of international flight operations.

The Scott IPC flight navigation device also contains a comprehensive Glossary of terms with definitions of issues and items often addressed by pilots flying international trips. The flight navigation device also contains aviation conversions often utilized by pilots flying internationally. These conversions are in a single area in the device and are quickly accessible via the main menu.

The Scott IPC flight navigation device also contains a one of a kind Electronic Plotting Chart Solution known as Scott Plot. This Electronic Plotting Chart is a unique training and operational tool specifically designed to be utilized by aircrews operating aircraft in Oceanic Airspace and is configured to provide a moving-map display of data from the ARINC database 134 together with many other icons and indicators. There is no product on the market with these capabilities available to aircrews outside of this Electronic Plotting Chart.

Pilots are required to perform certain plotting events during the oceanic crossings. The Scott IPC Scott Plot Electronic Plotting Chart provides a means by which pilots may both train and operationally meet the ICAO and the U.S. FAA (Federal Aviation Administration) regulations and follow industry best practice regarding plotting procedures using this electronic plotting chart solution. The Scott IPC Scott Plot sm. Electronic Plotting Chart has features that have never been built in a portable device before. It is a first-in-industry product. Operators have in the past attempted to perform plotting procedures using a graphic of a paper plotting chart on an electronic device. The paper plotting chart converted to a graphic, although suitable to be displayed on an iPad or tablet, has inherent limitations that prevents effective use in day to day operations and certainly in emergency situations resulting from an aircraft navigation system failure. A simple graphic will not allow for plotting or course measurement functions. The Scott IPC Scott Plot sm. Electronic Plotting Chart is a fully functional, independent, standalone navigation tool as well as a feature that performs required and desired auto plotting calculations as described herein.

This Scott IPC flight navigation tool with Scott Plot Electronic Plotting Chart integrated solution contains the following functions, processes, and tools. Each will be discussed in this document: The term "Unique to this tool" indicates that this is a first on the market solution that has never been built as part of an electronic standalone tool serving as a Navigation Plotting device.

The Scott IPC tool intra-app navigation is broken down into three main areas, as referenced in FIG. 1B. Icons of the top button bar 200 remain visible regardless of the selected bottom view, as do icons of the bottom views bar 220. The left and right vertical button bars (230 and 240 respectively) are available when focused on the Scott Plot View 223 and represent the core enroute oceanic plotting tasks, navigation and chart manipulation. Each icon is activated by tapping it as it is displayed on a touchscreen of the Scott IPC navigation tool.

Top Button Bar (200)
  Home Button (202)
    Routes user to home screen
  Notifications (203)
  Indicates Sync Status (FIGS. 40-43) (204)
    Indicates sync status and allows user to sync with another device
  Indicates active or inactive GPS (FIGS. 2a, 2b, 4) (205)
  Current date/time (206)
  Access active flight plan (207)
  Access Scott IPC/Custom Checklists (FIGS. 19-25) (208)
    Allow users to set a checklist, and once set, allow users direct access to a chosen checklist for use during flight
  App settings (209)
    Allows user to manage app settings
Bottom Views Bar (220)
  Preflight Wizard (FIGS. 69-78) (222)
    Allow user to access the wizard (FIGS. 69-78) for a step-by-step walkthrough of Preflight app setup
  Access Scott Plot Chart (223)
    allows user access to the Electronic Plotting Chart tool which includes the moving map display on which routes, waypoints, NAVAIDs, reporting points, GPS failures, and other features discussed below are displayed; including the ScottPlot toolbox functions.
  Access the ICRH (224)
    allows user access to the proprietary International Cockpit Reference Handbook
  Access the Flight Bag (section 30) (225)
    Allow user to upload or access uploaded PDF documents, including from email, saved documents on iPad, or from the Scott IPC Portal. (See Section 30)
  Access the conversions (226)
    Allow user to select and complete needed conversions for flights, including Jet Fuel Weights & Volumes, Climb Rate, Ft/M, Wind Speed, Altimetry, Distance, Temperature, and Weight
  Access More (Glossary and support) (227)
Left Vertical Chart Bar (230)
  Chart Layers (231)
    Turn chart navigation data on/off.
  Track Details (232)
    Retrieve latest time sensitive information for North Atlantic and Pacific Tracks
  Leg Distance (233)
    Turn on additional navigation information showing ground speed, ETE, ETA and leg distance remaining.
  10 Minute Check (234)
    Add a 10-minute check to the navigation chart along the route of flight.
  Position Report (235)
    Add a position report.
  Oceanic Flight Reminders (236)
    Show status of oceanic flight reminders for a trip.
  Pin Position (237)
    Drop a pin on the chart with a note.
  Notepad (238)
    Quick access notepad for oceanic flight.
  Chart Annotation (239)
    Add chart, flight plan and document annotations.
Right Vertical Chart Bars (240)
  Toolbox—menu access app tools (241)
  Direct To (242)
    Enable the pilot to look up and fly direct to a waypoint.
  Search Chart Navigation (243)
    Search and locate chart navigation elements such as airports, intersections, airways.
  North up/Course up toggle (244)
    Change chart orientation from north up to course up.
  Center Aircraft (245)
    Center chart on aircraft.
  Zoom map in (246)
  Zoom map out (247)

Tools of the ScottIPC flight navigation tool include, as per section numbers in the flight navigation tool description below:

1. Automatic Oceanic Procedure Reminders based on location and phase of flight "Unique to this tool"
2. GPS functionality with failure and recovery time stamps "Unique to this tool"
3. Provides a means to automatically plot a routing based on an Oceanic Clearance using ARINC 424 named waypoint identifiers "Unique to this tool"
4. Modify routes by entry into a data form, or via drag and drop of waypoints using Snap to Feature "Unique to this tool"
5. Interactive, auto-populating, Navigation System Accuracy Check populated and presented Prior to Coast Out "Unique to this tool"
6. Interactive, Modifiable Checklist "Unique to this tool"
7. Automatically plot a 10-minute check after entry in data block "Unique to this tool"
8. Built in Position Report Form "Unique to this tool"
9. Plot Position
10. Distance Measuring
11. Annotation Tool
12. Automatically or Manually build ETP's "Unique to this tool"
13. Automatically Sync multiple devices, Primary/Secondary Feature
14. Provides Full Route Details for checking courses and flying D.R. (Dead Reckoning) courses "Unique to this tool"
15. Automatically plots a wind correction stamp on route of flight. "Unique to this tool"
16. Provides Selectable Layers
Provides selectable Layers:
a. Layer indicating Airports
b. Layer indicating NAVAIDS
c. Layer indicating Waypoints
d. Layer indicating Fixed Routes
e. Layer indicating ETP's (Equal Time Points), "Unique to this tool"
f. Layer indicating Flight Information Regions
g. Layer indicating Full Route Navigation Details per route leg "Unique to this tool"
h. Layer indicating controlled airspace
i. Layer indicating NAT Tracks Westbound
j. Layer indicating NAT Tracks Eastbound
k. Layer indicating Pacific Tracks East and Westbound
17. Currently Effective North Atlantic Tracks Layers separated by Direction, "Unique to this tool"
18. Distance for all Route Segments Layer "Unique to this tool"
19. Airports layer
20. NAVAIDS Layer
21. Waypoints Layer
22. Fixed Routes Layer
23. ETPs (Equal Time Points) Layer
24. Flight Information Regions (FIRS) Layer 25. Full Route Navigation Details LAYER "Unique to this tool"
26. Controlled Airspace Layer
27. Layer indicating Pacific Tracks East and Westbound
28. Speed, Distance, Time Calculator design of calculator "Unique to this tool"
29. FREEPLAY/LOFT MODE "Unique to this tool"
30. Flight Bag Upload from ScottlPC portal for use in the flight navigation tool "Unique to this tool"
31. Track Message Upload from ScottlPC backend for use in the flight navigation tool "Unique to this tool"
32. Creates and Manages Journey Logbook "Unique to this tool"
33. Automatically forwards closed out Journey Logbook to clients' portal based on clients' method desired. "Unique to this tool"
34. Share closed out Journey Logbook via email, messaging apps, AirDrop as well as store to cloud storage (such as Box) "Unique to this tool"
35. Allows upload of PDF for use in the flight navigation tool "Unique to this tool"
36. Integrates into ScottlPC International Cockpit Reference Handbook (ICRH) "Unique to this tool"
37. Provides User Profile Information
38. Provide user notification of changes to ICRH "Unique to this tool"
39. Allows Flight Department Administrators to assign permissions through the back end "Unique to this tool"
40. Allows permissions to be assigned to individual aircraft "Unique to this tool."
41. Allows users to upload documents to their personal account on the backend and pulls those documents to the flight navigation tool. "Unique to this tool."
42. Restricts access to sensitive documents as assigned by the user or flight department (FD) administrator. "Unique to this tool"
43. Allows user to build a specific plotting chart coverage based on route of flight and oceanic area flown. "Unique to this tool."
44. Automatically downloads relevant operational data and worldwide ARINC 424 database without pilot's intervention Upload process "Unique to this tool"
45. Functions without the need for internet connection
46. Allows pilot control of data usage of the flight navigation tool in flight due to the high cost of in-flight data from sat providers. "Unique to this tool"
47. Indicates unique zoom levels and phased in graticule lines designed for plotting ease. "Unique to this tool"
48. PP DIR TO (Present Position Direct To)
49. Has a day/night mode to preserve night vision in the cockpit
50. Brightness control
51. In-flight navigation tool rotates screen lock to accommodate aircraft maneuvering
52. to this tool."
53. NAT RADAR & ADS-B Surveillance Corridor for multiple altitudes "Unique to this tool."
54. Plotting Chart Setup Wizard
55. Toolbox Item Menus "Unique to this tool"

The Scott IPC flight navigation tool has the following features:

1. Oceanic Flight Reminders: "Unique to this Tool".

This function assists pilots in execution of best practice and regulatory use of an inflight checklist covering procedures used in a Remote Oceanic Airspace. Flying Oceanic flights can result in a high cockpit workload during certain phases of flight, often resulting in missed procedures which compromise safety. Remote Oceanic Flight is Procedural Airspace, meaning if the correct procedures are not followed, adequate separation from other aircraft is not assured. It is not classified as Surveillance Airspace because Air Traffic Control typically does not have real time position information on the aircraft. The Oceanic Flight Reminders feature automatically provides the pilot with a checklist containing procedures to be followed based on the known location of the aircraft and phase of flight. The reminders function allows the pilot to manage the presentation of assigned tasks to follow, based on the experience level of the cockpit crew as reminders may be enabled or disabled individually. No other resource offered on today's market has this capability. "Unique to this tool."

With reference to FIG. 1, a menu display of Oceanic Reminders for transoceanic flights:

1.1 Users are presented a menu of actionable, oceanic reminders that can be enabled or disabled. This reminder push notification is unique and has never been built before in any portable electronic device.

1.1.2 Setting a reminder to "on" enables a set of push notifications that will provide the user with an actionable, modifiable checklist that contains entries specific to the location and phase of flight the aircrew is currently in.

1.1.3 There are individual selections for each reminder to enable or disable as well as a selection to enable or disable all reminders. All reminders are enabled by default.

1.1.4 An individual notification, once received, can be dismissed by the user.

1.1.5 Each notification pop-up containing an enabled checklist appears regardless of whether the Scott IPC flight navigation tool is actively on the screen.

1.1.6 The automatic presentation of each enabled checklist occurs after takeoff at a predefined time and/or distance from a point requiring an action.

1.1.7 The following notifications are provided as options in Oceanic Flight Reminders:

1.1.7.1 Prior to Coast-Out Enroute to the Outbound Gateway, Approaching Waypoints, After Passing Waypoints, Coasting-In to Landfall. Other reminders include a reminder for a Ten-Minute Position Check, approaching a new Flight Information Region (FIR), Wind Drift Correction Log.

1.1.8 The following triggers will activate an Oceanic Flight Reminder.

1.1.8.1 Prior to Coast-Out (FIG. 22)

1.1.8.1.2 Fifteen minutes prior to the first Oceanic WPT (Waypoint) loaded as part of a route the Prior to Coast Out portion of the oceanic checklist is presented to the pilot.

Figure 23:
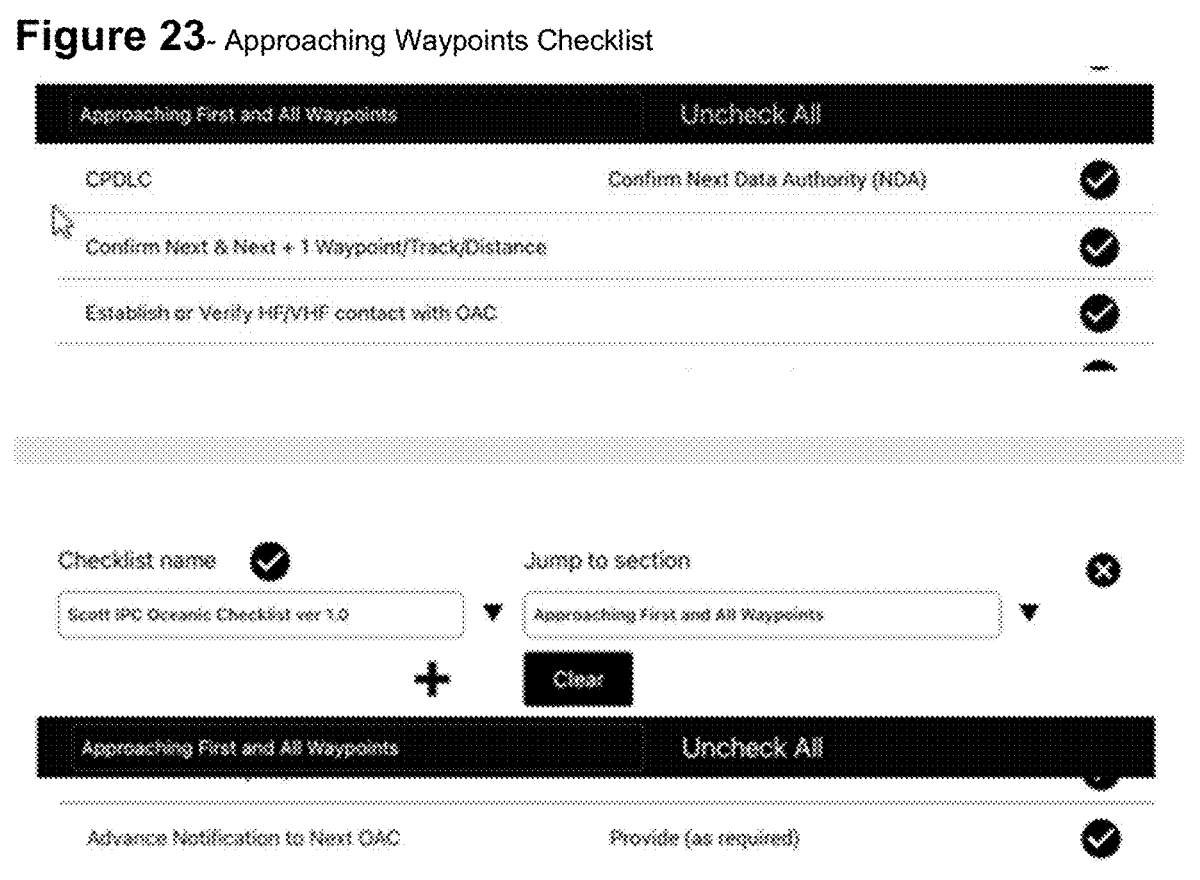

1.1.8.2 Prior To Passing Waypoint (FIG. 23)

1.1.8.2.1 Two minutes prior to passing every waypoint loaded as part of a route the Prior To Passing Waypoint portion of the checklist will be presented to the pilot.

1.1.8.3 After Passing Waypoint (FIG. 24)

1.1.8.3.1 Two minutes after passing every waypoint loaded as part of a route the After Passing Waypoint portion of the checklist will be presented to the pilot.

1.1.8.4 10 Min Check (FIG. 26)

1.1.8.4.1 Eight minutes after passing every waypoint a popup data entry box will be presented to the pilot so that he or she may enter the position as calculated by the aircraft navigation system. A notification will be received that states 'In 2 minutes perform the 10 Minute Check.' with a provided data entry box for the 10 minute check latitude and longitude entries.

1.1.8.5 Approaching New FIR 1.1.8.5.1 Ten minutes prior to reaching a Flight Information Region (FIR), a popup notification is received that contains the following; "You are approaching (FIR ID—4chars) FIR. Make appropriate voice contact, and/or ensure the CPDLC Logon hand-off Occurs. Look for advanced notifications".

1.1.8.5.2 The FIR information is automatically populated into the notification based on the Aircraft current GPS position. The FIR that is displayed will be the FIR ICAO ID that the aircraft is approaching. It is the FIR ID that is on the opposite side of the FIR boundary from the current aircraft position.

1.1.8.5.3 The pop up appears regardless of whether the Scott IPC flight navigation tool is opened in the foreground.

1.1.8.5.4 An x closes out the box without action.

1.1.8.5.5 With GPS failure a popup notification indicating no reminders will function until GPS is regained is presented to the pilot.

1.1.8.5.6 If GPS is unavailable and a waypoint is passed, when GPS is regained, the popup will reflect the next FIR at 10 minutes prior to reaching that point.

1.1.8.5.7 If GPS is lost and then regained with less than ten mins to fly to the next FIR, the popup reminder will be delivered with the actual time to go to the FIR.

1.1.8.6 Capture Wind Drift Correction (FIG. 48)

1.1.8.6.1 Halfway between WPT's as calculated by a great circle route distance, a notification will be received that prompts the user to enter wind drift correction (WC) information which will place wind drift correction information on the plotting chart. The Wind Drift Correction stamp will be positioned at the exact GPS position at the time the data is posted. With no GPS signal, the user can position the WC stamp anywhere on the plotting chart. The Wind Drift Correction stamp is used for future Dead Reckoning if needed.

1.1.8.6.2 User is presented with a custom keypad that has a + and − for wind component.

1.1.8.6.3 User is presented with an open entry box where the user may enter the wind component.

1.1.8.6.4 User can select "Post" from the numbers pad, a wind correction (WC) stamp is then posted at the current GPS position.

1.1.8.6.5 The WC stamp notification will not be presented if GPS is not active. The user may use a WC stamp at any time through the main menu toolbox system.

1.2 Reminders—aural and visual warnings. If the pilot is not in the app, audio and visual reminders will show on screen. This notification scheme ensures the pilot will not miss a reminder. Example, a pilot is working in another app while enroute oceanic, Scott Plot will sound an aural and visual reminder. Pilot tapping the reminder returns focus back to Scott Plot and the specific oceanic reminder in question. This functionality is in addition to reminders presented while the pilot is actively working in Scott Plot. (FIG. 1)

2. GPS Functions, FIGS. 2-7

2.1 When user clicks the GPS icon, a GPS Source menu (FIGS. 5-6) pops up with two options; 'Enable', 'Disable GPS'.

2.2 The GPS position of the aircraft will always show on the plotting chart when GPS is enabled.

2.3 User will always have a GPS status icon indicator on the top of the screen.

2.4 The GPS status icon indicator (FIGS. 2a, 2b, 2c) changes from green when enabled and functioning properly, to white with a red circle around it with a diagonal line in the circle when loss of GPS signal has occurred or when GPS has less than 3 satellites to track.

2.5 User will see gray dots indicating the path as read from the GPS, as long as GPS is active with at least 3 satellites in view. The GPS position read from the GPS receiver is displayed as an aircraft icon. No other standalone electronic portable device configured into a flight navigation tool by an app provides this flight path tracking functionality.

2.6 The aircraft icon moves on the plotting chart as the GPS changes position.

2.7 User is presented with blue dots for the previous GPS path. One dot populates every 15 seconds. "Unique to this tool."

2.8 With a GPS failure, User is presented with a vertical red line indicator (FIG. 7) on the Plotting Chart displayed at the exact position that the GPS fails or the GPS signal is lost, or less than 3 satellites are in view. The GPS path dots will no longer populate with a GPS fail. "Unique to this tool."

2.9 User is presented with a time stamp indicating the time of loss of GPS and it is positioned near the red line. "Unique to this tool." This allows for an investigation as to where and when GPS failure occurred.

2.10 The GPS position dots will populate again with regained GPS signal, but the previous red line stamp indicating loss of GPS remains on the chart. "Unique to this tool."

2.11 The GPS fail timestamp is labeled in Zulu Time indicating Date, HH:MM:SS Zulu time. "Unique to this tool."

2.12 User will see a green line and a time stamp placed on the plotting chart at the exact position when GPS signal is regained. Time stamp will be Date, HH:MM: SS Zulu time. "Unique to this tool."

2.13 The time stamps are always positioned on the Plotting Chart display so as not to overlap. "Unique to this tool"

2.14 The previous GPS position information is stored to be used for in app calculations needed. "Unique to this tool."

2.15 Figure(s). User can select North Up, Track Up, zoom in (+) and zoom out (−) and center aircraft on the right hand vertical button bar on the Scott Plot view. (FIGS. 3A,3B, 3C,3D,3E)

2.15.1 User can select N (North Up) or T (Track Up) as options for viewing the Scott Plot chart while using GPS position. (FIG. 3a, 3b)

2.15.2 User can select to zoom in (+) or zoom out (−) or T (Track Up) as options for viewing the Scott Plot chart while using GPS position. (FIGS. 3c, 3d)

2.15.3 User can select the center aircraft icon to locate the aircraft and center it on the chart. (FIG. 3e)

2.16 User can select the GPS icon at the top of the NAV bar to select 'ENABLE' or "DISABLE' the GPS connection.

3. The Scott IPC flight navigation tool provides a means to automatically plot a routing based on an Oceanic Clearance using an entry form illustrated in FIG. 8, "Unique to this tool".

3.1 User can select TOOLBOX→Flight Planning→Build/Modify Routes→Autoplot legs and is presented with a route entry form screen. "Unique to this tool."

Automatically plot route by programmatically reading flight plans. The Scott IPC tool reads multiple vendor and multiple format flight plans to automatically plot the route(s) but also allows the user to edit the route or build the route manually.

3.2 User can enter a named waypoint directly in the From or named boxes. Using the following formats:

3.2.1 4850N which is decoded to represent 48° N 050° W.

3.2.2 H4850 which means N48° 30', 050° W.

3.2.3 Five letter named waypoint (example: DOTTY), these are looked up in an internal database to determine latitude and longitude.

3.2.4 Entered "NAMED" values from the Oceanic Clearance screen will plot on the chart according to the latitude and longitude associated with the NAMED values from the ARINC DB.

3.2.5 Full latitude and longitude in the From field box: N51 degrees 00.0 minutes, W050 degrees 00.0 minutes.

3.3 When the user selects an entry box the keypads are active and the user can enter characters and they automatically fill in, in the order of the placeholders.

3.4 The user can tap the next box, and then populate that box.

3.5 The user can enter a named waypoint, that Lat/Long is automatically shown in the Lat/Long boxes.

3.6 A user can insert a leg, add a leg, delete a leg, clear a leg, delete all legs, or clear all legs.

3.7 The user can select Clear Leg Data to clear a leg allowing the user to re-enter the leg data. This replaces the leg information on the plotting chart once the user selects POST ROUTE.

3.8 When the user clears a leg, the space remains available to re-enter a new waypoint. The route leg can be removed when user taps 'X' next to leg entry box.

3.9 The user can CLEAR ALL LEG DATA and gets a popup stating "CONFIRM CLEAR ALL LEG DATA YES|NO. Selecting yes clears all leg data and, selecting no closes the popup without clearing all leg data. The plotting chart is not changed until Post Route is selected.

3.10 The user can DELETE a WAYPOINT.

3.11 When deleting a waypoint, the user gets a warning popup to confirm the deletion. "Delete Waypoint" "YES| NO," (FIG. 9).

3.12 If the user selects yes, the Waypoint is deleted entirely, and the gap is closed between waypoints.

3.13 If the user selects NO, then the delete operation is cancelled.

3.14 After a route is built and posted to the plotting chart, the user can open BUILD—MODIFY ROUTES/AUTO PLOT LEGS at any time and the previously Posted route are populated in the boxes.

3.15 A user can invert the direction of the route in case of an emergency return. "Unique to this tool"

3.16 User can select POST ROUTE to post the route entered on the plotting chart after verification.

4. Re-Route Modify Route Drag and Drop (FIGS. 10A, 10B & 11)

4.1 The user is able to modify the active route via a graphical interface on the chart. This means the user can tap and hold on the route overlaid on the chart to insert waypoints as necessary to modify the route. This functionality can be accessed in two ways. The first if by selecting the Toolbox→Build/Modify Routes→Re-Route Modify Route Drag and drop. The second method is by a direct tap on the route overlaid on the chart. The former is just a different starting point.

4.2 (FIG. 10A, 10B) When a user elects to MODIFY A ROUTE USING DRAG & DROP, they are presented with a magnifying glass symbol showing the segment of route to be edited via the drag of the route line (FIG. 10*a*) and an alert asking to confirm adding the selected waypoint to the route (FIG. 10*b*) with the options of Cancel, Add as well as a question "Is this an ATC Directed Change?"

4.2.1 If the user selects "Cancel", the operation is canceled, and the route remains unchanged.

4.2.2 If the user selects "Add," the operation will add the selected waypoint to the route, thus modifying the route.

4.2.3 If the user selects "Add" AND the option "Is this an ATC directed change?" the original route segment that was modified via the drag and drop is preserved with a light gray line for journey logbook purposes and the updated route line the pilot will fly is drawn. If the user does not elect this option, the route line is modified according to the drag and drop without the gray line.

4.3 Re-Route Modify Route Drag and Drop SNAP TO options

During the drag and drop operation, the user is also presented with four options as to HOW to modify the route, this is called SNAP TO. There four options are; Whole Degree, Half Degree, Waypoint and None 4.4 The user is also presented with a pop up box asking what snap to value to use. (FIG. 11).

4.5 The SNAP TO feature allows easy placement of the leg by placing the end exactly to the closest point based on the snap value selected. "Unique to this tool"

4.5.1 SNAP to Whole degree Lat/Long, positions the end to the point of Latitude and longitude to whole degrees.

4.5.2 SNAP to ½ degree snaps the end to the nearest whole degree of longitude and 1% degree latitude.

4.5.3 SNAP to named waypoint snaps to the nearest named waypoint that is not a latitude or longitude name.

4.5.4 SNAP to None allows the user to drop the route anywhere on the map 4.6 User can touch any waypoint on the route, and a magnifying circle appears, showing the waypoint to be modified. The magnifying circle contains a crosshair and magnifies the area of the waypoint to allow the user to accurately move the waypoint. The magnifying circle is removed when the user removes finger from the screen. "Unique to this tool"

4.7 User sees a popup asking user to confirm modified route, (i.e., "Add N55.0 W40.0 to route? Cancel| Add" along with the option "Is this an ATC directed change") "Unique to this tool"

4.8 The user can move any existing route leg by dragging and dropping the intersections or ends to a new location. The route lines will stay connected to the waypoint moved. "Unique to this tool"

4.9 The new location (LAT/LONG or Name) automatically replaces the names in the AUTO PLOT LEGS BOX.

5. Navigation System Accuracy Check (FIGS. 12-18) "Unique to this tool"

5.1 Operating in Performance Based Navigation (RNP) Remote Oceanic Airspace requires that aircraft navigate to a required navigation specification as directed by the International Civil Aviation Organization (ICAO). For aircraft operators to ensure compliance with the navigation standard published for the airspace concerned, the operator must verify the accuracy and proper functioning of the navigation systems installed prior to entering such airspace. The Navigation System Accuracy check allows the operator to perform these performance checks by plotting the aircraft navigation system positions while also allowing the operator to plot and compare the position of the aircraft as derived from a non-aircraft system navigation source (i.e.: ground-based navigation source). The ability to plot multiple aircraft sensors alongside the ground-based positions reduces errors and allows the operator precise validation of own ships navigation sensor accuracy. User can select the Toolbox-→Enroute→Prior To Coast Out→Nav System Accuracy Check and User is presented with an entry form box containing multiple options for navigation sensors with associated custom keypads for Navigation System Position Check.

5.2 User can open the Navigation System Position Check box at any time and if entries have already been entered, they will appear in the boxes. (FIG. 12)

5.2.1 User can select any box and then, selecting any character from the keypads, post it in the placeholder.

5.2.2 The keypads are unique in that they only provide those characters that would be needed for the entries considered.

5.2.3 User can select View on chart, and any information entered is displayed on the Plotting Chart.

5.2.4 User can select that this box is to be appended to the 'Journey Log Book' at flight close out (a requirement for international operations when an aircraft is operated more than 12 miles off any coastline).

5.2.5 Each box has a defined max character placeholder capability.

5.2.6 If RAW R/DME data or the FMS R/DME is entered, when "View on Chart" is selected, then the following information is presented on the chart if a NAVAID was entered. If no NAVAID was entered prior to view on chart being selected, then the user gets a popup message informing the user "For the RAW R/DME or FMS R/DME, a NAVAID must be entered."

5.2.6.1 A Radial DME (Distance Measuring Equipment) is a method used in aviation to fix one's position using ground based VHF Omnirange (VOR) Navigation Aids (NAVAID) with co-located DME. The technique requires that an operator tune up a specific NAVAID and gather the magnetic radial from the NAVAID and the Distance as provided in the NAVAID's signal. This procedure is prone to error when the operator plots the position, as it is very difficult to plot a magnetic course to the level of accuracy needed to provide a validation of the accuracy of the aircraft navigation systems using a paper plotting chart. This flight navigation tool process provides a precise level of accuracy for the Radial DME location presented on the electronic plotting chart and location of the NAVAID as read from its internal database, and therefore increases the safety component of the accuracy check. No other flight navigation tool can plot an R/DME and convert it to Latitude and Longitude.

5.2.6.2 The user is presented a RAW R/DME sensor icon w/hide or show, and it is connected to the position entered. The position of the NAVAID is also shown on the Plotting Chart (FIG. 13) as a dot surrounded by a circle.

5.2.6.3 The entered Magnetic Radial is depicted while also converting the Radial and DME distance to a latitude and longitude. The (DME) distance to the NAVAID is also presented on the Plotting Chart.

5.2.6.4 The RAW R/DME information box is connected to a Hide/Show box labeled RAW R/DME position check. This box is connected to the exact latitude and longitude of the Radial DME position fix entered depicted in a Blue circle with a dot. The boxes and icons are Blue. This is significant as an aircraft flight management system always presents raw data in a blue color. This color scheme assists in lessening crew interpretation errors.

5.2.7 User can reposition the position label boxes and the Hide/Show icons, while leaving them connected without affecting the position of the RAW R/DME entered position. User can select hide on the icon, the position information, and the aircraft position circle and dot is hidden. The lines are removed as well. This enables a user to isolate the errored sensors. The Hide or Show icon remains if hide is selected. The NAVAID is in a Blue Circle with a DOT in the center.

5.2.8 FMS RADIAL/DME The FMS R/DME is an Aircraft Navigation System position output that is defined by a Magnetic Radial and a distance from a specific NAVAID.

5.2.9 The FMS R/DME position check function (FIG. 14) is nearly identical to the RAW R/DME method except that the icon and boxes presented on the plotting chart are green. The green color is significant in that calculated aircraft position information is presented in green in an aircraft Flight Management System. This color scheme assists in lessening crew interpretation errors.

5.2.10 FMS1, FMS2, FMS3 (FIG. 15) The FMS1, FMS2, and FMS3 positions are plotted directly as Latitude and Longitude based on the entries of the pilot. The green signifies calculated by the aircraft's Flight Management System information as derived from on board sensors.

5.2.11 IRS1, IRS2, IRS3 see (FIG. 16). The IRS (inertial reference system) position check is identical to the FMS1, FMS2, FMS3 AND THE GPS CHECK except for the color. IRS plots use Magenta to distinguish the sensor type.

5.2.12 GPS (FIG. 17). The GPS Position Check is identical to the IRS or FMS position check except that the color is unique with latitude and longitude entered from a position fix determined by aircraft systems separate from the GPS used by the Scott IPC flight navigation tool. GPS information is purple.

5.2.13 When 'VIEW ON CHART' is selected from the Nav Sys Pos Check Box, a "SENSOR LISTING" dropdown box (FIG. 18) is at the top of the chart. It is always present but defaults to collapsed. All sensor data with positions and lines appear on the chart that were entered for a check. The SENSOR listing allows the user to hide results of any sensor entered. When open, only sensors that were entered show up on the chart or on the Sensor listing.

5.2.14 Each Sensor position and lat/long box with attaching lines can be displayed or not displayed on the chart by selecting the "hide" or "show" box on each individual sensor. The sensor label with show remains when it is in hide mode. When shown it states "hide".

5.2.15 When the SENSOR LISTING dropdown box is used to hide a sensor, the sensor lines, the sensor position and lat/long box is removed but the Sensor I.D. label with hide/show remains.

5.2.16 An individual Sensor I.D. box can be moved to any position on the screen, whether in hide mode or fully shown. When shown, the lines will connect to its position and the now displayed lat/long box.

5.2.17 The default for each sensor within the Sensor Listing is "Show". Also shown when VIEW ON CHART is selected, is a link to return the user to the Navigation System Position Check Box.

6. Interactive Checklist

This Interactive Checklist (FIGS. 19-25) feature is unique to this flight navigation tool. Users may use a stock checklist that is organized by phase of flight and will help users remember to complete all necessary procedures for an international route. This checklist is customizable so that users can adapt the checklist to match their FAA approved or accepted IFOM (International Flight Operations Manual) to remain in compliance with procedures while maintaining a paperless or near paperless cockpit. Users may also create their own checklist from scratch. The Interactive Checklist is one complete checklist, and users can access the checklist from multiple areas of the menu to see the appropriate area for the current phase of flight. The checklist used is interactive. The user can check a box next to an entry to indicate the item is completed. The user can close out the checklist without checking any items, by clicking the x. The user can clear a misplaced check from the checklist if needed. A user can clear all x's from the entire checklist by selecting the "Clear Form" option.

Figure 19:
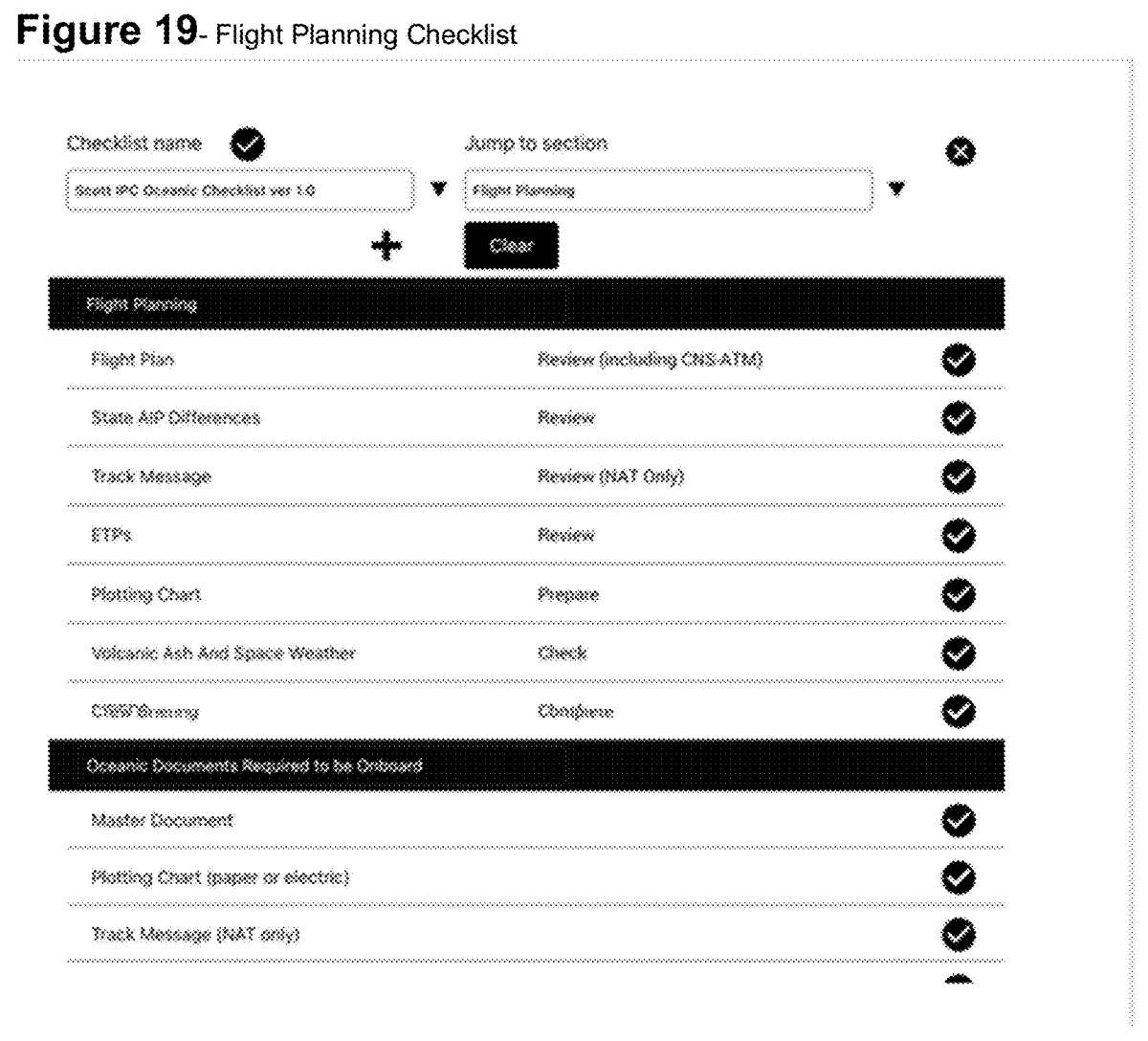

6.1 Flight Planning (FIG. 19)

6.1.1 User can select Toolbox→Flight Planning→Checklist Tapping this option from the toolbox will take the user directly to the Flight Planning section.

6.1.2 The Flight Planning Checklist provides the user with an interactive checklist of items that need to be completed prior to entering the aircraft.

6.2 Preflight (FIG. 20)

6.2.1 User can select Toolbox→Preflight Checklist. Tapping this option from the toolbox will take the user directly to the Preflight section.

6.2.2 The Preflight Checklist provides the user with an interactive checklist of items that need to be completed preflight.

6.3 Off Blocks Taxi Prior to Takeoff (FIG. 21)

6.3.1 User can select Toolbox→Off Blocks Prior to Takeoff Checklist. Tapping this option from the toolbox will take the user directly to the Off Blocks section.

6.3.2 The Off Blocks Prior to Takeoff Checklist provides the user with an interactive checklist of items that need to be completed prior to takeoff.

6.4 Enroute to Outbound Gateway (FIG. 22)

6.4.1 User can select Toolbox→Enroute→Prior to Coast Out→Checklist. Tapping this option from the toolbox will take the user directly to the Preflight section.

6.4.2 The Coast Out Checklist provides the user with an interactive checklist of items that need to be completed prior to coasting out over the water.

6.5 Approaching Waypoints (FIG. 23)

6.5.1 User can select Toolbox→Enroute→Approaching Waypoints→Checklist. Tapping this option from the toolbox will take the user directly to the Approaching Waypoints section.

6.5.2 The Approaching Checklist provides the user with an interactive checklist of items that need to be completed upon approaching waypoints.

6.6 Enroute After Passing Each Oceanic Waypoint (FIG. 24)

6.6.1 User can select Toolbox→Enroute→After Passing Waypoints→Checklist. Tapping this option from the toolbox will take the user directly to the After Passing Waypoints section.

6.6.2 The After Passing Checklist provides the user with an interactive checklist of items that need to be completed after passing waypoints.

6.7 Coast In (FIG. 25)

6.7.1 User can select Toolbox→Enroute→Coast In→Checklist. Tapping this option from the toolbox will take the user directly to the Coast In section.

6.7.2 The Coast In Checklist provides the user with an interactive checklist of items that need to be completed upon coast in.

7. Plot 10-Minute Check Automatically or Manually Using Oceanic Flight Reminders. Unique to this App. (FIGS. 26 & 27)

7.1 Automatically plot 10-minute checks using the Oceanic Flight reminders. If selected during the Oceanic Flight Reminders step in the Preflight Wizard, a reminder to plot a 10-minute check will be presented in front of the user at the appropriate time past Coast Out. At this point, the user may elect to use the GPS position to capture the lat/long of the 10 minute check by tapping on the "Use GPS" button (FIG. 26). The user may also elect to manually enter the lat/long of the 10-minute check. After the lat/long is entered, the user will tap "Post" to plot the 10-minute on the chart. The 10-minute check box consists of a custom numbers pad that contains N, S, E, and W appears prior to 'PLOT' being selected. The format of the latitude and Longitude entry is N55° 22.3' & W155° 22.3'.

7.2 Plot 10-minute check manually via button bar. The user may also at any point during the flight tap on the "10 Min" button on the left vertical button bar (add figure) to plot a 10-minute check. This will execute the same function as described in the previous paragraph and enable the user to "Use GPS" to plot the 10-minute check or manually enter the lat/long coordinates.

7.3 Plot 10-minute check manually via Toolbox. The user may also manually select TOOLBOX→In-Flight Tools→10 MINUTE CHECK to access the 10-minute check functionality. This will execute the same function as described in the previous paragraph and enable the user to "Use GPS" to plot the 10-minute check or manually enter the lat/long coordinates.

7.4 After the user elects to plot a 10-minute check (automatically or manually) a symbol is plotted on the chart (FIG. 27) depicting the location, time/date, lat/long, source of data for the 10-min checks as well as edit and delete functions.

8. Automatic Position Report Form Creation Using Oceanic Flight Reminders (FIGS. 28-31, 79) "Unique to this Tool".

Figure 28A:
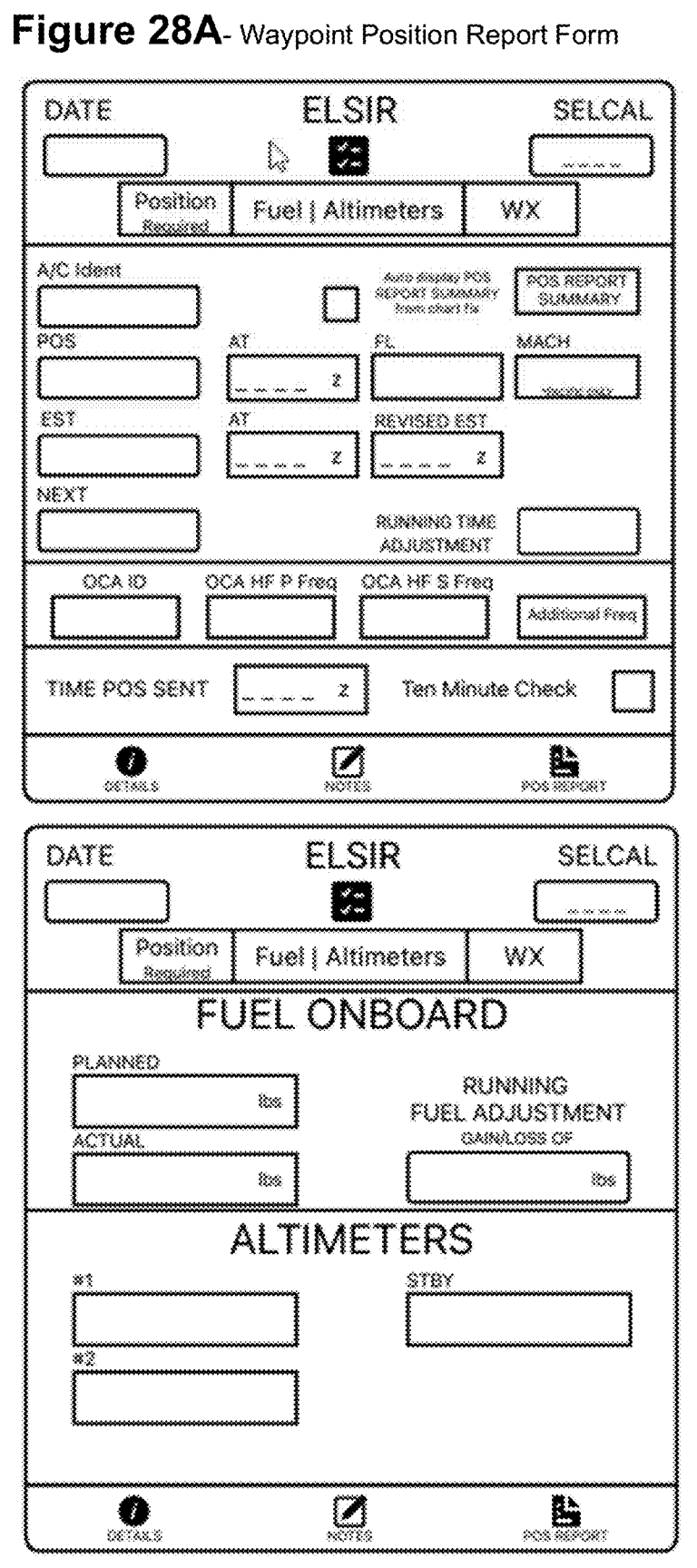
Figure 28B:
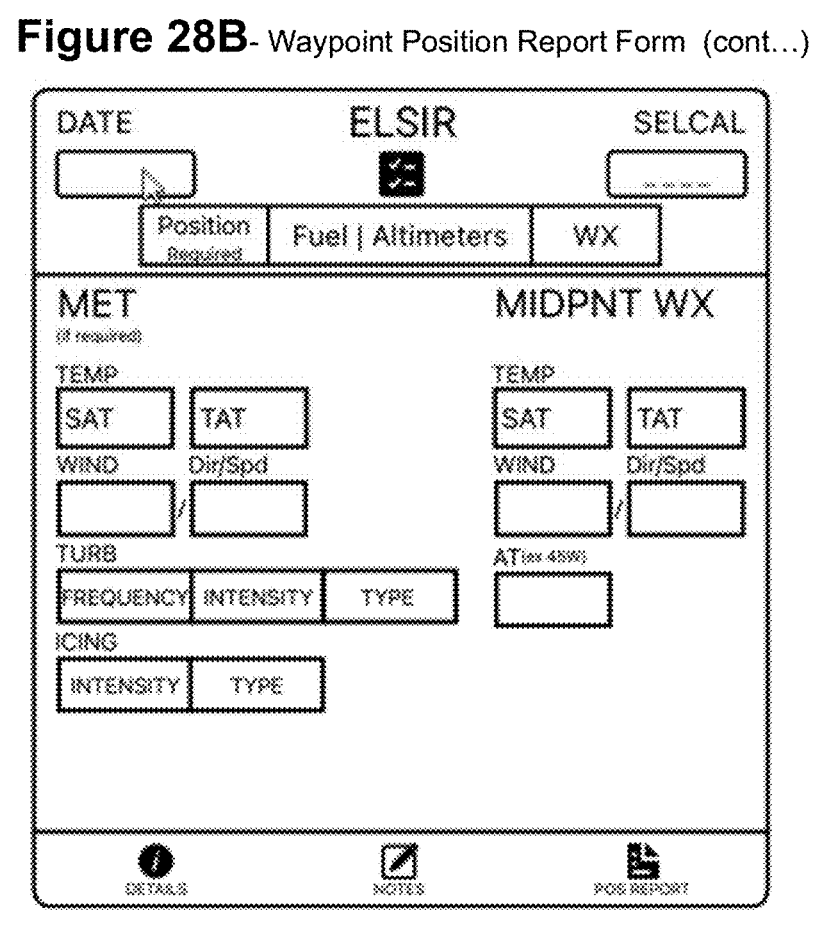
Figure 29A:

8.1 Position reports are mandatory for Oceanic Flight Operations. The Position Report Form is populated in part automatically by data captured from the aircraft flight management system and also by data entered directly by the pilot with waypoints used to build an operator's route only after receiving an Oceanic Clearance. This information is then passed to ATC. The order of information transmitted in a Position Report is clearly defined by ICAO. This method ensures that the information can only be entered after gathering the waypoints from the active Flight Management System. This assists the pilots in avoiding a common error in oceanic airspaces—where pilots report flying the flight plan route instead of the route of the clearance received by ATC. A position report is sent after passing every assigned waypoint for a crew's route. The user can capture position report information in one of two screens. The first is using the waypoint position report form (FIG. 28A, 28B). The second is by using the table (FIG. 29A, 29B). The different options store the same information, they are just presented in different ways to accommodate workflow variations.

8.2 Automatically create position report form entry using the Oceanic Flight reminders. If selected during the Oceanic Flight Reminders step in the Preflight Wizard, a reminder to enter position report form information will be presented after the aircraft has passed each waypoint between Coast Out and Coast In nominated waypoints. The user can tap on the oceanic reminder icon for POS Report (FIG. 28C) and the following information will automatically be captured in the position report form; date, SELCAL, A/C ident, current position and time AT that position, next waypoint, and the following waypoint. The user then adds the remaining required position report information.

8.3 Manually access and enter position report information at any time. The tool also allows for the pilot to enter position report information at any time using the following methods;

1) Selecting RED TOOLBOX→POSITION REPORT FORM
    a) Select Scott Plot (FIG. 1B, item 223), this will expose a red toolbox on the upper right hand toolbar (FIG. 79—item 242).

b) Tap on red toolbox and select Position Report Form (FIG. 79—item 235), this will open the Position Report Table (FIG. 29A)

2) Tapping on POS Report icon on the left vertical button bar
  c) Select Scott Plot (FIG. 1B, item 223), this will expose a POS Report icon on the left vertical button bar (FIG. 80).
  d) Tap on the POS Report icon on left vertical button bar, this will open the Position Report Table (FIG. 29B)

3) Tapping on any waypoint in the horizontal route waypoint list and selecting POS Report
  e) Select Scott Plot (FIG. 1B, item 223), this will expose the horizontal route waypoint list across the bottom of the screen left to right (FIG. 81)
  f) Tap on any waypoint in the horizontal list, this will open the Waypoint Position Report Form (FIG. 28A)

Any manually entered position is sanity checked to verify it has a valid latitude and longitude. In some embodiments the position entered is verified as being within a reasonably achievable distance from a position of any prior position reports, GPS positions, or waypoints to catch gross errors in data entry.

8.4 The position report form is appended to the journey log at flight closeout.

8.5 The Position Report Form has the following behavior;
1) Position report columns will be displayed one at a time automatically or manually using the +button. Each column added will pre-populate waypoint information to match the next waypoint on the route.
2) The user may manually add any number of additional columns
3) The form will always display the last three columns of position reports to enable quicker understanding of past position reports
4) The user can delete any column individually
5) The user can clear all columns
6) Displayed Columns will be displayed one at a time
7) When user adds a column, the previous column is moved to the left of the new one added.

8.6 Items on the Position Report Form (FIG. 28-29) include:
1) DATE: Current date used in Journey Logbook automatically populated with format: MM DD YR
2) AC IDENT: Automatically populated from Journey Logbook. Manual editing supported.
3) SELCAL: If stored on users' portal account, automatically populated. Manual editing supported, 4 PLACES.
4) POSITION: automatically populated after the aircraft has passed the waypoint, utilizing the GPS position information that is provided and interpreted by the tool. It is the 1st waypoint given in the clearance. Manual editing supported.
5) AT Time: HR: MM (4 PLACES) in Zulu that the aircraft passed the first position waypoint and is automatically populated after the aircraft has passed the waypoint, utilizing the GPS position information that is provided and interpreted by the tool. It is the 1st waypoint given in the clearance. Manual editing supported.
6) FL: Automatically populated just after the aircraft has passed the waypoint, utilizing the GPS position information that is provided and interpreted by the tool. Manual editing supported.
7) Mach: Speed of the aircraft automatically populated just after the aircraft has passed the waypoint, utilizing the GPS position information that is provided and interpreted by the tool. Manual editing supported.
8) EST POS (Position): It is the next waypoint on the active route and is automatically populated from the tool. Manual editing supported. Format no restraints. With any new columns added, the "EST POS" will be populated from the previous column "Next" waypoint entry.
9) AT Time: HR:MM Z, MANUALLY ENTERED, time pilot estimates passing the EST POS, 4 places with: place marker. Example 12:35z
10) Revised Time: The updated time HR:MM Z, MANUALLY ENTERED, pilot estimates passing the EST POS, 4 places with: place marker. Example 12:35z
11) Next: The Next waypoint is the waypoint AFTER and to the right of the column immediately next to the first column. Said differently, the Next waypoint in the first column will refer to the 3rd column, with an added column the 2nd column and "Next" row entry refers to the 4th waypoint in the oceanic portion of the route. This pattern repeats itself until the end of route. manually entered.
12) OCA ID: (Oceanic Control Agency I.D.) MANUALLY ENTERED, 4 places
13) OCA Freqs P and S (Primary and Secondary Oceanic Control Frequency) MANUALLY ENTERED, up to 5 places. OCA S, SECONDARY FREQ MANUALLY ENTERED, up to 5 places, allows a decimal anywhere.
14) Additional Freq: Additional OCA frequencies
15) Planned Fuel: Planned fuel at the column waypoint position report. Lbs. (pounds). Up to 9 places.
16) Actual Fuel: Actual fuel at the column waypoint position report. Lbs. (pounds). Up to 9 places.
17) Running Fuel Adjustment: A gain or loss of fuel available is automatically calculated for each waypoint. This is the difference between Planned and Actual fuel.
18) Temp SAT: Saturated Air Temperature. MANUALLY ENTERED negative symbol (−) then 2 characters.
19) Temp TAT: Total Air Temperature. MANUALLY ENTERED negative symbol (−) then 2 characters.
20) Wind Dir/Spd: Wind direction and velocity. Direction: 001-360 direction the wind is FROM. Velocity: speed of the wind.
21) Turb: Turbulence MANUALLY ENTERED. Intensity; None, Light, Moderate, Severe, Extreme. Type; None, Chop, Turbulence. Frequency; None, Occasional, Intermittent, Continuous.
22) Icing: Icing MANUALLY ENTERED. None. Type; None, Rime, Clear, Mixed. Intensity; None, Trace, Light, Moderate, Severe.
23) Altimeters #1, #2, STBY: ALTIMETERS—#1 MANUALLY ENTERED 3 PLACES, #2 MANUALLY ENTERED 3 PLACES, STBY, MANUALLY ENTERED 3 PLACES.
24) Time Sent: MANUALLY ENTERED, HR:MM z actual time example 12:35z
25) 10 Minute Check: Tap to add a check symbol.

8.7 User Can select plus symbol and add another column 8.8 Position report forms are automatically saved to the database and will be present when it is opened again.

8.9 The Position Report Form has a custom keyboard and keypad to facilitate quick and efficient entry of position reports as well as latitude longitude (FIG. 30)

9. Plot Position Using 10 Minute Check (FIG. 31)

9.1 User can select TOOLBOX→10 Minute Check or tap "10 MIN" on the left vertical button bar to access the 10-Minute Check tool to plot aircraft position. Either access method will present the 10-Minute Check screen (FIG. 31). This screen allows the user to enter latitude and longitude automatically from the GPS or manually.

9.2 Use GPS. This option allows the user to automatically populate the latitude and longitude of the aircraft from the current GPS position source. The user then taps "Post" to plot the aircraft position.

9.3 Manually Enter FMS Position. This option allows the user to hand enter the latitude and longitude from the aircraft FMS. The user then taps "Post" to plot the aircraft position. Either method of entering 10-minute information results in a symbol drawn on the chart representing the aircraft location, including: waypoint passing, date/time in Zulu, latitude and longitude as well as the source of the latitude and longitude. Functionality works with Apple magic keyboard or virtual custom keyboard containing N, S, E, and W selections. Either method of the 10-Minute check results in the information being saved to the journey logbook as a part of the flight for record documentation.

10 Plot Position Using Pin Position Note (FIG. 31)

10.1 User can select TOOLBOX→Pin Position Note or tap the pin position icon (add figure?) on the left vertical button bar to access the Pin Position tool to plot aircraft position and add a note if desired. Either access method will present the Pin Position (add figure?).

10.2 Use GPS. This option allows the user to automatically populate the latitude and longitude of the aircraft from the current GPS position source. The user then taps "Post" and is presented with the Pin Position Notes screen and can enter any information necessary. Once complete the user can tap the close "x" in the upper right hand corner.

10.2 Manually Enter FMS Position. This option allows the user to hand enter the latitude and longitude from the aircraft FMS. The user then taps "Post" and is presented with the Pin Position Notes screen and can enter any information necessary. Once complete the user can tap the close "x" in the upper right hand corner.

10.3 Either method of entering a Pin Position Note results in a symbol drawn on the chart representing the aircraft location, including: lat/long, type, when created (date/time Zulu) and last modified time). Functionality works with Apple magic keyboard or virtual custom keyboard containing N, S, E, and W selections. Either method of Pin Position Note results in the information being saved to the journey logbook as a part of the flight for record documentation.

11. Distance Measuring Tool (FIG. 32)

11.1 User can select TOOLBOX→IN-FLIGHT TOOLS→DISTANCE TOOL and will be presented with a line about 2 inches long with a box (white fill, black text) in the center and on top of the line that represents the distance.

11.2 User can relocate either end of the line to any position on the plotting chart. As the line is adjusted, the distance appears in the box centered over the line. It is always the Great Circle Distance.

11.3 User can tap the x and the distance line, and its value is removed.

12. Flight Plan and Scott Plot Chart Annotation Tool:

12.1 User can select ANNOTATION TOOLS icon represented by a pencil and is presented with a custom set of annotation tools. (FIG. 33).

12.2 User can bring up a set of annotation tools that include: pencil and a highlighter with ability to change colors (5 options for color), a text box label, and eraser to erase marks or text box labels.

12.3 User can adjust the size of a text box and position it anywhere.

12.4 User can move and size the textbox.

12.5 User can edit or delete any text box after it is built.

12.6 User can select eraser and use the eraser on a text entry or any other annotation.

12.7 User can use an 'undo' and 'redo' feature 12.8 The annotation tools are available for the flight plan as well as the Scott Plot chart.

12.9 All flight plan and chart annotations are saved to a flight's journey logbook as a part of the flight for record documentation.

13. Automatically and Manually Build ETP's (Equal Time Points) (FIGS. 34-38*b*) "Unique to this Tool"

An ETP (Equal Time Point) (FIG. 34) is a tool used on Oceanic Flights to identify that point along a route where it is the same time to fly to get to two alternate airports. This tool is required because it lets the pilot know the quickest way to get on the ground from anywhere along the route. An operator may have one, two or more ETP's along his route of flight. A single ETP would be appropriate if there was an alternate airport behind him and one in front of him. For example, if the aircraft had not reached the ETP on his route of flight, given an emergency that required a diversion, the fastest way to get on the ground may be to turn around or return. At the ETP it takes the same time to fly to both alternate airports, the one behind and in front. So naturally if the ETP is passed then the pilot knows it is quicker to continue to the forward or what is referred to as the continue alternative. The capability to develop an ETP is a critical skill needed for overseas oceanic flight operations. The United States FAA's guidance in the Flight Standards Information Management Guidance FSIM 8900.1 given to their inspectors addresses overwater operations with regards to sophisticated navigation systems in modern aircraft while highlighting the need for extensive operational drills and training. In Vol 4 Chapter 12, 4-1289, G Training Curriculum Content it states "Experience has clearly demonstrated that the presence of sophisticated navigational equipment on board an aircraft does not, by itself, ensure that the flight-crew will achieve a high level of safety performance. The rapid growth in traffic density and the complexity of CNS requirements in the SAOs makes it essential that operators provide adequate training for the personnel operating or maintaining the equipment. Inspectors must be proficient in using test equipment when returning navigation equipment back to operable service.

Operating drills and procedures by flightcrew should also be included as required by ICAO Doc. 7030, Regional Supplementary Procedures. Questions concerning the acceptability of training should be referred to the regional NextGen SAO Specialist, formerly known as Navigation Specialist. Inspectors should strongly recommend that the crew qualifications include, at a minimum, the subjects listed below:" In this list is a direct reference to the use of plotting charts and ETP's. "Preparation of ICAO flight plans, plotting charts, and flight logs to include equal time point (ETP) calculations;"

The Scott IPC Electronic Plotting Chart serves all the purposes cited above. The auto and manual calculation of ETP's is a critical skill used by pilots flying over water. The Scott IPC Electronic Plotting Chart feature, both trains and simplifies the process to build ETP's more accurately than can be accomplished with paper, pencil, and slide rule. The Scott IPC flight navigation tool is the first flight navigation tool to configure a portable electronic device to perform the building of and use of a plotting chart and ETP's.

The objective of an ETP is to calculate a time to fly, which can be converted to a known amount of fuel needed, which lets the pilot know if he has what is called a wet footprint.

A wet footprint is when an aircraft has insufficient fuel to reach an alternate airport from anywhere along his route of flight. U.S. Federal Aviation regulations as well as ICAO regulations strictly forbid a commercial operator from operating with a wet footprint. Pilots must evaluate the fuel needs of any given route to ensure compliance with these and other ICAO regulations and ETPs are critical to that evaluation. In some cases, the route of flight lends itself to the use of two ETPs along a route. (FIG. 35) An example of this type of route is found in the North Atlantic as well as other airspaces. Take the case of an aircraft flying from Gander Newfoundland to Shannon Ireland Eastbound. In this case a pilot could use two ETPs for the route. Slightly beyond the halfway point to the north is Iceland. So, an aircraft would build the first ETP that would be positioned between Gander (the return airport alternate) and an airport alternate in Iceland (the continue off route airport alternate). The next ETP would be built using Iceland as the return and Shannon Ireland as the continue. Every ETP built has a return and continue alternate. So, by using two ETP's along a route it lessens the time to fly to get to a suitable alternate. Imagine one ETP midway between Gander Newfoundland and Shannon Ireland. It would be perhaps a 2-hour flight to return or continue to one of the airports from the middle of the North Atlantic. But by placing another option like Iceland for both the first half of the flight and the second half of the flight the time to fly to either alternate is significantly reduced.

The Scott IPC Plotting Chart ETP functions allow both of these scenarios to be utilized with ease and accuracy reducing error and time in jeopardy given an emergency flight to an alternate airport.

Often there are times when a planned alternate cannot be used due to various weather conditions, but the disqualification of the alternate occurs after the flight is on its way. Pilots must be able to calculate ETPs in-flight. This has been done in the past using a paper plotting chart, a good bit of practice, a slide rule, and a lot of estimates. The Scott IPC Plotting Chart ETP build eliminates all these problems. Operators can autoplot established ETP's by entering in the previously calculated ETP locations. The operator can also build ETP's using the pilot's inputted data. Or, the pilot can use the annotation pencil tool and plot the position of the ETP's with a simple annotation on the route of flight.

13.1 The Scott IPC electronic charting tool enables the user to build ETPs using one or more of the following methods:
1) Automatically build by programmatically reading a flight plan.
2) Create by hand using Lat/Long information from the flight plan.
3) Auto build using return/continue airports and the average wind and true airspeed to the return airport and to the continue airport.

13.1.1 Automatically build ETPS by programmatically reading flight plans. (FIG. 36A) The Scott IPC tool reads multiple flight plan formats from several vendors to automatically build the route(s), including the ETPs and will plot both on the chart. Users can select to Download or Import a flight plan from email in the Preflight Wizard Select Flight Documents step. The user is then advanced to the Preflight Wizard Build Route step and the tool will present the route it has automatically detected from the previous step. At this point, the Scott IPC tool will automatically draw the route on the chart. In a subsequent Preflight Wizard step called Plot ETPs, the tool will again read the flight plan and present the number of ETPs found in the flight plan and automatically populate the following information for the user on screen: RTN (Return) and CONT (Continue) airports, ETP type, ETP lat/long along with a description.(FIG. 3A) The user can then elect to add/edit additional ETPs as well as select which ETPs to display on the chart. The user is provided real-time feedback when selecting which ETPs to display, this allows a confirmation that the selected ETP is correct and can be displayed. This is "Unique to this tool"

13.1.2 Create by hand using Lat/Long information from the flight plan. To access this option, the user can select: The RED TOOLBOX→ETPs→By Lat/Long from FLT PLN. (FIG. 36B, 38b). This selection presents the user with functionality to create ETPs manually, including a custom keypad with the letters N, S, E, and W for quick entry of latitude and longitude (Lat/Long), RTN (Return) and CONT (Continue) airports, a selector for the type of ETP and a description field. The user can save or add more ETPs and then choose to display one/more ETPs on the chart, including a label. The ETPs are plotted on the chart with arrows pointing to each alternate (RTN) and (CONT)

13.1.3 AUTO BUILD ETPs. This option allows the user to enter the following information: RTN (Return), CONT (Continue) airports, the average wind and true airspeed to the return airport and to the continue airport and the tool will accurately build and plot each ETP on the plotting chart. To access this option, the user can select: The RED TOOLBOX→ETPs→Auto Build New ETP. and they are presented with a data entry box containing: RTN (Return), CONT (Continue) Airport and an ETP Label field. The RTN and CONT fields are airport lookups, so the user just needs to start typing the name of the airport for each and suggestions are provided in a drop down list. The user selects the correct airport for each field. After filling in each field the user continues by selecting "Next." (FIG. 37)

The tool now calculates the equal distance point between the previously entered alternates along the route of flight. The user is presented with instructions to enter wind direction and velocity (kts) (example: 240/65) and the average True Airspeed (TAS) for the RTN (Return) and CONT (Continue) alternate airports. When all is entered the user selects the POST button.

ETP Processed: The tool then processes the information using average wind direction to each alternate, average wind speed in knots, and average aircraft True airspeed as entered by the pilot. The newly built ETP(s) are then plotted on the chart showing two arrows pointed at the alternates entered and showing the label as entered by the pilot. (FIG. 38a)

14. Automatically Sync Multiple Devices, Primary/Secondary Feature "Unique to this Tool." FIGS. 39, 44a, 44b Block Diagram of Sync Process 14.1 Background for the Primary/Secondary Sync feature. The United States FAA has published a requirement that only one Master Document is allowed on the flight deck at a time. A Master Document is really multiple documents comprising a computerized flight plan and a plotting chart. The reason for the rule is that checks and balances are annotated on the computerized flight plan and the plotting chart during the flight and important decisions are made due to these entries. It is undesirable to have inconsistent and conflicting information presented to the aircrew during a flight, so this rule prevents operators from having different information in front of them. With a paper computerized flight plan and plotting chart, the documents are literally handed back and forth on a clipboard. The Scott IPC Plotting Chart tool accomplishes the same requirement by means of Bluetooth syncing of devices.

14.2 Both iPads can make annotations or changes to the flight plan, plotting chart, or journey logbook entries when 2 iPads are synced. The portable electronic devices configured using the Scott IPC plotting chart sync tool will always have matching data. When one device makes a change, it is synced to the other device. Each device will be assigned a role: Either Primary or Secondary. The device selected as Primary will be the official version and will therefore be captured after the flight to be used in the Journey Logbook upon Flight Closeout.

14.3 The Scott IPC Plotting Chart tool utilizes a short-range radio such as WiFi in addition to Bluetooth to help ensure Sync connection reliability between 2 iPads for the flight plan, plotting chart, Annotations, Position Report Form or journey logbook information when changed or entered from either iPad.

14.4 Only two iPads can be synchronized in the cockpit.

14.5 User can select SYNC DEVICES ICON from the top navbar or at the Sync System step in the Preflight Wizard and is presented with the option to designate an iPad as a Primary or Secondary role.

14.5.1 When a user selects "Designate as Primary," any other iPads that have selected the SYNC System functionality and then selected Designate as SECONDARY, will show the other device under "Available Devices". At this step, either device can select "Connect" to complete the connection. The Primary device will then send a complete update of data to the Secondary device roll.

14.5.2 After SYNC is accomplished, users will see icons on the top navbar for the selected role for the device. Either "P" for Primary, "S" for Secondary, Previous Primary, Previous Secondary or not synced. (FIGS. 40, 41, 42A, 42B, 43)

14.5.3 User will have status information always available on the top icon bar of the flight navigation tool. By tapping on the icon, It automatically displays the correct sync status of the device. The Preflight Wizard, Sync System step also provides the same information.

14.6 To disconnect Synced devices, the user may tap on the sync icon at the top icon bar and select the red disconnect button. The same functionality is also available in the Preflight Wizard Sync System step.

14.7 If Sync is disconnected, the previous primary device will be indicated as such. The Primary device will see a top navbar icon that says, "Previous Primary" (FIG. 42A) and Secondary device will see a top navbar icon that states "Previous Secondary" (FIG. 43).

14.8 After a sync disconnect, each device will be presented with a screen showing the previous role and a button to reconnect in that role. Tapping on "Reconnect Primary" and "Reconnect as Secondary" will present the user with the same confirmation screen step that lists Available Devices and a Connect button. Upon reconnecting the Sync connection, the Primary device will send over a complete update of data to the secondary to ensure both devices have the same information.

14.9 Sync—transfer the role of Primary to other devices. (FIG. 45a) This feature helps facilitate the crew workflow of having a relief pilot transition into the flight deck. Pilot flying and pilot not flying can decide which iPad will be the Primary (primary) for plotting duties, given one of those pilots leaving the flight deck to rest will take their iPad with them. The primary (primary) device/role always remains on the flight deck and relief pilots Sync connect using the Secondary role. Pilots can connect and disconnect from the active Primary role iPad in the cockpit or swap roles between devices to facilitate crew rotation. This workflow will accommodate the additional pilot and iPad rotating in and out of the cockpit. A pilot rotating back into the cockpit will always need to select the Secondary role, as the current Primary role upon sync connect will send a complete update of all plotting information recorded up to that point in the flight to the secondary device. The transfer of roles is accomplished by tapping on the sync icon on the top nav bar and selecting "Swap Role" (FIG. 45a). A confirmation is presented, naming the device that the user will swap roles with a Cancel and Swap option. The Sync System screen will then show a confirmation as to the new role for the device.

14.10 Sync auto reconnect. (FIG. 45b) Should the Primary and Secondary become disconnected during flight for reasons other than an on purpose disconnect a "Sync Lost" message will present on both devices and each device will attempt to automatically re-establish the Sync connection. A successful automatic sync reconnect will be noted by the Sync Lost alert dismissing from view and the top nav bar icon on the respective devices showing Primary and Secondary green icons 14.11 Sync—Restore overwritten flight data. (FIG. 45c) As stated previously, the model used during Sync is the Primary device being the source of data (Master document) and as such, upon every sync connection the primary will send a complete update of data to the secondary and overwrite data on the secondary. This model ensures through subsequent device rotation, the new device rotating in as the secondary will always have the same information as the primary. Said differently, this eliminates the chance for conflicting information between synced devices. Given this model, it is possible for a clean device (no plotting data on it) to rotate into the cockpit and select the primary role upon syncing with the other device. In this case, the primary would essentially inadvertently overwrite the secondary with no information, thus removing previous plotting information from the secondary. Scott Plot Sync functionality includes the capability to restore trip data to a previous point during a flight for this case. If this situation occurs, the Secondary device simply needs to select the clock icon in the upper right hand portion of the Sync System screen. A confirmation will then present, asking the user to confirm they would like to disconnect Sync and restore. Selecting Restore will repopulate data for the device to the point just prior to the inadvertent overwriting of data on the secondary. A confirmation is presented when the process is complete.

15. Full Route Navigation Details and Dead Reckoning (DR)

15.1 Full Route Navigation Details. Users can bring up full route navigation details by tapping the Leg button on the main UI screen (FIG. 1b, item 233). When GPS is active, Full Route Details shows Ground Speed (GS), Estimated Time Enroute (ETE), Estimated Time of Arrival (ETA) and leg distance to go [in nautical miles (nm)] at the top of the chart (FIG. 46A). The Initial Magnetic and True courses are displayed in a blue box connected to the start of each leg. An icon representing the aircraft position and direction is shown on the route line. At the start of the next leg there is a Blue Box with the word NEXT, and this box contains the Initial Magnetic and True Course for the Next leg. GPS timestamps are placed on the chart to note GPS Fail and GPS Active points. (FIG. 47).

15.2 Dead Reckoning (DR). When an aircraft has lost all of its ability to navigate with onboard systems, the required routing must be solved manually. The reduced separation between aircraft due to modern navigation systems makes the need for accuracy critical. As flight crews will be task saturated in this event, the navigation process must be highly accurate and easy to use. Using paper plotting charts and mechanical methods to determine the required course is time-consuming and prone to inaccuracies. The charts are often large and unwieldy, and taking accurate measurements in a confined and turbulent environment is challenging, resulting in less precision than is required by today's standards. The Dead Reckoning Tool promptly provides an easy-to-use, highly accurate navigation solution without any of the accuracy issues occurring with paper charts during a loss of position (GPS or other) information.

15.3 When GPS fails a GPS fail icon (FIG. 91) displays, and a Dead Reckoning (DR) mode popover (FIG. 91-93) automatically displays with instructions appearing on the bottom of the screen. The Scott IPC navigation tool includes machine readable code for providing pilots with a heading and timing for a rhumb-line route from a location where the GPS fails to the next waypoint of the currently planned route, this DR mode is based on winds aloft, TAS, and the last known GPS position as well as waypoints stored in the trip database by the pilot when the pilot configured the current route.

15.4 DR Mode Initial state after loss of GPS. Upon failure or loss of GPS, two user interface elements are displayed. The GPS failure popover (FIG. 91) which communicates to the pilot that GPS is unavailable and highlights the availability of Dead Reckoning (DR) mode. The DR mode panel header at the bottom of the screen (FIG. 92) which emphasizes the loss of GPS, provides a persistent toggle to activate DR Mode, and can be slid upwards with a swipe. The user must explicitly dismiss the GPS failure popover to user DR and the app (FIG. 91). The DR mode panel header remains persistent for the duration of the GPS failure. The two user interface elements are shown together within the Scott IPC app (FIG. 93).

15.5 DR mode enabled, initial state. (FIG. 94) If a user enables DR Mode from any of the previous states (GPS Failure Popover or the DR Mode Panel header), the full DR Mode panel slides up. The app will autofill any available inputs (such as the Active Leg Start and Endpoints based on the GPS location next waypoint from the flight plan and route already built in the app). It is in this view that the pilot will enter the following information to plot their DR Mode course and view the DR Mode estimates at the top of the panel:

Leg Avg Wind Speed and Direction
TAS for the Active Leg

The "Next Leg" Wind and TAS fields are disabled unless the user enters a "Next Leg Endpoint." Tapping "Disable DR Mode" in this view would collapse the panel to its previous state, but save any entered information.

Pilot inputs can be entered utilizing Apple's magic keyboard or using a virtual keyboard. DR mode enabled, initial state shown within the Scott IPC app (FIG. 95).

15.6 DR mode enabled, pilot inputs completed (FIG. 96). After entering the required inputs, the application can calculate the DR Mode estimates (displayed in the box at the top of the panel) and can plot the estimated course on the map. DR mode enabled, pilot inputs completed within the Scott IPC app (FIG. 97).

15.7 DR mode enabled, aircraft estimated location (EST LOC) and pilot input details. The pilot inputs include the Active Leg (being flown) and the Next Leg as well as the Leg Avg Wind and TAS (FIG. 96, 97). The pilot may enter the Leg Start and Leg Endpoint for the Active Leg by typing in the fields. The pilot may also set the Leg Start and Leg Endpoint values by dragging the start and endpoints on the chart to the desired navigation fixes. From the GPS failure point extended to the next waypoint is a red dashed line that follows a rhumb line routing to the next waypoint. The point of GPS failure is indicated by the red GPS fail icon. The aircrafts estimated location (EST LOC) is represented by a red circle on the chart. (FIG. 98).

15.8 DR Mode enabled, Quick View state. After entering the required inputs and plotting the DR Mode course, the user can collapse the panel down to its Quick View state (FIG. 99), which leaves the DR Estimates and stopwatch visible but hides the input fields and DR Log. This provides more map visibility but maintains awareness of the DR Mode data and timing. DR mode enabled, quick view state within Scott IPC app (FIG. 100).

15.9 Using DR with GPS failure. If continuing along your route:
Fly the DR Headings shown on the DR panel just below the GPS Failure stamp until reaching the ETA.
Entering LEG AVG Wind and TAS for the number of legs necessary.

15.10 Using DR with GPS failure. If deviating from your cleared route:
Enter Next Leg Start and Next Leg Endpoint on the DR panel OR the pilot may also set the Leg Start and Leg Endpoint values by dragging the start and endpoints on the chart to the desired navigation fixes.
Enter LEG AVG WIND and TAS for the leg(s) needed.
The DR headings, EST GS, EST DIST REMAIN, ETE are now calculated.
Fly the DR headings shown on the DR panel until reaching the ETA.

15.11 DR Mode enabled, Quick View state, Approaching Leg End alert displayed.

As the pilot proceeds along their estimated DR course to their Active Leg endpoint, it is important to alert them to input the required details (Leg Avg Wind and TAS) for the next leg of their flight so the course can continue to be estimated and plotted. (FIG. 101)

The Approaching Leg End Alert banner is displayed in the DR Mode Panel (both consolidated and full states) as the pilot approaches their endpoint within the Scott IPC app (FIG. 102). The alert banner is displayed at 3 minutes remaining until reaching the current leg endpoint.

15.12 DR Mode Log. Whenever the full DR Mode panel is displayed, the pilot can expand the DR Log to see additional details as they relate to the current GPS failure and DR Mode Legs. (FIG. 103) Additional information is:
Initial Failure Location
Time since failure
Distance since failure
Leg start and end points
Leg ETE
Leg distance
DR Log information is also included in the final Journey Logbook PDF.

15.13 DR Mode Enabled, GPS Restored. When GPS returns, the "GPS Failure" tag is replaced with a "GPS Restored" tag (FIG. 104), and the GPS icon in the header returns to its normal state and the aircraft position is shown with a blue aircraft icon. A green GPS Active stamp is also placed on the chart at the point GPS location was restored.

15.14 DR Mode Manually Enabled for training. DR Mode can be enabled manually for training and education purposes. Selecting the Red Toolbox (FIG. 1*b*, item 242) and then Enable DR Mode (FIG. 105) will provide the necessary DR user interface and functions to simulate a GPS loss and thus step thru DR functionality.

16. Automatically plots a wind correction stamp on route of flight "Unique to this tool"

16.1 User can select TOOLBOX→IN-FLIGHT TOOLS-→WIND CORR STAMP and a WIND CORR entry box appears so that the user can enter wind drift correction. (FIG. 48)

16.2 Wind Correction during Dead Reckoning Navigation is a key component of flying accurate headings to arrive at a specific point. The Wind Correction Stamp allows an operator to capture a wind Component in case of the need to D.R. either forward or to reverse course and fly a return route accurately. Although the computerized flight plan has the average wind component for each leg depicted, it is only a forecast product and does not indicate drift correction due to winds. The Wind Correction Stamp used in this flight navigation tool allows for real time data input of the actual wind correction component to be captured.

16.3 User is presented with a customized entry keypad with numerals 1 thru 9 and a zero. There is also a + and − sign as wind correction is either a plus or minus component. The entry box accepts a minus or plus sign and 2 numbers.

The keyboard now also includes "−/L" and "+/R" keys to denote direction of wind correction to hold. Keyboard also includes "." to indicate a decimal entry to increase granularity, such as "2.5" meaning 2.5 degrees.

16.4 User enters the WC into the entry box and selects Post, the WC is then plotted on the route of flight with a line that bisects the exact position at the time of entry. The WC stamp can be used anytime and displays WC with the correction component. e.g., 'WC+02

17. Provides Selectable Layers (FIG. 49)

17.1 User can select LAYERS icon and is provided a menu of all layers available:
Layer indicating Airports
Layer indicating NAVAIDS
Layer indicating Waypoints
Layer indicating ETP's (Equal Time Points), "Unique to this tool"
Layer indicating ETP labels
Layer indicating Flight Information Regions
Layer indicating controlled airspace
Layer indicating NAT Tracks Westbound
Layer indicating NAT Tracks Eastbound
Layer indicating Pacific Tracks East and Westbound
Layer indicating chart annotations
Layer indicating NAT HLA Airspace
Layer indicating Pinned Positions
Layer indicating 10 degree reference diamonds
Auto Distance layer 17.2 User can see as many layers as they select to overlay on the PC by selecting on or off on slider button.

17.3 Each layer will become visible at predetermined zoom levels after being selected for enable.

17.4 Currently Effective North Atlantic Tracks Layers separated by Direction, "Unique to this tool"

17.4.1 User can select LAYERS icon→NAT-OTS→Eastbound and/or Westbound. and will be presented with the tracks plotted on the plotting chart. Each waypoint that defines the track is displayed.

17.5 When the flight navigation tool is opened with Wi-Fi coverage, the current full NAT Track message is uploaded automatically and placed in the misc. doc folder as a PDF.

17.6 The Scott IPC backend portal will check for a change of track message every 5 minutes and deliver the new track message when it identifies a new message.

17.7 Each track on the plotting chart is labeled with the track Direction and identifier. Example West A or East Z.

17.8 Each waypoint that makes up the full track is identified on the plotting chart with the track route.

17.9 User can view the printed Track message applicable for the track valid period by selecting the Track message ICON (FIG. 50) in the bottom left of the plotting chart, which is always present if the NAT Track Layer is active.

17.10 An x closes out the full track message but leaves the track layer and icon in place until the user selects disable from the layer menu.

17.11 The Track Message Layer is not depicted on the Plotting Chart unless the layer is enabled, and the zoom level reaches a prescribed zoom level.

18. Distance for all Route Segments Layer (FIG. 51) "Unique to this tool"

18.1 User can select the Layers ICON AUTO DISTANCE LAYER and the distance for all legs built will present in the center of all routes.

18.2 The Manual Distance Measurement Tool allows an operator to calculate Distance. See section 10 for discussion.

19. Airports Layer 19.1 User can select LAYERS icon 4 AIRPORTS Enabled and airports with ICAO I.D. labels will be displayed.

19.2 User can select an airport I.D. and derive detailed airport information such as runways available, lengths of runways and full name 20. NAVAIDS Layer 20.1 User can select LAYERS icon→NAVAIDS and the Navaids layer will be depicted.

20.2 User can select Navaid once it is depicted and derive detailed Navaid information.

21. Waypoints Layer 21.1 User can select LAYERS icon→WAYPOINTS and the Waypoint layer will be depicted containing all worldwide waypoints.

22. Fixed Routes Layer 22.1 User can select LAYERS icon→FIXED ROUTES and the Fixed Route layer will be depicted.

22.2 Fixed Routes are routes published by airspace authorities for the airspace concerned.

22.3 FIXED ROUTES Layer is depicted for worldwide routes

23. ETPs (Equal Time Points) Layer see section 12 for ETP descriptions "Unique to this tool."

23.1 User can select LAYERS icon→ETPs WITH LABELS and the ETPs with labels layer will be depicted.

24. Flight Information Regions (FIRS) Layer 24.1 User can select LAYERS icon→FIRs and the FIRs with labels layer will be depicted.

24.2 Any FIR globally will be depicted with its ICAO I.D. and full Name.

24.3 Any previously built ETP for the flight in force will be depicted.

25. Full Route Navigation Details LAYER 25.1 User can select this layer from LAYERS icon-→FULL ROUTE DETAILS or select TOOLBOX→IN-FLIGHT TOOLS→FULL ROUTE DETAILS.

26. Controlled Airspace Layer 26.1 The Controlled Airspace Layer depicts all Controlled airspaces in the world.

26.2 All Controlled airspace boundaries are labeled.

26.3 All Military and warning areas are depicted and named with this layer.

26.4 The controlled airspace layer also depicts all Special use airspace wherein an approval is required to operate within. This airspace is known as SAO airspace.

27. Layer indicating Pacific Tracks East and Westbound 27.1 The Pacific Tracks Layer depicts daily published Pacific Tracks between the U.S. and Asia.

28. Speed, Distance, Time Calculator design of calculator "Unique to this tool."

28.1 User can select this calculator from TOOL-BOX→IN-FLIGHT TOOLS→SPEED-DISTANCE-TIME CALC and is presented with a Speed, Distance, and Time Calculator (FIG. 52)

28.2 The user is then provided entry boxes and a custom number keypad that contains 1 thru 9 and 0.

28.3 The user enters the values required for the calculations and the calculation is carried out.

28.4 User can enter a number value by selection of an input box. Two of the input boxes need to have data entered by the user and then the result is automatically displayed in the third box. The values are Distance in nautical miles (NM_(FIG. 52), Speed in Knots, and Time in minutes. The 60 is a constant.

28.5 Input values are in positive whole numbers. A character limit is imposed for the values entered as follows: Distance—4, Speed—3, Time—3.

28.6 The calculated time result is in minutes with precision up to 1 decimal place. The number of output digits in the result calculation can exceed the maximum values allowed when user inputs the maximum values, therefore the calculated output for Distance (nm) and Speed (knots) will provide 6 digits and the calculated output for Time (min) will allow for 7 digits including one decimal point for precision.

28.7 User can close out the SDT calculator when finished.

29. FREEPLAY/LOFT MODE (FIGS. 53-54) "Unique to this tool"

29.1 As addressed earlier in this document, operators are required to include training exercises and drills within their flight operations. The presence of sophisticated aircraft navigation systems does not by itself result in error free operations. It is to that end that the FREE PLAY/LOFT MODE mode is contained in this Scott IPC. Scott Plot. Electronic Plotting Chart feature of the flight navigation tool. The user can enter into a Freeplay mode that allows the user to completely simulate Oceanic Operations. Once the app is installed in an iPAD or suitable portable electronic device, that device becomes a flight navigation tool suitable for use for simulator training and in aircraft operations. The operator can directly control the speed and the direction of the aircraft to simulate an aircraft in flight over a planned route on the plotting chart. The flight navigation tool will simultaneously allow the user to utilize the various supported functions from the toolbox and layers during the aircraft simulated flight. This will allow the user to enter a 'training mode' and use the plotting chart application in preparation for how the flight navigation tool would be used in an actual flight. Practicing FAA company approved procedures and practices.

29.2 User will enter 'Freeplay Mode' by selecting TOOL-BOX→Training→Freeplay Mode.

29.3 When Freeplay Mode is initiated, the GPS function is disabled.

29.4 While in Freeplay Mode, the GPS satellite icon will change to a yellow GPS icon with a red circle and line through the icon to indicate GPS is disabled. All Plotting Chart functions that depend on GPS use the information on speed and direction inputted by the user.

29.5 An overlay at top of the PC will always be displayed in Freeplay Mode and state, 'You are now in Freeplay Mode. GPS is inactive'. (FIG. 53)

29.6 If user attempts to use toolbox to enable GPS, a popup to the user is presented:

'You must exit Freeplay Mode to enable GPS.' User can CONFIRM or CANCEL.

29.7 User will have the following controls and icons when in Freeplay Mode. (FIG. 54)

29.7.1 User is provided a simulated yoke for directional control (Ball flag FIG. 53X), and a speed setting slider (Ball flag 2 FIG. 53X) in the bottom center of the screen. The speed is always shown above the center of the speed slider.

29.7.2 User is provided a red chevron icon that represents the aircraft (Ball flag 3 FIG. 53X) position and direction, slightly above the yoke.

29.7.3 The user is presented a Start/Pause Freeplay Button that changes state as it is selected.

29.7.4 The user is presented an Exit Freeplay button to end Freeplay mode.

29.8 User manipulates the yoke icon to change direction of the simulated flight of the aircraft.

29.8.1 User touches and holds their finger on right or left handle of yoke and can rotate the yoke a maximum of 45 degrees right or left to change flight direction. As the yoke is rotated the number of degrees it is rotated determine the turn rate of the aircraft chevron. When the yoke is rotated clockwise the aircraft will turn to the right. When the yoke is rotated counterclockwise, the aircraft chevron will turn to the left. When user removes their finger from the handle the yoke will automatically return to the center position. The aircraft chevron will continue to turn as long as the yoke is held in a turn position 29.8.2 The yoke is active whether the Freeplay Mode is in active or pause mode. The yoke is also active before Freeplay Mode is started.

29.8.3 The amount of rotation in the yoke slows or speeds up the turn of the aircraft. The rate of turn for the aircraft chevron is determined as follows:

29.8.3.1 When the yoke is rotated 10 degrees, the aircraft chevron rotates at a rate of 2 degrees per second. If the user held the yoke at 10 degrees, the arrow would continue to turn at that rate.

29.8.3.2 When the yoke is rotated 15 degrees, the arrow rotates at a rate of 3 degrees per second. If the user held the yoke at 15 degrees, the arrow would continue to turn at that rate.

29.8.3.3 When the yoke is rotated 20 degrees, the arrow rotates at a rate of 4 degrees per second. If the user held the yoke at 20 degrees, the arrow would continue to turn at that rate.

29.8.3.4 When the yoke is rotated 25 degrees, the arrow rotates at a rate of 5 degrees per second. If the user held the yoke at 25 degrees, the arrow would continue to turn at that rate.

29.8.3.5 When the yoke is rotated 30 degrees, the arrow rotates at a rate of 6 degrees per second. If the user held the yoke at 30 degrees, the arrow would continue to turn at that rate.

29.8.3.6 When the yoke is rotated 35 degrees, the arrow rotates at a rate of 7 degrees per second. If the user held the yoke at 35 degrees, the arrow would continue to turn at that rate.

29.8.3.7 When the yoke is rotated 40 degrees, the arrow rotates at a rate of 8 degrees per second. If the user held the yoke at 40 degrees, the arrow would continue to turn at that rate.

29.8.3.8 When the yoke is rotated 45 degrees, the arrow rotates at a rate of 9 degrees per second. If the user held the yoke at 10 degrees, the arrow would continue to turn at that rate.

29.9 The point of the red chevron represents the direction of the simulated aircraft. The yoke can be used prior to starting the flight to set the initial flight path direction.

29.10 User can manipulate a speed slider icon to increase and decrease the speed of aircraft. The user can press and move the vertical bar within the speed slider to set the speed to the desired setting. As the speed slider is being changed the current speed displayed above the bar is displayed. When the user releases their finger, the speed is set to that value. The range represented on the speed slider is from 400 kts to 4000 kts. The default speed is 450 kts. The speed slider setting can be manipulated prior to the Freeplay flight when the flight is paused or during a flight.

29.11 Order of Operation for Freeplay Mode 29.11.1 Prior to starting Freeplay Mode, the user selects the aircraft chevron, and a handle appears connected to the aircraft chevron.

29.11.2 The user positions the aircraft chevron to the desired start point and taps off the chevron.

29.11.3 The user then sets the desired speed.

29.11.4 After the speed is set, the user sets the required Oceanic reminders from the TOOLBOX I IN-FLIGHT TOOLS/OCEANIC FLIGHT REMINDERS menu.

29.11.5 The user selects Start Freeplay Mode.

29.12 After Freeplay Mode has been started and Freeplay is active, the ability to move the aircraft chevron icon is disabled. If the user pauses the flight the aircraft icon can then be moved to anywhere on the PC.

29.13 When flight is paused the user can tap the aircraft chevron and use the handle to relocate the aircraft chevron.

29.14 The path of the flight is depicted on the Plotting Chart with red dot(s) at a 30 second frequency (same as when GPS is being utilized, except dots are red in freeplay mode not gray as in normal mode).

29.15 When user presses pause the flight path will be paused. The flight path of the aircraft chevron is still depicted. If the aircraft chevron is relocated, the flight path dots are removed and will begin to re-populate when flight is resumed and pause is no longer evoked.

29.16 While in pause mode, all functions in the toolbox operate normally except for GPS.

29.17 When paused the aircraft chevron can be turned.

29.18 In flight the aircraft chevron can be turned.

29.19 If there have been any annotations made on the Plotting Chart while paused, after the user taps the aircraft chevron a popup message appears asking the user: "Do you wish to clear added annotations made during Freeplay Mode before moving the aircraft?". If they answer no, then annotations remain on the Plotting Chart, if they answer yes, then the annotations added during Freeplay Mode are cleared from the Plotting Chart. This includes ETP's. However, this does not clear or reset the Plotting Chart area or any route previously built.

29.20 If user exits Freeplay Mode then all controls and aircraft path are cleared. However, this does not reset the Plotting Chart area and the Plotting Chart as set prior remains.

29.21 The user can exit Freeplay Mode to initiate a new flight.

29.22 If the user zoom's in and out of the Plotting Chart while in Freeplay Mode the yoke and speed slider will not change in size.

29.23 If the user selects to open the ICRH manual or any other hamburger menu item while freeplay mode is active, the travel of the Freeplay aircraft pauses automatically. When the user returns to back to freeplay, all previously built annotations and flight path remains. The user must press 'start Freeplay' again to restart aircraft motion.

30. Flight Bag Upload from ScottIPC portal for use in flight navigation tool "Unique to this tool."

30.1 Scott IPC has created and maintains an online web portal for Flight Department administrators, Flight Department pilot, and contract pilot use. Login is required to access/use the portal. It works in conjunction with the Scott IPC iOS flight navigation tool.

30.2 Flight Department admins/pilots and contract pilots can upload, store, and assign documents for use on the flight navigation tool.

30.2.1 Documents that can be stored/assigned for use can include flight plans, manuals, and miscellaneous documents in PDF form.

30.2.2 Once a flight plan is uploaded to the portal, assigned users can upload the flight plan from the portal while using the iOS flight navigation tool.

30.3 Users are also able to upload a flight plan into the Scott IPC iOS flight navigation tool directly from the flight navigation tool via email or from stored documents on iPad.

30.4 Flight Department admins or Contract Pilots can block any use of the document portal by selecting 'Restricted' on a pilot account so that sensitive flight information stays locally on the iPad. This would pertain to flights/flight planning that is sensitive in nature due to passengers.

31. Track Message Upload from ScottIPC backend for use in flight navigation tool "Unique to this tool."

31.1 The Scott Plot sm. Electronic Plotting Chart sm. is configured to receive information from the database that is parsed from the NAT Track Message on the FAA website. This information will be retrieved every 5 minutes from the FAA website, parsed and available to users to provide them with the most up-to-date track message information from the FAA website.

32. Creates and Manages Journey Logbook (FIGS. 55A-55D) "Unique to this tool."

Any aircraft operating more than 12 NM's off any coastline in the world is operating in ICAO International Airspace. The United States of America is a signatory of the Chicago Convention and therefore obligated to follow ICAO published annexes and standards (SARPS) within when publishing U.S. regulations. If a U.S. Regulation does not comply with a standard that is published by ICAO, then the U.S. is obligated to publish differences to the ICAO published standards. There are no U.S. published differences to the ICAO Journey Logbook requirement. Operations conducted in oceanic airspace more than 12NM's offshore are not regulated by the U.S. but rather the world body namely ICAO. It is an ICAO requirement that any aircraft operating more than 12NM's off any coast maintain a Journey Logbook. ICAO Annex 2 Operation of Aircraft dictates this requirement. The Scott Plot sm. Electronic Plotting Chart sm. flight navigation tool provides the only electronic automatic mechanism to comply with these requirements.

Article 34 of the Chicago Convention (ICAO) specifically states: "There shall be maintained in respect of every aircraft engaged in international navigation a journey log book in which shall be entered particulars of the aircraft, its crew and of each journey, in such form as may be prescribed from time to time pursuant to this Convention".

FAA FSIM 8900.1 Vol 4, Chapter 12 section 4-1290 states regarding compliance with ICAO requirements: "When conducting oceanic flights, pilots of U.S.—registered aircraft must adhere to the U.S. regulations, ICAO Standards and Recommended Practices (SARP), and state regulations for the countries they overfly or where they land." FAR Section 91.703 specifically addresses ICAO Annex 2, which ensures that ICAO standards are regulatory to operators of U.S.-registered aircraft operating in oceanic airspace. The Convention on International Civil Aviation, commonly known as the Chicago Convention, is the basis for this requirement. Pilots should also review Annex 6, Part II, International General Aviation—Aeroplane The Scott International Procedures LLC, flight navigation tool containing the Scott Plot sm. Electronic Plotting Chart sm. is the only flight navigation tool in existence meeting these requirements. For each Flight for Record, the flight navigation tool collects information needed to comply with the Journey Logbook requirements. At the end of the flight the flight crew closes out the flight which triggers an automatic collation of documents and information used during the flight. The flight navigation tool automatically captures these documents with any annotations made on them and creates a single pdf document to include the following: Computerized Flight Plan; Track messages; Itinerary; Plotting Chart depicting the plotted route, route edits, actual aircraft track, route waypoint notes, pinned position notes, 10 minute checks, GPS time stamps, equal time points, wind correction and text annotations. Also included, Position Report Form, completed checklists and user added PDFs. GPS Fail/Active information is also listed in table form as well as graphically on the chart, showing the route of flight and where the GPS failed and became active as well as the GPS source.

32.1 Take or add photos to include in the Journey Logbook. Users can import photos to the tool or use the camera on the iPad and take photos to use as part of the journey logbook record. Photos can be a picture of the inbound clearance as read from the aircraft FMS screen or paper print out, a CPDLC message from ATC, the weather radar to justify a deviation from a clearance, position reports messages sent out via CPDLC, damage sustained to the aircraft, or anomalous or unusual instrument readings. The user can add photos already taken or take photos and add them directly to the appropriate section in the Journey Logbook. The Journey Logbook PDF is then forwarded to the respective operator via email, or direct transfer to the operators Scott IPC portal account, while maintaining a copy on the local iPad used for the flight. "Unique to this tool"

33. Automatically uploads closed out Journey Logbook to clients' portal based on clients' method desired as well as additional sharing options. "Unique to this tool" Scott IPC is the only company to automatically put together all documentation for the oceanic route of flight, package it and automatically store it in the users Portal account as well as enable sharing the journey logbook to any number of recipients via email, messaging apps, AirDrop as well as store to cloud storage (such as Box). We believe this is unique and of high value.

33.1 Journey Logbook-data entry and sending. As shown in FIGS. 55A-55D and 56, clients have control over how and where closed-out Journey Logbooks are sent and stored from within the Scott Plot$^{sm}$. Electronic Plotting Chart flight navigation tool, and may add any necessary supplemental information to them including any necessary photos, PDF files, ATIS information, clearances, coast-in and coast-out sensor readings, and other information. Scott IPC will automatically store the Journey Logbook in the users Portal account as well as enable sharing the journey logbook to any number of recipients via email, messaging apps, AirDrop as well as store to cloud storage (such as Box). The file send icon at top of the screen shown in FIG. 56 is used to trigger transmission of the file.

34. Journey Logbook—Restore and edit past flight data. (FIG. 57a, 57b) Under regular operation, at the conclusion of a flight, a completed journey logbook PDF is uploaded to the user's portal account as a part of the Create Logbook step found in the flight bag. In addition, the Scott IPC flight navigation tool retains previously completed flight journey logbook data for up to 45 days and allows an interface to recall a previous flight and add any additional information to a previous flight and then create an updated journey logbook. This functionality also allows the pilot to create another Journey Logbook should there be an error in the normal closeout and upload step. "Unique to this tool"

35. Allows upload of PDF for use in flight navigation tool "Unique to this tool."

35.1 The Scott IPC flight navigation tool allows for users to upload PDF documents via three different methods:

35.1.1 Direct upload to flight navigation tool via email. User will tap this option on the menu, and email client will be opened. User can navigate to the desired email and select the PDF document attachment to be uploaded. Once user confirms document selection, the PDF is uploaded for use within the flight navigation tool.

35.1.2 Direct upload from saved documents on iPad. User will tap this option on the flight navigation tool menu, and stored documents will be shown. User can select the PDF document to be uploaded. Once user confirms document selection, the PDF is uploaded for use within the flight navigation tool.

35.1.3 Direct upload from Scott IPC Web Portal. User will tap this option on the flight navigation tool menu, another screen within the flight navigation tool is opened. User can select a desired PDF document from a list of documents stored in the user's account on the Portal. Once user confirms document selection, the PDF is uploaded for use within the flight navigation tool.

36. Integrates Scott 1PC International Cockpit Reference Handbook (ICRH) "Unique to this tool." (FIG. 58)

36.1 The Scott Plot sm. Electronic Plotting Chart feature operates in conjunction with the Scott IPC International Cockpit Reference Handbook contained in the Scott IPC flight navigation tool. Users can transition between functions seamlessly. The menu system of the Scott IPC flight navigation tool allows for access to the Scott Plot sm. Electronic Plotting Chart or vice versa.

36.2 ICRH annotation capabilities. The ICRH provides the user with the following annotation functionality to enable the pilot to take notes and highlight the relevant critical information needed for a flight. A breakdown of the tools below (FIG. 58):

Add Note Annotation (300)
Text highlighting (301)
Pen drawing (302)
Freeform highlighting (303)
Variable size eraser (304)
Color Selection (6) preset colors
Variable line opacity and thickness (305)
Undo/Redo annotation (306)
Stylus/Hand (finger) modes (307)

The preceding annotation types are stored with the users' portal account 36.3 ICRH bookmarks and search. The ICRH also provides the user with the ability to easily bookmark pages for future reference as well as a search functionality to quickly locate critical reference information.

36.4 The Scott Plot sm. Electronic Plotting Chart will also allow users to have direct access via links to standard procedures and/or contingency procedures during their flight. For example, when a user selects Dead Reckoning (DR) Tool, there is a tapeable box on the screen that will take the user to the proper section of the ICRH.

37. Provides User Profile Information 37.1 Users have access to all information that is stored on their account, to include:
Pilot Name
Flight Department
Scott IPC User ID number
Pilot License number
City of residence
Title
Aircraft Make & Model
Country
Phone number
Email address 37.2 Users are also able to change information on this page, including password, and can access GDPR Data Control information.

38. Provide user notification of changes to ICRH "Unique to this tool".

38.1 The International Cockpit Reference Handbook (ICRH) is a document developed and updated according to FAA and ICAO standards. This document is frequently updated with important information and changes to FAA and ICAO procedure. To best serve our users, the Scott IPC flight navigation tool allows for custom, detailed notifications to be sent to users within the flight navigation tool when any updates are published within the flight navigation tool.

39. Allows Flight Department Administrators to assign permissions through the back end "Unique to this tool."

39.1 Flight department administrators can use a specified number of "subscriptions" to assign permissions to their pilots, using the Scott IPC Web Portal. Permissions assigned on the web portal are recognized by email address (username) when a user signs in to the Scott IPC flight navigation tool.

40. Allows permissions to be assigned to individual aircraft "Unique to this tool."

40.1 As some flight departments provide two permanently mounted iPads on each flight deck, Scott IPC developed a specific way to assign flight navigation tool credentials to a tail number, using individual email addresses for each iPad. This allows flight departments to operate with individual pilot iPads or company-owned and operated iPads.

41. Allows users to upload documents to their personal account on the backend and pulls those documents to the flight navigation tool. "Unique to this tool."

41.1 Users can sign in to the Scott IPC Web Portal and upload documents. Any documents that are uploaded to the portal can be accessed by users with proper permissions from the Scott IPC flight navigation tool by tapping on "Flight Bag". See Section 35 for a description of how to access/use uploaded documents within the Scott IPC flight navigation tool.

42. Restricts access to sensitive documents as assigned by the user or flight department (FD) administrator. "Unique to this tool"

42.1 To prevent any flight-related documents from being saved in the system for an individual pilot or flight department with sensitive documents, a control setting will allow for FD admin or pilot to enable or disable upload of various documents to the portal.

42.2 When restriction is in use, this will meet requirements for sensitive and governmental accounts. It will prevent any saving of documents to the Scott IPC database, and all Journey Logbooks will only be saved on the local iPad on which they are created.

43. Plotting Chart area to encompass route automatically set at completion of Preflight Wizard. "Unique to this tool."

At the completion of the Preflight Wizard, the Scott IPC tool will automatically set the Plotting Chart view to encompass the route of flight. This provides the pilot with a quick orientation and overview of the route of flight to include ETPs, Tracks and airspace.

44. Automatically downloads relevant operational data and worldwide ARINC 424 databases without pilot's intervention Upload process "Unique to this tool".

44.1 The Scott IPC flight navigation tool and the Scott Plot sm. Electronic Plotting Chart feature automatically downloads the necessary data contained in the Scott IPC Portal to populate the International Cockpit Reference Handbook (ICRH). Navigation data is also downloaded by the user to populate the Plotting Chart. Users need only to open the flight navigation tool within Wi-Fi coverage for the update to process. To aid in resisting man-in-the-middle attacks, the updates are downloaded from Scott IPC servers over an encrypted connection. The valid period and ARINC cycle number of the database is always available to the user on the Data Download page of the Preflight Wizard.

44.2 The Scott IPC backend Portal allows Scott IPC personnel to make a change to the material or guidance in the ICRH any time and make it available to Scott IPC ICRH users for update.

Scott IPC can also send a notification to the users to alert of ICRH content updates as well as communicate relevant information to operators, either individually or for all users with a description of the change. "Unique to this tool."

45. Functions without the need for internet connection 45.1 The Scott IPC flight navigation tool is designed for pilot use in a cockpit with no internet connectivity required. All information needed for the flight navigation tool configured as a "Portable Device Adapted to Assist Pilots in Compliance with International Flight Procedures and Navigation" is downloaded and stored within the device when the flight navigation tool is initially installed on the device. Upon connection to Wi-Fi, any functions (such as Track Message retrieval or ARINC 424 navigation Database or downloading of documents) that require updating with Wi-Fi will occur while the Scott IPC flight navigation tool is in use (logged in) and device is connected to the internet. After this transfer of data occurs, Wi-Fi is no longer required.

46. Allows pilot control of data usage of the flight navigation tool in flight due to the high cost of in-flight data from sat providers. "Unique to this tool"

46.1 Users have complete control within the flight navigation tool settings to turn off data usage. Forced data usage is a concern for pilots as inflight data is a significant cost. This on/off toggle setting is well-explained and provides users a way to ensure this flight navigation tool does not incur unexpected costs.

47. Indicates unique zoom levels and phased in graticule lines designed for plotting ease. Phased zoom levels and depictions of Graticule Lines. (FIGS. 59-66) "Unique to this tool"

47.1 The Scott Plot Plotting Chart has unique zoom settings that set the latitude and Longitude Graticule depiction schedule which will optimize the work area for the process or function executed. Different functions require a different level of accuracy. The flight navigation tool brings in the layers at the appropriate zoom level that would lend to ease of use for a specific task. There are four zoom levels with the Scott Plot feature that change the depiction of the graticule lines. Discussed below:

47.1.1 Zoom level one up to 80 degrees Latitude (FIG. 59A). This is what is shown before and after setting the chart area of coverage. Up to 80 degrees North or South Latitude, the flight navigation tool depicts 10 degrees of Latitude and Longitude with solid lines. Each latitude and Longitude line will be labeled with the Hemisphere and 2 digits in degrees. Example 20° N. All Latitude labels at this zoom level are positioned directly on the line represented. The layout of the labels assists operators in mitigating errors in plotting. With western cultures script is read from left to right, that habit is sometimes erroneously applied to plotting western hemisphere Longitudes. In other words, the numbers get bigger reading right to left. To prevent this from happening:

47.1.1.2 For West Longitudes: The orientation of the number is facing so as to increase from right to left.

47.1.1.3 For East Longitudes: The orientation of the number is facing so as to increase from left to right.

47.1.2 Zoom Level 1: From 80 to 90 degrees Latitude (Figure b) because the Longitude Lines converge the closer you get to the poles there is a custom Graticule depiction scale use north of 80 degrees. Beyond 80 degrees of Latitude, the flight navigation tool will depict Longitude lines every 60 degrees of Longitude. The graticule lines therefore display at a density of lines per 60 degrees of longitude decreasing with latitude.

47.1.3 Zoom Level 2, up to 80 degrees Latitude. (FIG. 59C). When zoom level 2 is attained the flight navigation tool displays labels every 10 degrees of Latitude and Longitude. It also displays whole degree tic marks on the right side of the longitude lines and above the latitude lines. 1-degree tic marks are shown between each 10-degree line. The Latitude labels are positioned directly on the line. The Longitude line labels for West Longitudes are positioned on the lines. For West Longitudes, the numbers are orientated to increase from right to left. For East Longitudes, the label will be placed on the line, oriented and increasing from left to right. The 5-degree tic mark between each 10-degree latitude and longitude line extends beyond the center of the line for quick orientation.

47.1.4 Zoom level 2, From 80 degrees Latitude. (FIG. 59D) When zoom level 2 is attained the flight navigation tool displays Longitude lines every 60 degrees. 1-degree Latitude tic marks are displayed on every Longitude line displayed up to 85 degrees latitude. The 85-degree tic mark extends across the longitude line. There are no tic marks between 85 and 90 degrees. The longitude lines converge at the poles. The graticule lines therefore display at a density of lines per 60 degrees of longitude decreasing with latitude.

47.1.5 Zoom level 3, up to 70 degrees Latitude. (FIG. 59E) Up to degrees Latitude, when zoom level 3 is attained the flight navigation tool displays Latitude and Longitude lines in 5-degree increments. Latitude and Longitude lines are labeled every 5 degrees. Solid 1 degree tic marks are shown between each 5 degrees of Latitude and Longitude. Orientation of the tic marks are as previously defined in the lessor zoom levels. They are positioned to the right of the Longitude line and on the top of the Latitude lines. The 1-degree tic marks are of the same length.

47.1.6 Zoom level 3, from 70 to 80 degrees Latitude. (FIG. 59F) From 70 to 80 degrees Latitudes, when zoom level 3 is attained the flight navigation tool displays solid Latitude and Longitude lines in 10-degree increments. Solid 1 degree tic marks of equal size are on the Longitude lines. On the 75 and 80-degree Latitude line the 5-degree Longitude tic mark extends through the line of Latitude. Orientation of the tic marks are as previously defined in lessor zoom levels. They are positioned to the right of the Longitude line and on the top of the Latitude lines. The graticule lines therefore display at a density of lines per 60 degrees of longitude decreasing with latitude.

47.1.7 Zoom Level 3 from 80 to 90 degrees, same graticule depiction as 47.1.4.

47.1.8 Zoom Level 4 (FIG. 59G). Up to 80 degrees latitude, when zoom level 4 is attained the flight navigation tool will depict every whole degree of Latitude and Longitude as a solid line. It will depict a tic mark every 10 minutes of Latitude and Longitude. The 30-minute tic mark will be longer and extend thru the Latitude and Longitude lines. Labels will be displayed for every 5-degree Latitude and Longitude. For Greater than 80 degrees latitude the depiction will be as the lessor zooms.

47.1.9 Zoom Level 5 (FIG. 59H). When zoom Level 5 is attained up to 80 degrees latitude, every whole degree of Latitude and Longitude will be displayed as a solid line and labeled. Tic marks will be populated for every ten minutes of Latitude and Longitude. The 30-minute tic mark will be longer than the rest crossing over the line of longitude or latitude. Orientation of the tic marks will be the same as lessor zoom levels. Above 80 degrees depiction will be as lesson zooms.

47.1.10 Zoom level 6, Up to 80 degrees Latitude (FIG. 59I). When Zoom level 6 is attained every whole degree of Latitude and Longitude will be displayed and labeled, depicted as a solid line. Tic marks will be shown in 5-minute increments with the 5-minute tic being the shortest and only on one side of the line. The 10-minute tic will be longer than the 5-minute tic mark and will cross over the Latitude or Longitude line. The 30-minute tic marks will be the longest and cross over the line of Latitude and Longitude. Greater than 80 degrees Latitude will be depicted the same as lessor zooms.

47.1.11 Zoom level 7, (FIG. 59J). Up to 80 degrees Latitude. When zoom level 7 is achieved, every whole degree of Latitude and Longitude will be depicted as a solid line and labeled. 1-minute tic marks will be depicted along every whole degree of Latitude and Longitude line. Every ten-minute tick mark will be depicted and be longer than the one-minute tic marks and they will cross over the line of Latitude and Longitude. A 30-minute tic mark will be depicted and be longer than the ten-minute tic mark. Greater than 80 degrees latitude will depict various tic marks depending on tilt.

47.2 Zoom Scale depiction. "Unique to this tool." The Plotting chart displays a custom scale that identifies the zoom map height and level. This allows developers and users to specify the exact zoom level if an issue arises and information needs to be passed to Scott IPC operations regarding depictions.

48. PP DIR TO (Present Position Direct To):

48.1 A user can select TOOLBOX→CONTINGENCY PP DIR TO and is presented with the PP DIR TO entry box. (FIG. 67) When a user selects the PP function, they are presented with a data entry page that allows them to enter a destination for a rapid divert. With GPS functioning, the aircraft position is automatically inserted into the present position from box and the user need only enter a destination location either by Latitude longitude or by a name. "Unique to this tool."

48.2 When a user selects the PP DIR TO function, the aircraft present position is populated in the PP/FROM field. (If GPS is active).

48.3 A user can enter a full LAT/LONG or a named waypoint in the PP/FROM fields.

48.4 A user can enter a full LAT/LONG or a named waypoint in the DIR To fields.

48.5 If a user enters a named waypoint, its Lat/Long is automatically shown in the Lat/Long boxes.

48.6 The user can overwrite the posted Present Position by selecting the box and entering different values.

48.7 The named waypoint fields can accept 2, 3 or 5 letter entries which will pull from the ARINC 424 database.

48.8 A user with GPS active, after building the PP DIR TO route can then post the route to the plotting chart. And immediately begin to fly the route. The user can display the full leg details if it is a D.R. situation.

48.9 The leg has a hollow circle centered at each end that may be dragged and dropped to a new location if desired.

48.10 The route posted is a Great Circle Route.

49 Has a day/night mode to preserve night vision in the cockpit 49.1 The Scott IPC flight navigation tool allows users to enable a night mode to preserve night vision acuity when flying at night. Night mode has been developed using Apples API to connect the app to Dark Mode in the iPadOS settings. The tool utilizes color inversion and human factors best practices to optimize the application and Plotting Chart for night use. Night mode can also be set within the tool by tapping on the settings gear and selecting day, night or auto (follow the iOS setting for day/night as it is configurable in for iOS at: Settings→Display & Brightness).

50 Brightness Control 50.1 Brightness is controlled by a slider in settings. The app brightness level is connected to the OS brightness, and they work as one. App brightness turns up the entire device brightness and vice versa.

51. In-flight navigation tool rotate screen lock to accommodate aircraft maneuvering.

51.1 Users can lock the screen orientation within the flight navigation tool settings so that the screen locks to a preferred rotation within the flight navigation tool. This does not affect the screen lock outside of the flight navigation tool. Aircraft anticipated or actual maneuvering requires this feature to be easily and quickly accessible.

52. Automatically set the Plotting Chart Coverage Area for the route of flight. "Unique to this tool."

52.2. The Plotting Chart area encompassing the route is automatically created and displayed for the pilot after the last preflight wizard step and as such, this allows for rapid location of the route on the globe. At the end of the flight the user closes out the flight, wherein the flight navigation tool creates a PDF file of all the information from the flight discussed.

All of this information is automatically merged to form a single PDF to comply with ICAO and FAA requirements to capture and maintain a Journey Logbook of the flight. This is known as a Completed Journey logbook. No other personal electronic device or flight navigation tool has this capability.

52.3 There is no other fully electronic Plotting Chart tool with the full capabilities discussed in this document on the market today. This unique tool allows for a Plotting Chart to be created for any airspace in the world, regardless of the route of flight. The Scott Plot tool also allows for Polar Operational Plotting as well. Polar operational plotting has always been a problem with paper plotting charts, mostly due to the Mercator Projections used for that region of the globe. The Scott Plot tool allows for a complete area of coverage to be adjusted for the polar crossing scenarios with no distortion of rendering due to projection models.

53. NAT RADAR & ADS-B Surveillance Corridor for multiple altitudes "Unique to this tool".

53.1 The Scott Plot flight navigation tool features a display of the North Atlantic ADS-B (Automatic Dependent Surveillance-Broadcast) ground coverage area for three different altitudes. Flight Level 200, Flight Level 300, and Flight Level 400. The coverage area allows operators to anticipate direct surveillance by ATC and may be used for contingency planning.

53.2 The flight navigation tool also allows a user to identify ground radar coverage areas with ease. This is provided to allow an operator to anticipate when the aircraft will be under direct radar or ADS-B surveillance for contingency purposes.

54. Preflight Wizard Plotting Chart Setup 54.1 The Scott Plot$_{sm}$. Electronic Plotting Chart also features a setup wizard that will walk pilots through necessary steps of setting up a Flight for Record. It is presented in an interactive checklist format. The user will be taken through a series of screens that provide prompts to complete tasks for setup (FIG. 69-78).

54.1.1 Check for Updates. The user will first be presented a screen that will display status of enroute navigation data on the device and allow for the most recent enroute navigation information to be downloaded if expired or about to expire. The user will be presented with green (up to date), yellow (about to expire) and red (expired) icons on the Data Download screen. (FIG. 70). The wizard will advance to the next step and illuminate a green circle on the wizard to confirm the wizard step is complete.

54.1.2 Select Flight Documents. The next screen will prompt the user to download flight plan documents from the users Scott IPC Portal account or import via email for the execution of the flight. Any available documents that have been uploaded to the Scott IPC Portal will be listed as options to download to the device. Import from email uses standard Apple functionality to enable importing of flight documents. The wizard will advance to the next step and illuminate a green circle on the wizard to confirm the wizard step is complete.

54.1.3 Build Route. The user will then build the route of flight by tapping 'Go to Build Route.' Users may edit the route using full lat/long coordinates or can enter named waypoints. Once the user is satisfied with the route, they may select 'Post Route' to plot the route on the Scott Plot Chart. The wizard will advance to the next step and illuminate a green circle on the wizard to confirm the wizard step is complete.

54.1.4 Select Coast Out/In. The user selects 'Go To Chart' and is presented with the route from departure to destination and the user interface to select the Coast Out and Coast in waypoints. The route in between the Coast Out and Coast In waypoints is drawn in green to denote the oceanic portion of the route. The wizard will advance to the next step and illuminate a green circle on the wizard to confirm the wizard step is complete.

54.1.5 Select Checklist. In the next Preflight Wizard step, the user will be prompted to choose an oceanic Checklist to use on the flight. The user will have the option to select ('Use') the default Scott IPC Oceanic Checklist, download a custom checklist, edit a custom checklist, or create a new checklist. The wizard will advance to the next step and illuminate a green circle on the wizard to confirm the wizard step is complete. (FIG. 74).

54.1.6 Journey Logbook. The next screen asks the user if this is a flight for record. If the user taps 'YES', the Journey Logbook form is presented, and the user will fill out applicable and required information for the aircraft and crew. The information in the Journey Logbook can be edited at any time during the flight via access from the Flight Bag. The user taps 'Continue' after completing the information. The wizard will advance to the next step and illuminate a green circle on the wizard to confirm the wizard step is complete. (FIG. 73).

54.1.7 Plot ETPs. The user will tap 'Plot ETPs' at which point the tool will scan the flight plan for ETP information. If found, the tool will automatically build all ETPs found and present the user with the choice of which ETPs to display on the chart as well as the options to edit or create additional ETPs. After the ETPs are built and selected for display, the ETP layer is automatically set to "on", and the user can view ETPs on the Plotting Chart screen. The user taps 'Continue' after completing the information. The wizard will advance to the next step and illuminate a green circle on the wizard to confirm the wizard step is complete.

54.1.8 Oceanic Flight Reminders. The next Preflight Wizard step presents the user with the ability to toggle on/off (6) Oceanic Flight Reminders (Prior to Coast Out, Prior to passing Waypoint, After passing Waypoint, Ten-minute Check, Approaching new FIR and Capture Wind Drift Correction). The reminder(s) selected will present at designated times during flight to assist in completing necessary tasks at the appropriate time. The user taps 'Continue' after completing the information. The wizard will advance to the next step and illuminate a green circle on the wizard to confirm the wizard step is complete. (FIG. 78).

54.1.9 Sync System. The final Preflight Wizard step is to select and configure the Sync System functionality that will pair two devices together and share all flight information. The user can also elect to decline the Sync System functionality. Tapping Finish completes the Preflight Wizard set up and the user is presented with the Scott Plot chart depicting the route and ETPs.

55. Toolbox Item Menus. "Unique to this tool"

55.1 The tool box for this flight navigation tool provides the pilot quick access to a set of tools necessary for an oceanic crossing. This menu system order presentation is "Unique to this tool." The toolbox menu items are as follows:

Notes (Journey Logbook)
Build/Modify Routes
ETPs by Lat/Long from FLT PLN
ETPs Auto Build New ETP
Pin Position Note
Position Report Form
10 Minute Check
Distance Tool
Wind Correction Stamp
PP DIR TO CONTINGENCY
Dead Reckoning Mode (DR)

CONCLUSION

Changes may be made in the above methods and systems without departing from the scope hereof It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. A flight navigation tool for use in aircraft cockpits comprising:
    a tablet computer having a GPS receiver and nonvolatile memory;
    the nonvolatile memory having recorded therein a flight navigation routine, an aviation database comprising international operating rules comprising transoceanic flight rules, and machine-readable code configured to display portions of the international operating rules upon demand;
    a moving-map database configured with tracks, coastal airport identifiers and locations, predefined routes, and predefined reporting point locations for transoceanic operations;
    readable code that, when executed by a processor, causes the processor to obtain a current location from the GPS receiver, and to indicate the current location on a moving-map display representing a portion of the moving-map database;
    a trip database, and machine-readable code that, when executed by the processor, causes the processor to receive direct-entered waypoint coordinates or selection of predefined tracks to configure the trip database with a planned transoceanic route for an individual flight; and
    a checklist database and machine-readable code that, when executed by the processor, causes the processor to compare the current location with popup display locations at which checklists from the checklist database are automatically displayed on the moving-map display, the checklists comprising a pre-departure flight phase, a coast-out flight phase, a waypoint-reached flight phase, and a coast-in flight phase;
    machine-readable code that, when executed by the processor, causes the processor to provide a heading and next-waypoint timing for a rhumb-line route from a location where the GPS receiver fails to a next waypoint of a currently active route; and
    wherein the checklist database comprises checklists for at least a pre-departure flight phase, a coast-out flight phase, a waypoint-reached flight phase, and a coast-in flight phase.

2. The flight navigation tool of claim 1 configured to automatically update its databases by downloading over an encrypted connection.

3. The flight navigation tool of claim 1 further comprising:
    machine-readable code that, when executed by the processor, causes the flight navigation tool to link to a second flight navigation tool as a flight navigation tool pair; and
    machine-readable code, that when executed by the processor, causes the processor to coordinate with the second flight navigation tool to:
    identify a flight navigation tool of the pair as a primary flight navigation tool and another flight navigation tool of the pair as a secondary flight navigation tool,
    synchronize the flight navigation tools of the pair by transmitting updates from a trip database of the secondary flight navigation tool to the primary flight navigation tool, and update the trip database of the secondary flight navigation tool from the trip database of the primary flight navigation tool.

4. The flight navigation tool of claim 3 further comprising machine-readable code, that when executed by the processor, causes the processor to coordinate with the second flight navigation tool to, after synchronizing trip databases of primary and secondary flight navigation tools, redesignate the secondary flight navigation tool as a primary flight navigation tool.

5. The flight navigation tool of claim 4 further comprising one or more additional secondary flight navigation tool.

6. The flight navigation tool of claim 1 further comprising machine-readable code, that when executed by the processor, causes the processor to provide popup warnings when position reports are due.

7. The flight navigation tool of claim 1 further comprising machine-readable code, that when executed by the processor, causes the processor to generate a position report message in ICAO format comprising:
an identification,
a position in latitude and longitude,
a speed, and
an altitude.

8. The flight navigation tool of claim 1 further comprising machine-readable code that, when executed by the processor, causes the processor to permit selection between manual entry of the position and use of a GPS position.

9. The flight navigation tool of claim 1 further comprising machine-readable code, that when executed by the processor, causes the processor to generate equal time points (ETPs) from destination airport locations, alternate airport locations, and wind information.

10. A method of assisting pilots performing overwater flight operations comprising:
reading a current location from a GPS receiver of a portable navigation tool having the GPS receiver and a memory, the memory having:
a moving-map database configured with tracks, coastal airport identifiers and locations, and predefined routes and predefined reporting point locations for transoceanic operations, and
a trip database;
indicating the current location on a moving-map display representing a portion of the moving-map database;
configuring the trip database with a planned transoceanic route for an individual flight by receiving one or more of directly entered waypoint coordinates, entered waypoint names, or a selected predefined track;
reading a current location from the GPS receiver;
indicating the current location on the moving-map display representing a portion of the moving-map database;
displaying checklists from a checklist database upon reaching checklist display locations, the checklists including at least a pre-departure flight phase, a coast-out flight phase, a waypoint-reached flight phase, and a coast-in flight phase; and
providing a heading and next-waypoint timing for a rhumb-line route from a location where the GPS receiver fails to a next waypoint of a currently active route.

11. The method of claim 10 wherein the checklist database is configurable.

12. The method of claim 10 further comprising displaying the moving-map display with graticule lines at a density of that decreases at high latitudes.

13. The method of claim 10 wherein the heading and timing for the rhumb-line route from a location where the GPS fails to the next waypoint is based upon forecast winds aloft, TAS, and last known GPS position.

14. The method of claim 13 further comprising displaying an estimated position based upon time since the GPS receiver failed, TAS, winds aloft, the last known GPS position, and at least one heading.

15. The method of claim 10 further comprising:
pairing the portable navigation tool with at least one second portable navigation tool, designating a navigation tool selected from the portable navigation tool and the second portable navigation tool as primary,
designating at least one other navigation tool or tools paired with the primary portable navigation tools as secondary, and
synchronizing trip databases of the primary and secondary portable navigation tool.

16. The method of claim 10 further comprising generating a position report message in ICAO format comprising:
an identification,
a position in latitude and longitude,
a speed, and
an altitude.

17. The method of claim 16 further comprising selecting between manual entry of the position and using a GPS position read from the GPS receiver.

* * * * *